Sept. 8, 1953     H. F. BENNETT ET AL     2,651,458
AUTOMATIC SEQUENCE-CONTROLLED COMPUTER
Filed Jan. 24, 1951                       26 Sheets-Sheet 3
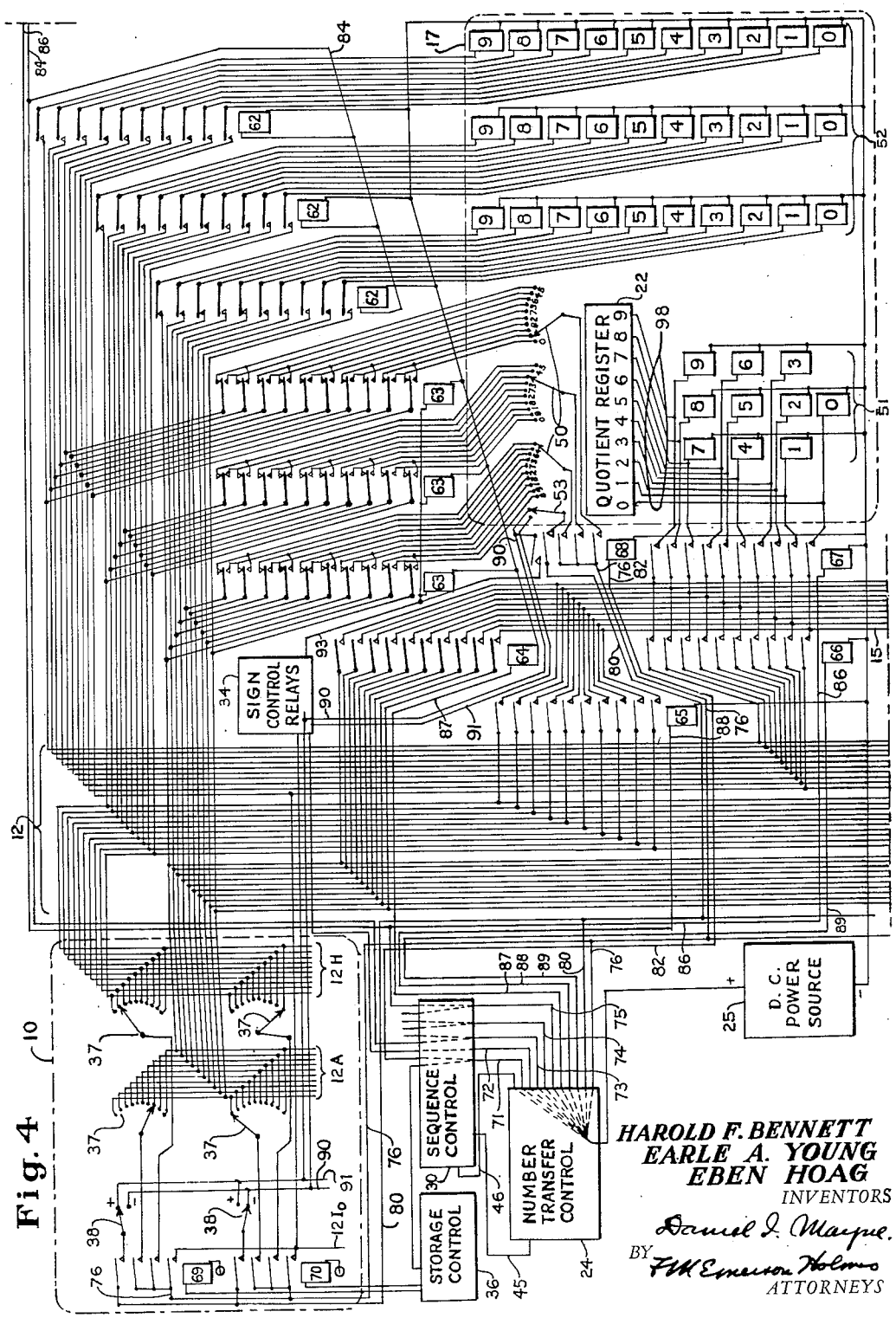
HAROLD F. BENNETT
EARLE A. YOUNG
EBEN HOAG
INVENTORS
BY
ATTORNEYS

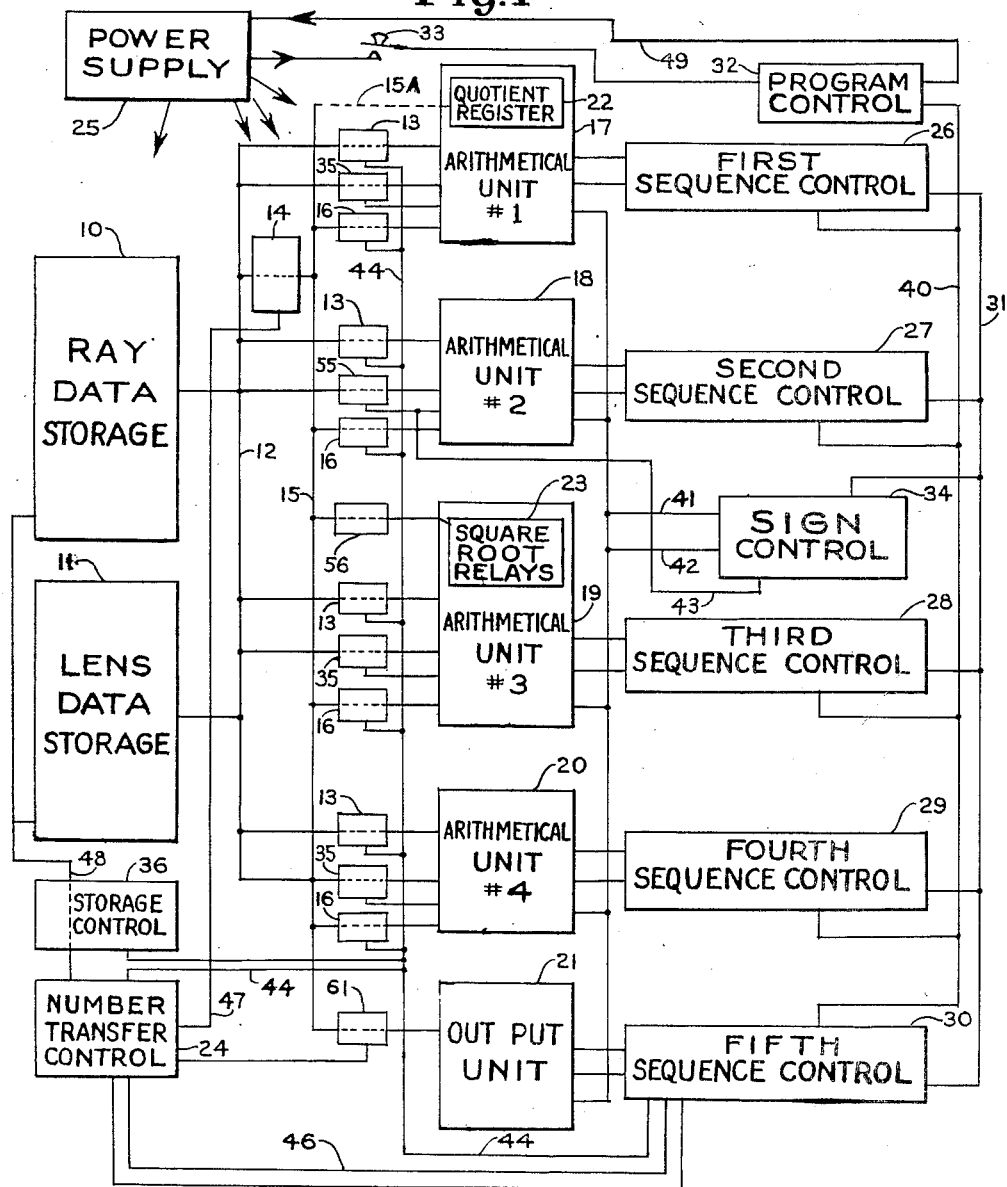

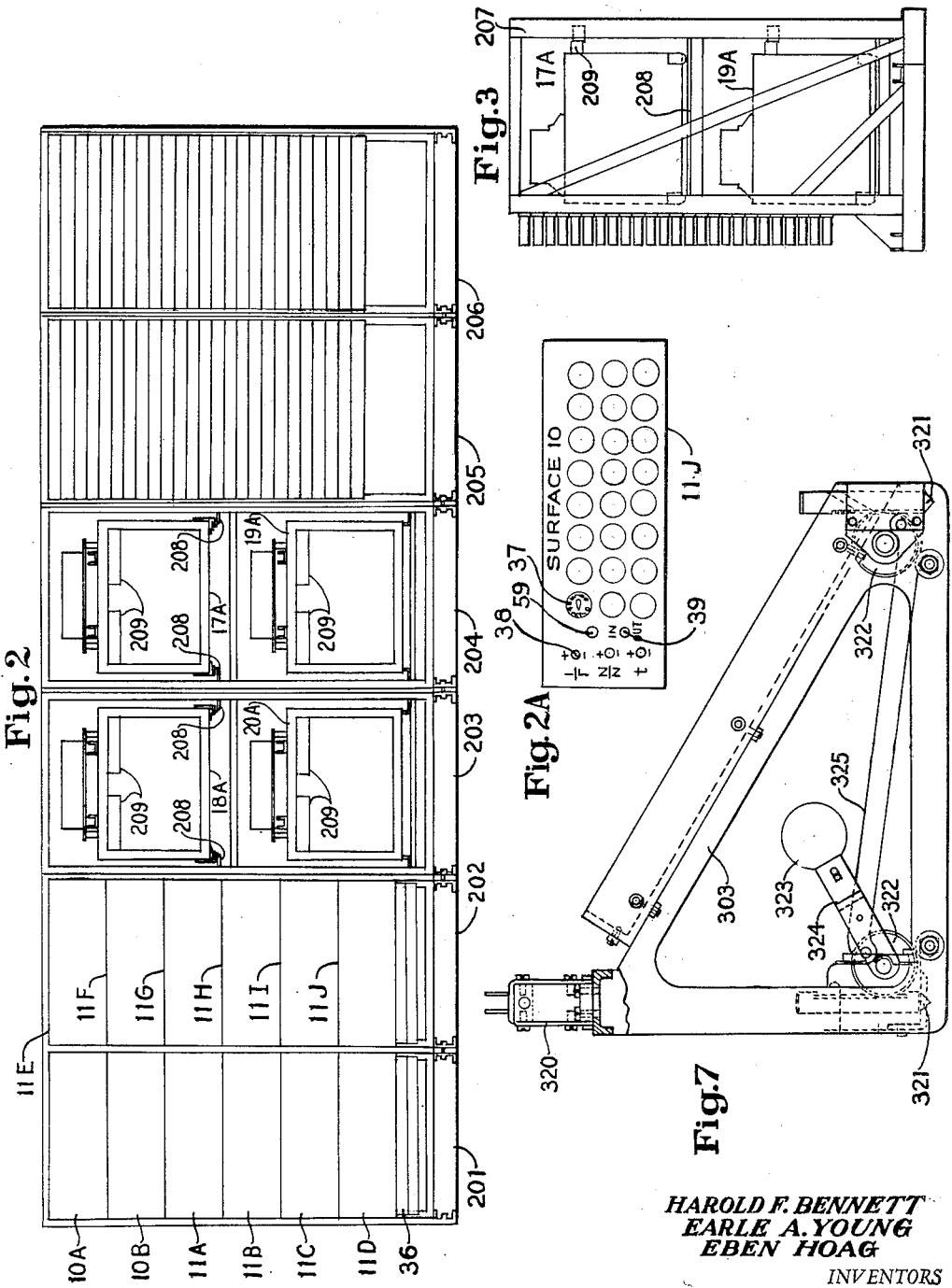

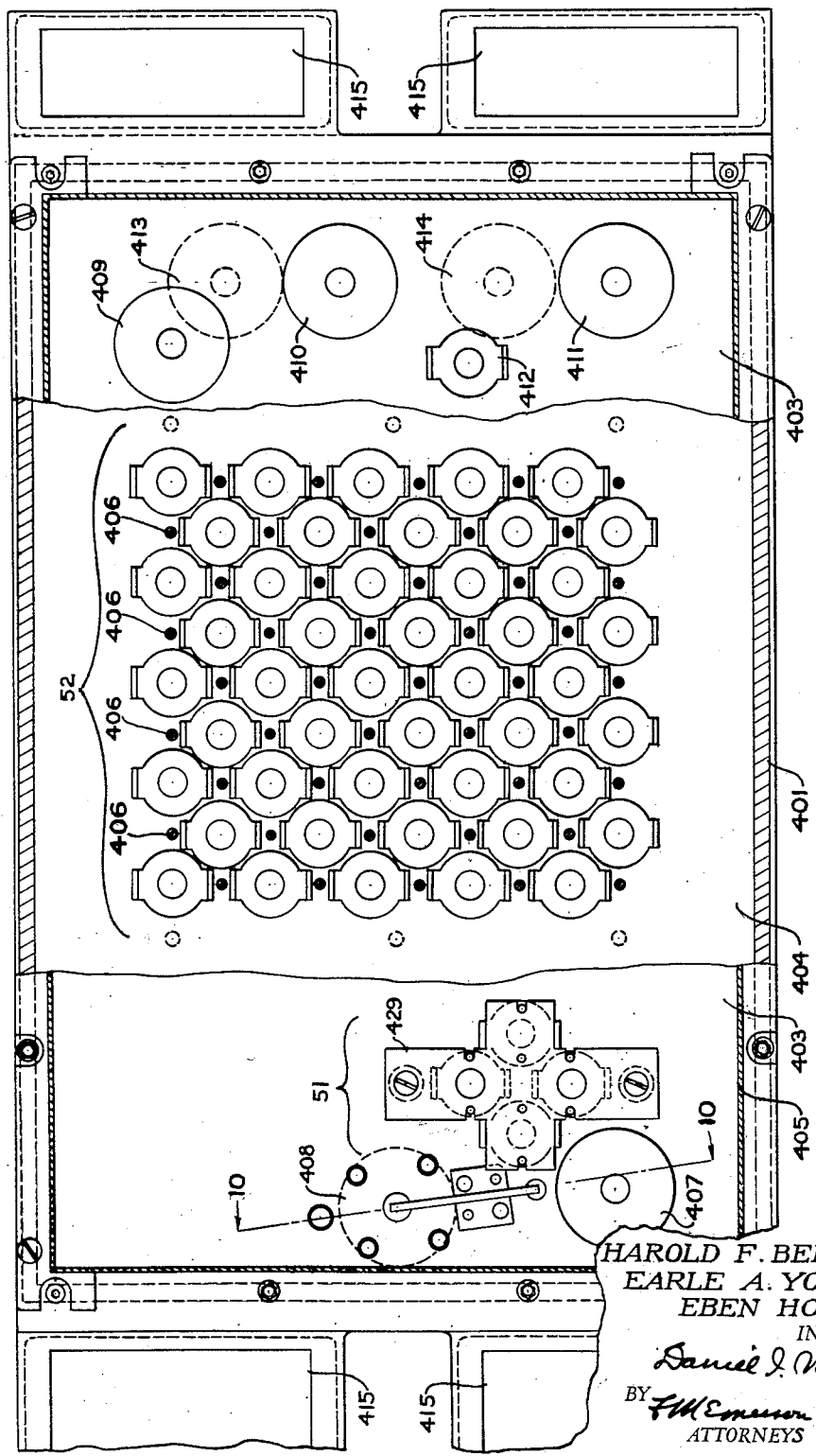

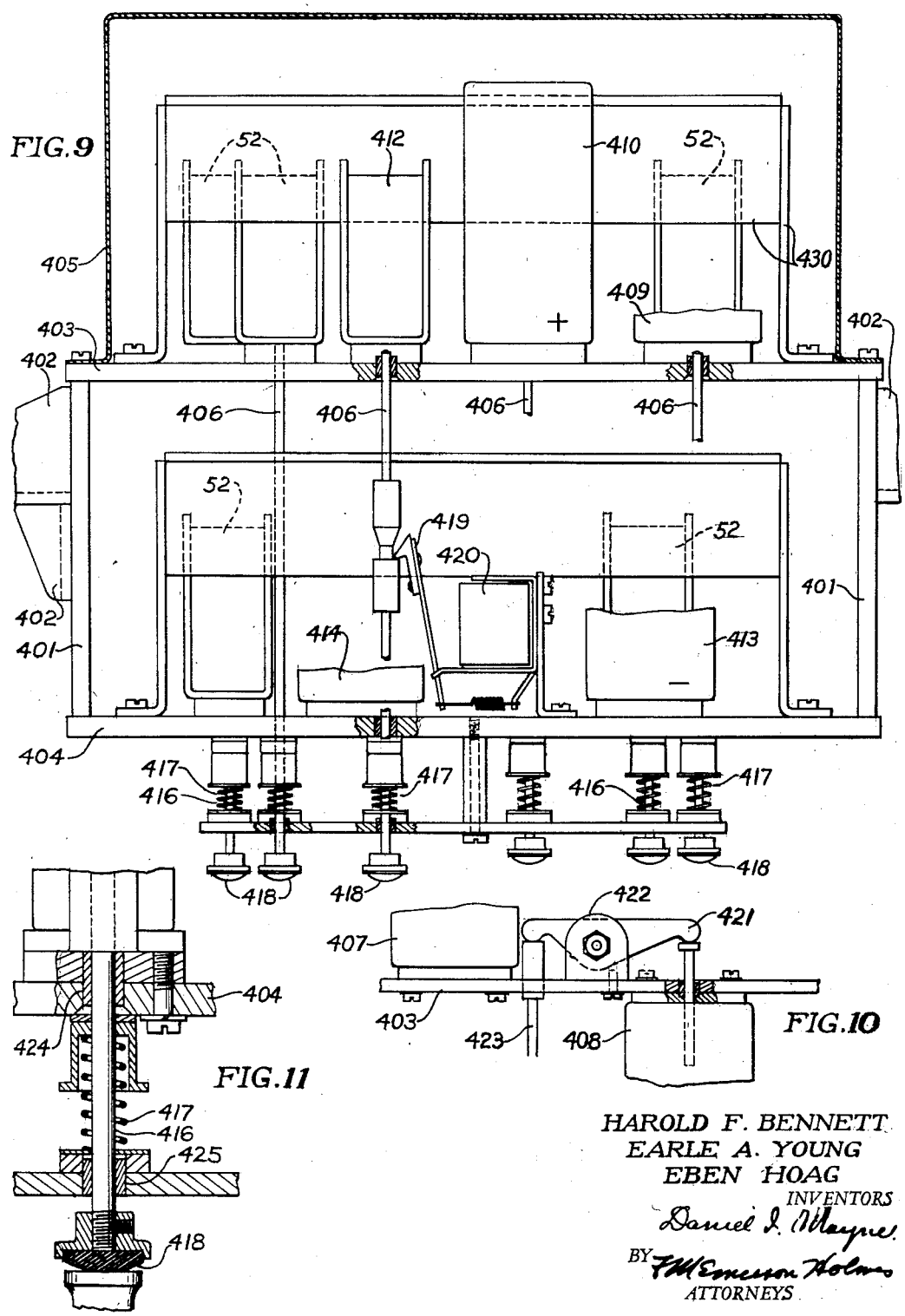

Sept. 8, 1953 H. F. BENNETT ET AL 2,651,458
AUTOMATIC SEQUENCE-CONTROLLED COMPUTER
Filed Jan. 24, 1951 26 Sheets-Sheet 7

HAROLD F. BENNETT
EARLE A. YOUNG
EBEN HOAG
INVENTORS

BY
ATTORNEYS

Sept. 8, 1953   H. F. BENNETT ET AL   2,651,458
AUTOMATIC SEQUENCE-CONTROLLED COMPUTER
Filed Jan. 24, 1951   26 Sheets-Sheet 8

HAROLD F. BENNETT
EARLE A. YOUNG
EBEN HOAG
INVENTORS

BY Daniel I. Mayne
F M Emerson Holmes
ATTORNEYS

Sept. 8, 1953   H. F. BENNETT ET AL   2,651,458
AUTOMATIC SEQUENCE-CONTROLLED COMPUTER
Filed Jan. 24, 1951   26 Sheets-Sheet 9

HAROLD F. BENNETT
EARLE A. YOUNG
EBEN HOAG
INVENTORS

BY
ATTORNEYS

HAROLD F. BENNETT
EARLE A. YOUNG
EBEN HOAG
INVENTORS

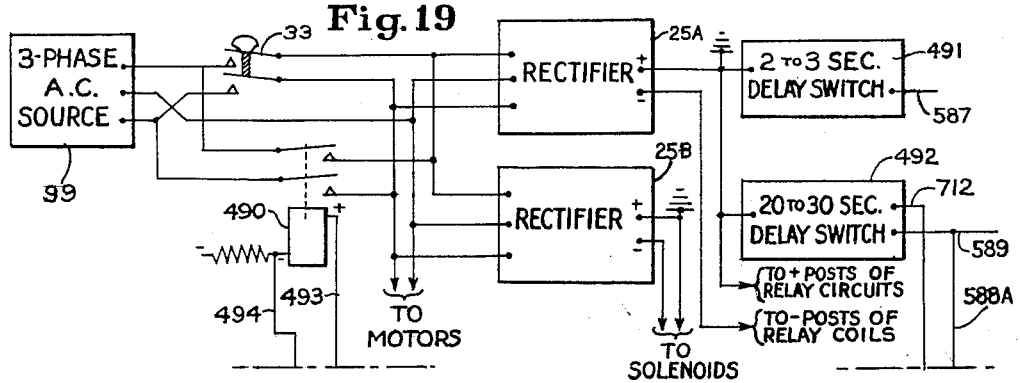
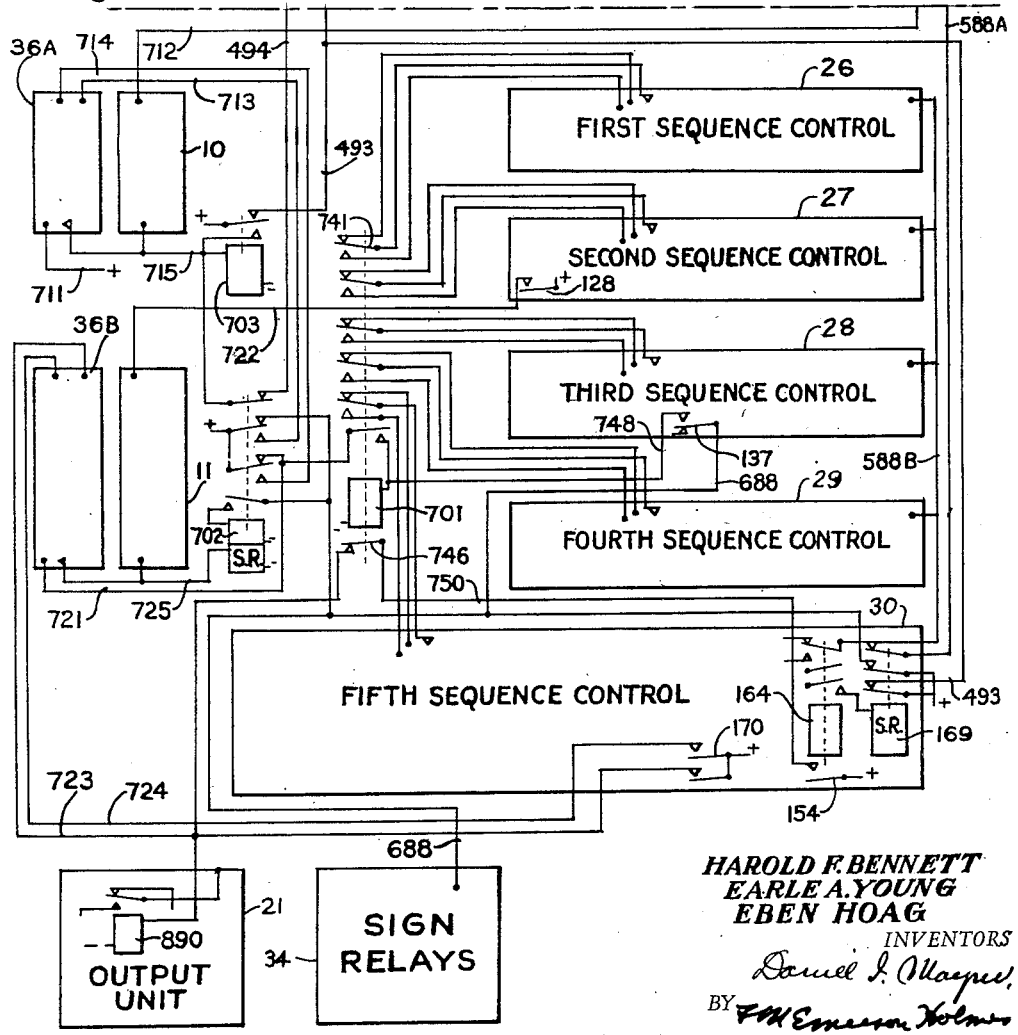

Sept. 8, 1953    H. F. BENNETT ET AL    2,651,458
AUTOMATIC SEQUENCE-CONTROLLED COMPUTER
Filed Jan. 24, 1951    26 Sheets-Sheet 12

HAROLD F. BENNETT
EARLE A. YOUNG
EBEN HOAG
INVENTORS

ATTORNEYS

Sept. 8, 1953  H. F. BENNETT ET AL  2,651,458
AUTOMATIC SEQUENCE-CONTROLLED COMPUTER
Filed Jan. 24, 1951  26 Sheets-Sheet 13

HAROLD F. BENNETT
EARLE A. YOUNG
EBEN HOAG
INVENTORS

BY
ATTORNEYS

Sept. 8, 1953   H. F. BENNETT ET AL   2,651,458
AUTOMATIC SEQUENCE-CONTROLLED COMPUTER
Filed Jan. 24, 1951   26 Sheets-Sheet 14

HAROLD F. BENNETT
EARLE A. YOUNG
EBEN HOAG
INVENTORS

BY
ATTORNEYS

HAROLD F. BENNETT
EARLE A. YOUNG
EBEN HOAG
INVENTORS

ATTORNEYS

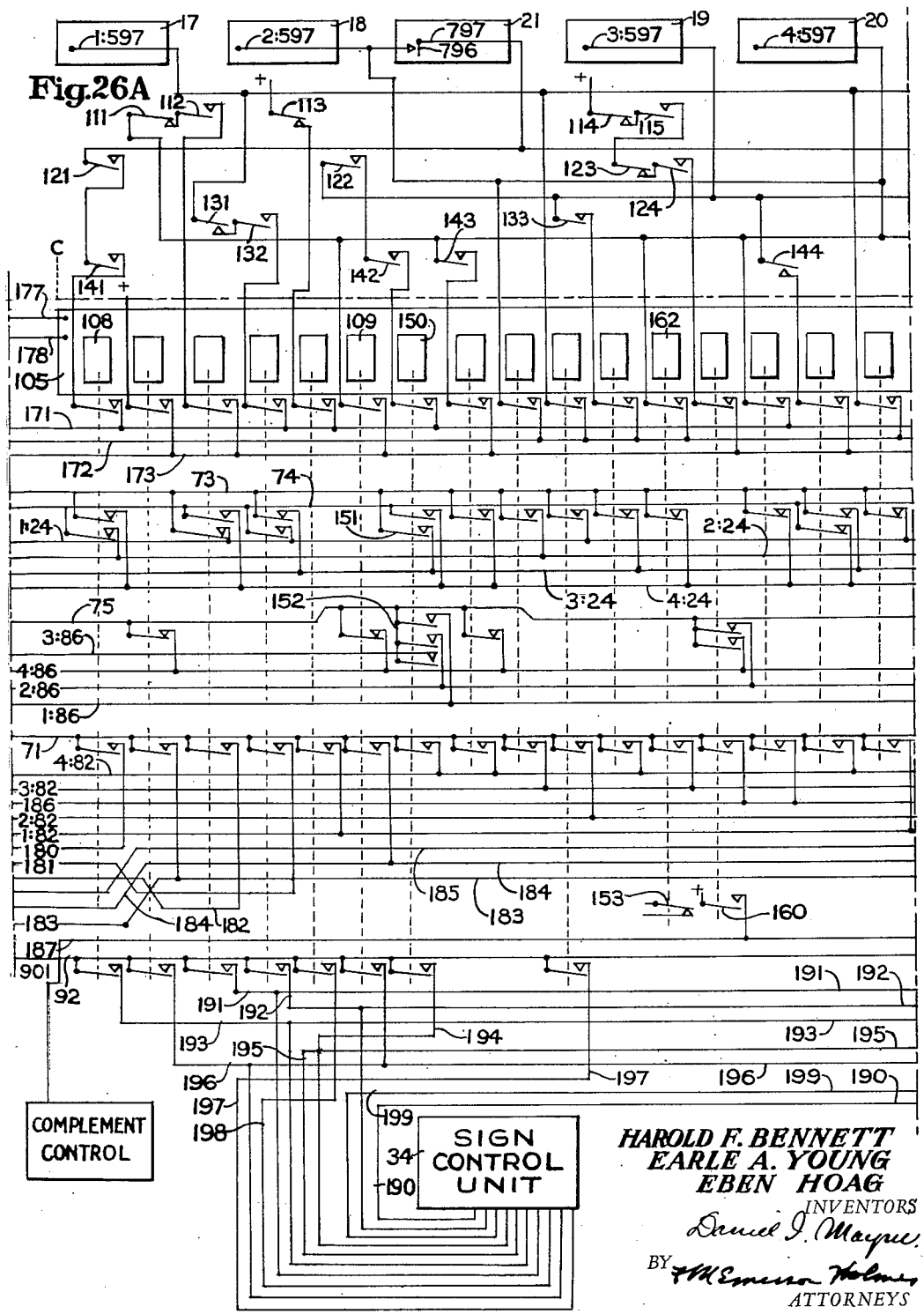

Sept. 8, 1953 H. F. BENNETT ET AL 2,651,458
AUTOMATIC SEQUENCE-CONTROLLED COMPUTER
Filed Jan. 24, 1951 26 Sheets-Sheet 17

HAROLD F. BENNETT
EARLE A. YOUNG
EBEN HOAG
INVENTORS
BY
ATTORNEYS

Sept. 8, 1953          H. F. BENNETT ET AL          2,651,458
                AUTOMATIC SEQUENCE-CONTROLLED COMPUTER
Filed Jan. 24, 1951                              26 Sheets-Sheet 18

*HAROLD F. BENNETT*
*EARLE A. YOUNG*
*EBEN HOAG*
           *INVENTORS*
BY
           *ATTORNEYS*

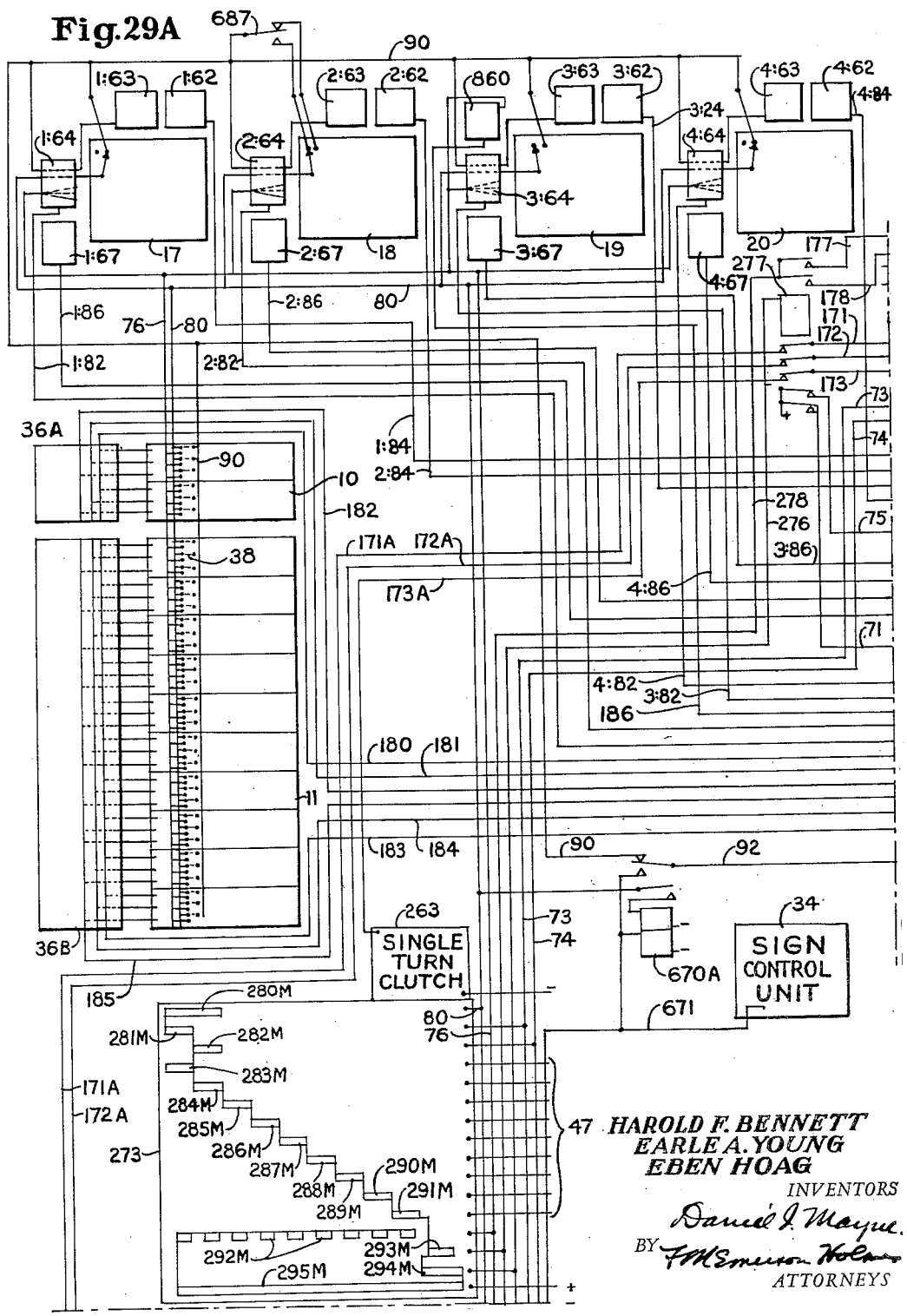

Sept. 8, 1953  H. F. BENNETT ET AL  2,651,458
AUTOMATIC SEQUENCE-CONTROLLED COMPUTER
Filed Jan. 24, 1951  26 Sheets-Sheet 20

HAROLD F. BENNETT
EARLE A. YOUNG
EBEN HOAG
INVENTORS

BY
ATTORNEYS

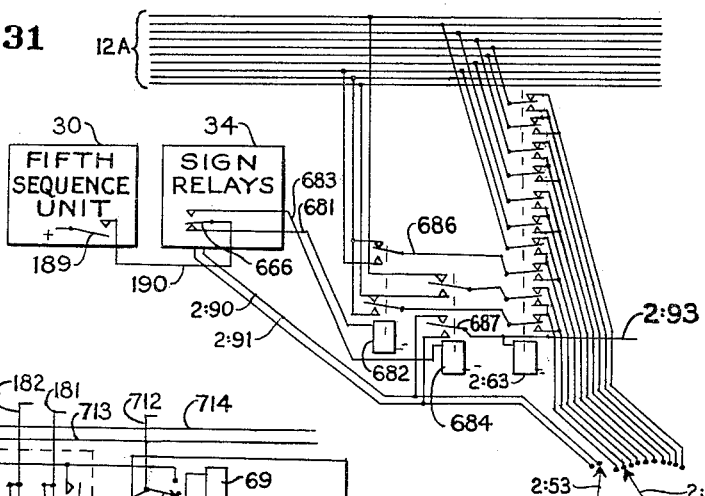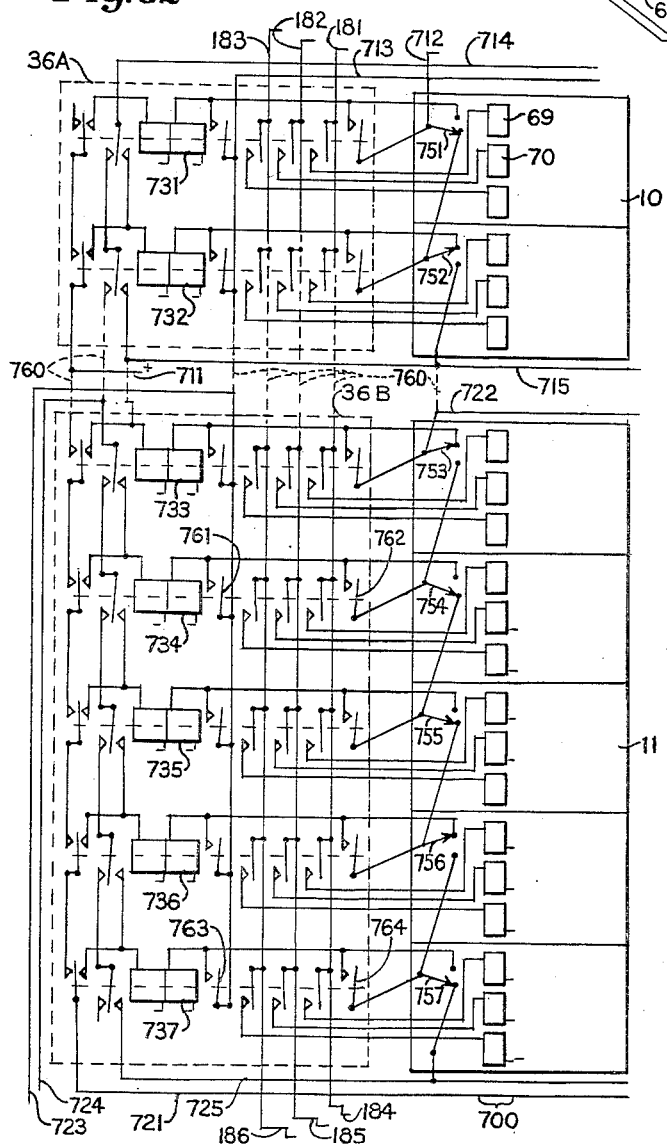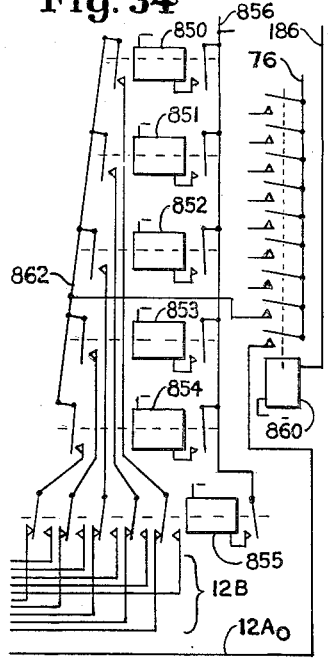

Sept. 8, 1953     H. F. BENNETT ET AL     2,651,458
AUTOMATIC SEQUENCE-CONTROLLED COMPUTER
Filed Jan. 24, 1951     26 Sheets—Sheet 23

HAROLD F. BENNETT
EARLE A. YOUNG
EBEN HOAG
INVENTORS

BY
ATTORNEYS

Sept. 8, 1953   H. F. BENNETT ET AL   2,651,458
AUTOMATIC SEQUENCE-CONTROLLED COMPUTER
Filed Jan. 24, 1951   26 Sheets-Sheet 24

HAROLD F. BENNETT
EARLE A. YOUNG
EBEN HOAG
INVENTORS
BY
ATTORNEYS

Sept. 8, 1953    H. F. BENNETT ET AL    2,651,458
AUTOMATIC SEQUENCE-CONTROLLED COMPUTER
Filed Jan. 24, 1951    26 Sheets-Sheet 25

| SIN U | (½)COS U | Q | (%)SIN I | COS I | (t)SIN I' | cos(U+I) | SIN(U+I) | COS I' | |
|---|---|---|---|---|---|---|---|---|---|
| | | | | | | | | | |

| SIN U | (½)COS U | Q | (%)SIN I | COS I' | (t)SIN I' | cos(U+I) | SIN(U+I) | COS I' | |
|---|---|---|---|---|---|---|---|---|---|
| | | | | | | | | | |

HAROLD F. BENNETT
EARLE A. YOUNG
EBEN HOAG
INVENTORS

BY
ATTORNEYS

Sept. 8, 1953     H. F. BENNETT ET AL     2,651,458
AUTOMATIC SEQUENCE-CONTROLLED COMPUTER
Filed Jan. 24, 1951     26 Sheets-Sheet 26

HAROLD F. BENNETT
EARLE A. YOUNG
EBEN HOAG
INVENTORS

Patented Sept. 8, 1953

2,651,458

UNITED STATES PATENT OFFICE 2,651,458

AUTOMATIC SEQUENCE-CONTROLLED COMPUTER

Harold F. Bennett, Earle A. Young, and Eben Hoag, Rochester, N. Y., assignors to Eastman Kodak Company, Rochester, N. Y., a corporation of New Jersey Application January 24, 1951, Serial No. 207,561

15 Claims. (Cl. 235—61)

This invention relates to automatic sequence digital calculating machines, that is to say calculating machines which automatically perform a predetermined sequence of several arithmetical operations and record the results.

It is the object of the invention to provide an automatic sequence calculating machine which is comparatively inexpensive to construct and service and which has a capacity adequate for many computing laboratories in which the volume of work is too small to keep a very large capacity machine busy.

It is also an object of the invention to provide a calculating machine having the following main components: a plurality of arithmetical units for performing the elementary arithmetical operations, storage units for storing numbers, an input for receiving data, an output for recording results, electrical means of transferring numbers between different parts of the machine, a control unit associated with each arithmetical unit for causing it to carry out a pre-arranged series of operations, a control unit for controlling the transferring and recording of numbers, and an overall control unit for coordinating the operations of the arithmetical units with the number transfer and recording operations and with each other.

It is a further object of the invention to provide an automatic sequence calculating machine in which the elementary arithmetical operations are performed by mechanical calculators of a commercially available type, and to provide electrical means of number entry and read-out cooperating therewith.

It is a particular object of the invention to provide an arithmetical unit for use as a component of an automatic sequence calculating machine wherein the elementary operations of addition (both positive and negative), multiplication and division are performed by a mechanical calculator of a commercially available type, and wherein products are electrically read out of a mechanical register after the completion of an addition or a multiplication and wherein quotients are accumulated on an electrical register and available for reading out therefrom during a division operation.

It is a further object of the invention to provide an improved relay sequence control system for controlling and coordinating concurrent operations by a plurality of arithmetical units in accordance with a predetermined schedule.

It is the object of one feature of the invention to provide an improved read-out means for reading out a number in a mechanical register, for storing the number, and for transmitting the number electrically over number circuits.

It is a special object of the invention to provide an automatic sequence calculating machine in which at least one arithmetical unit is adapted to compute square roots of numbers as described in a copending application Serial No. 207,562 by two of us, whereby triangulation problems can be computed without the necessity of storing tables of trigonometrical functions but rather by expressing angles in terms of their sines and cosines instead of their angular measure.

It is the object of the particular form of the invention described herein to provide a machine for automatically calculating the paths of light rays through optical systems and recording the important steps of the calculation. This particular form of the invention is intended to carry out a comparatively fixed routine of computing, but by slight modifications which will be pointed out in the course of the description it can easily be adapted to be plugged for a different sequence of operations at the option of the operator.

The preferred form of the invention is best described and most easily understood with reference to the accompanying drawings in which:

Fig. 1 is a schematic diagram of a preferred embodiment of the invention;

Figs. 2 and 3 are front and side views of the machine as a whole;

Fig. 2A is a detail showing a number storage panel;

Fig. 4 is a partial diagram of the number-transfer circuits and the number storage units;

Fig. 7 is a detail thereof showing a support for a standard type calculator;

Figs. 8 and 9 are top and side views of the solenoid assembly operating the keys of the standard calculator;

Figs. 10 and 11 are details thereof;

Fig. 19 shows the preferred power supply circuit;

Figs. 22, 23, 24 and 25 are circuit diagrams of the sequence control units associated with the arithmetical units;

Figs. 30 and 31 show details of the number transfer circuits omitted from Fig. 4 which are useful in converting cos I into (1—cos $I$) and cos V into (1+cos $V$) as scheduled;

Fig. 32 shows the circuit of the storage control unit;

Fig. 33 (on same sheet as Fig. 19) shows the circuit of the program control unit;

Fig. 34 shows a detail of the circuit of the square root computer described in a copending application;

General scheme

Figure 5:
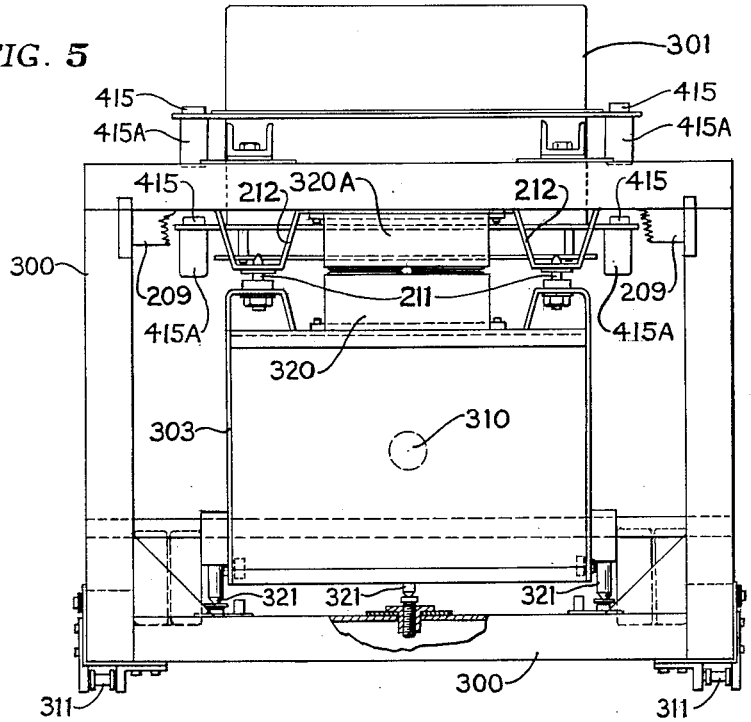
Figs. 5 and 6 are front and side views of the mechanical part of an arithmetical unit.

Fig. 1 is a functional diagram or flow chart, showing the principal parts of the machine, which are described very briefly as follows:

Ray data storage 10 and lens data storage 11 are conveniently made up of sets of 10-point manually operated dial switches, one set for each number stored, and a two-point switch associated with each set for storing the + or — sign of the number. The ray data storage stores the initial data (three numbers) of at least one ray striking a lens, and the lens data storage stores the data (three numbers) for each lens surface. In the ray tracing system described below the 3 ray numbers are sin U, Q, and cos U (giving the slope and height of the ray) and the three "surface" numbers are $$\frac{1}{R}, \frac{N}{N'}$$

and T (for the curvature, index ratio and distance to the next surface).

The number transfer trunks 12 are a group of 90 circuits for transferring nine digits at a time. This is the capacity for which the machine was designed. These trunks connect directly or through relay groups 35 and 55 to the number-transmitting parts of the machine and through sets of relays 13 to those number-receiving parts of the machine which receive all digits at once. They also connect through a set of bridging relays 14 to the printing trunks 15, which constitute a group of ten circuits which connect through relays 16 and 61 to those number-receiving parts which receive numbers one digit at a time.

The four arithmetical units 17, 18, 19, 20 are made up of commercial desk-type calculators somewhat modified and mounted so that the number keys and control keys are operated by electric solenoids, a special mechanism for reading out, storing, and transmitting the number in the product register, a group of control relays, and a frame for holding the parts in operative relationship. In the type of calculator shown and described herein, the main keyboard receives all the digits of a number at once, and the multiplier keyboard receives numbers one digit at a time.

The first arithmetical unit 17 also includes a special set of relays which constitute a quotient register 22 for reading out a quotient and transmitting it to the multiplier keyboard of the same machine. The specific routine of operations herein described calls for no other transmission of a quotient, but it would be an easy matter to connect the quotient relays directly to the printing trunks 15 as indicated by the broken line 15A in order to transmit a quotient anywhere.

The third arithmetical unit 19 includes a subroutine control and read-out device 23 for computing square roots of numbers and storing the square root on relays for transmittal. This is similar to but more complex than the quotient register, and is described in detail in a copending application, Serial No. 207,562, filed concurrently herewith by two of us.

The output unit 21 is conveniently a motor-driven typewriter, the keys of which are operated by solenoids. Such a typewriter is available commercially. This unit receives numbers a digit at a time, and also receives signals indicating the decimal point and an extra space between the third and fourth digit after the decimal point which makes the tabulated numbers easier to read.

The sequence control units 26, 27, 28, 29 and 30, are each made up of chains of relays. One unit is associated with each arithmetical unit, controlling the operations thereof, and the fifth unit controls the transferring of numbers and also the printing of numbers by the output unit 21. The several sequence units are interlocked by wires 31 to prevent any one unit from getting ahead at critical junctures. By critical junctures is meant those points in a schedule when a number to be transmitted from one arithmetical unit to another would be erased if that unit were allowed to continue to operate, or when a unit could signal prematurely that it is ready to receive a number. Each sequence control has stored in its instructions for an opening schedule and regular schedule. An overall program control 32 starts the opening schedule when the starting key 33 is closed, whereby ray data is transferred from ray data storage 10 to the scheduled positions in the machine, then runs through the regular schedule repeatedly, transmitting one set of lens data from storage during each regular schedule until the last of the lens data is used, whereupon it institutes a simple closing schedule (consisting only of a carriage return on the typewriter) to follow the regular schedule. As long as there is another set of ray data stored, the program control then starts the opening schedule again for the new set of ray data and repeats the above steps, until all the stored ray data is used up, whereupon it stops the machine at the close of the next closing schedule. The branched line 40 symbolizes the control of the sequence units by the program unit, and the line 49 symbolizes the stopping of the machine when the complete routine is finished. It may be noted that in the specific form herein disclosed the closing schedule is optional and that the problem is completely computed before the closing schedule begins.

A special set of sign control relays 34 receives the stored plus and minus signs of the stored data (via wires not shown in Fig. 1) and receives signals via wires 41 when an arithmetical unit has overdrafted. In accordance therewith it controls via wires 42 whether a number is to be added or subtracted and whether two numbers are to be subtractively or additively multiplied. It also controls the printing of numbers by the output unit whereby the numbers are recorded as positive or negative, and in a special case it controls via wires 43 and relays 55 whether or not an overdraft in the second unit is to be rectified. Ordinarily, a number is always rectified when transmitted from an arithmetical unit which has overdrafted.

The fifth sequence control 30 sends signals via wires 44 to select which of the relays and relay groups 13, 16, 55, 56 are to be operated thus determining from which number-transmitting unit the number is to be transmitted and in which keyboards it is to be received, during each number transfer and signals the transfer control unit 24 via wires 45 when the number is ready to be transferred, and what type of transfer is to take place. The latter unit operates relay 61 when a "printing" transfer is called for.

The number transfer control 24 is a sub-routine control governing the details of each number transfer by signals over wire-groups 44, 47, and it signals the sequence unit 30 via wire-group 46 when the routine is completed. There are three separate routines: (1) When all digits are received at once, (2) when one digit is received at a time but without printing, and (3) when the number is printed. It is sometimes convenient to think of this unit as a part of the fifth sequence control unit 30.

The storage control unit 36 is a split chain of relays which control the storage units 10 and 11 via wire group 48 so that the numbers are transmitted therefrom in proper sequence.

The power supply 25 provides A. C. for the motors and D. C. for the relays and solenoids. The D. C. supply should have sufficient power rating to operate about 12 keyboard solenoids and two operating solenoids simultaneously without dropping below a safe operating voltage and preferably comprises two full-wave rectifiers. One side of the D. C. power supply is connected directly to the solenoids and relay coils and the other side is grounded. All the switching is done between the solenoid or relay coil and ground. This arrangement is common practice in telephone systems and makes maintenance work safer. In the wiring diagrams shown in the drawings, many wires to or from the power supply are omitted, only a short length of wire and a + or − sign being shown. This simplifies the drawings considerably. It is to be noted that the + pole of the power supply is grounded, and the − side is the "hot" side.

Figure 12:
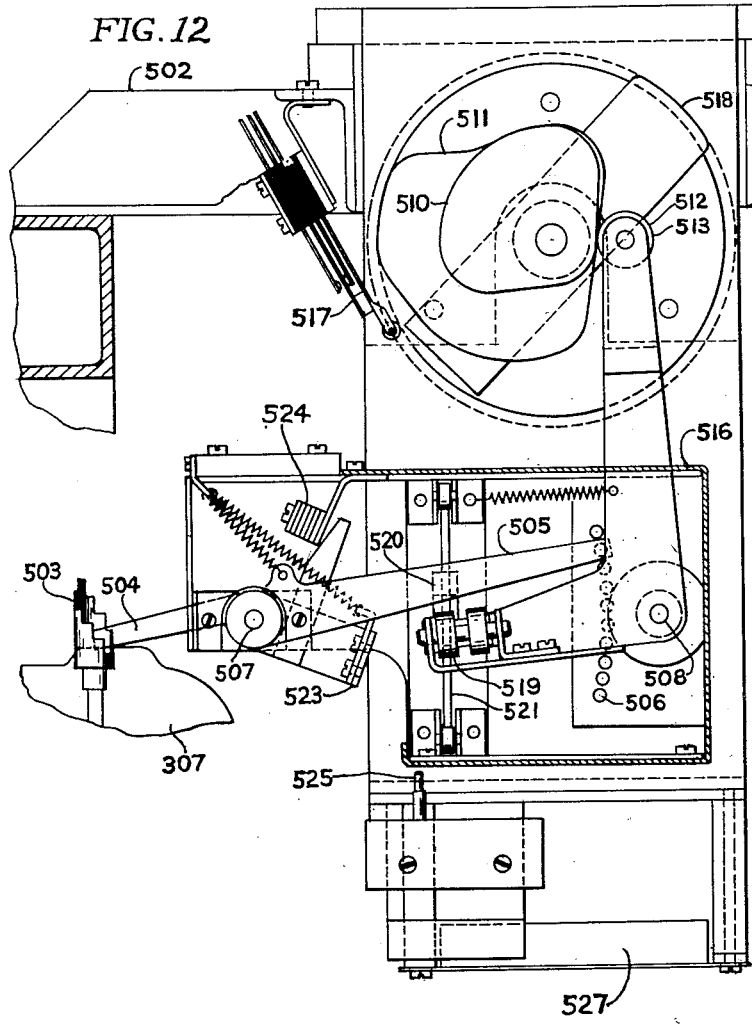
Figs. 12 and 13 are side and partial front views of the read-out mechanism.
Figure 13:
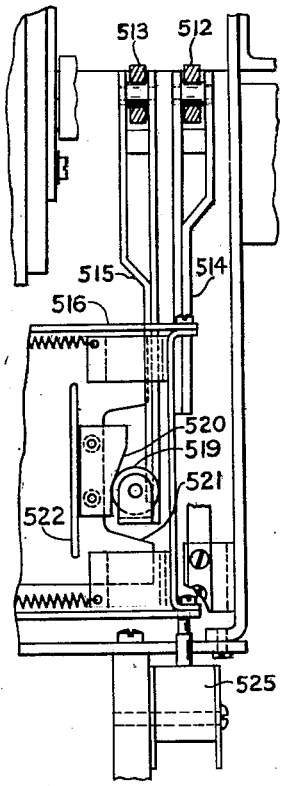
Figure 14:
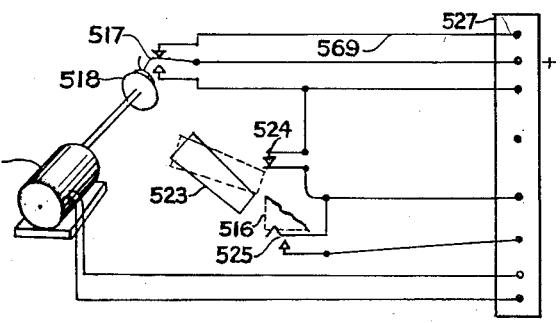
Fig. 14 shows the electrical connections to the read-out mechanism.
Figure 15:
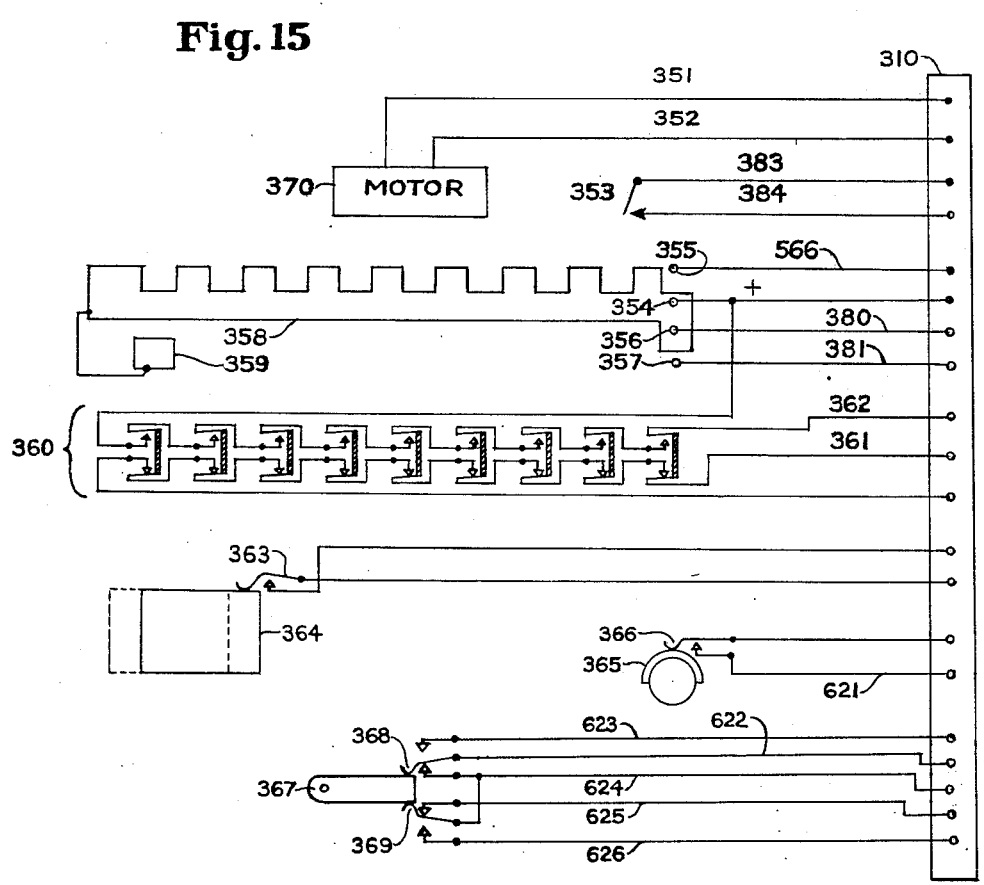
Fig. 15 shows the modifications of the standard calculator and the electrical connections thereto.
Figure 16:
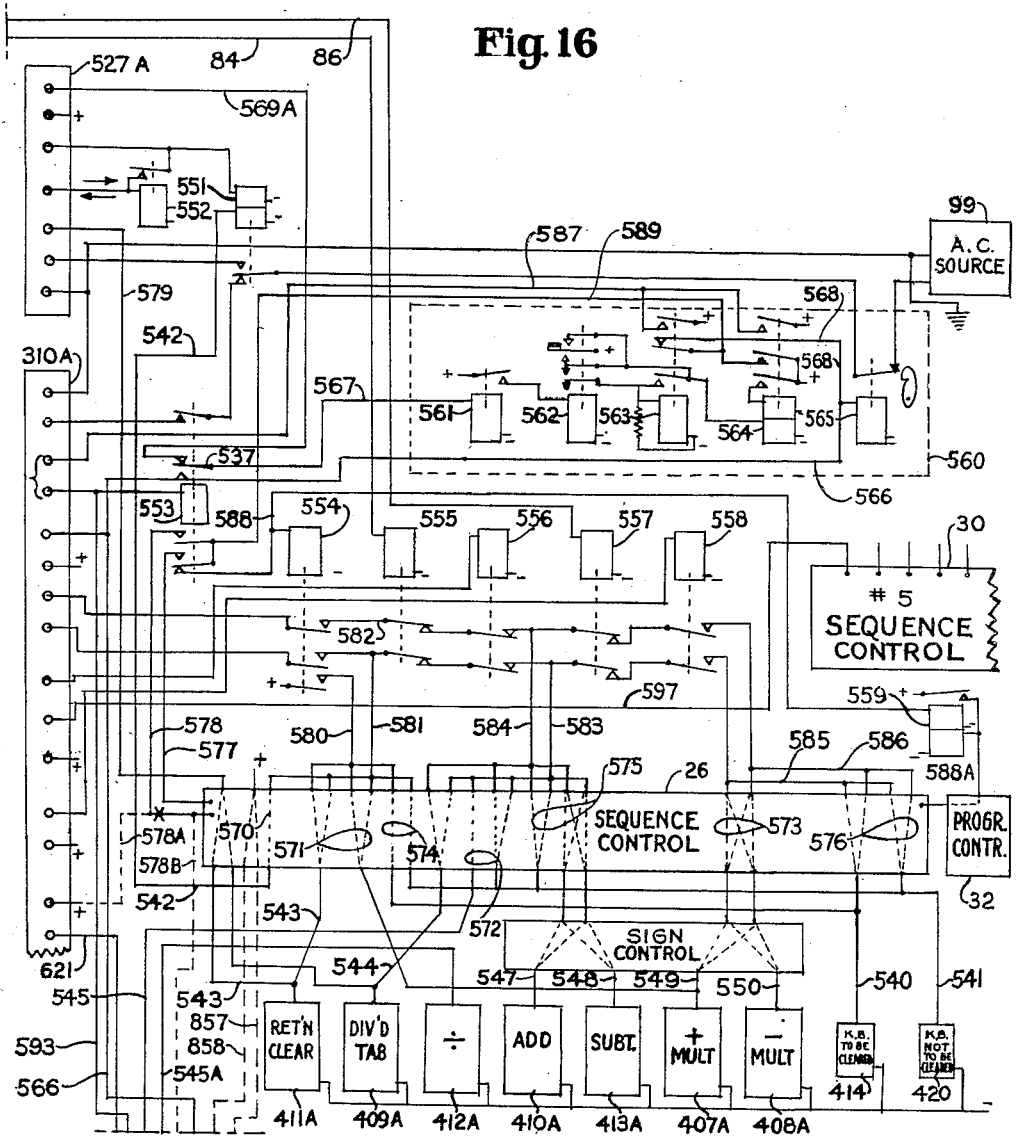
Figs. 16 and 17 show the electrical circuit of an arithmetical unit for adding, subtracting, multiplying.
Figure 17:
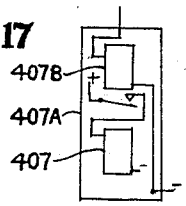
Figure 18:
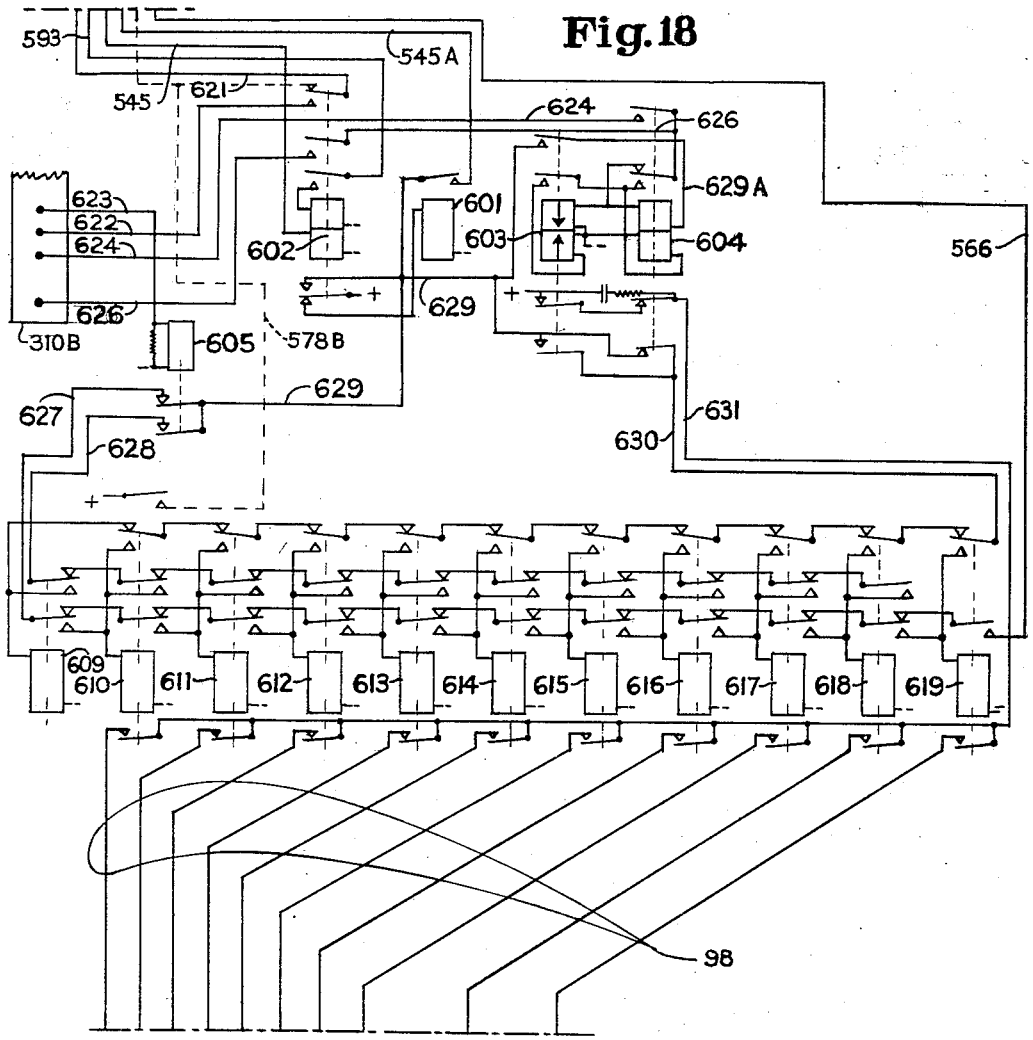
Fig. 18 shows the additional electrical circuit in an arithmetical unit which is also adapted to divide.
Figure 26:
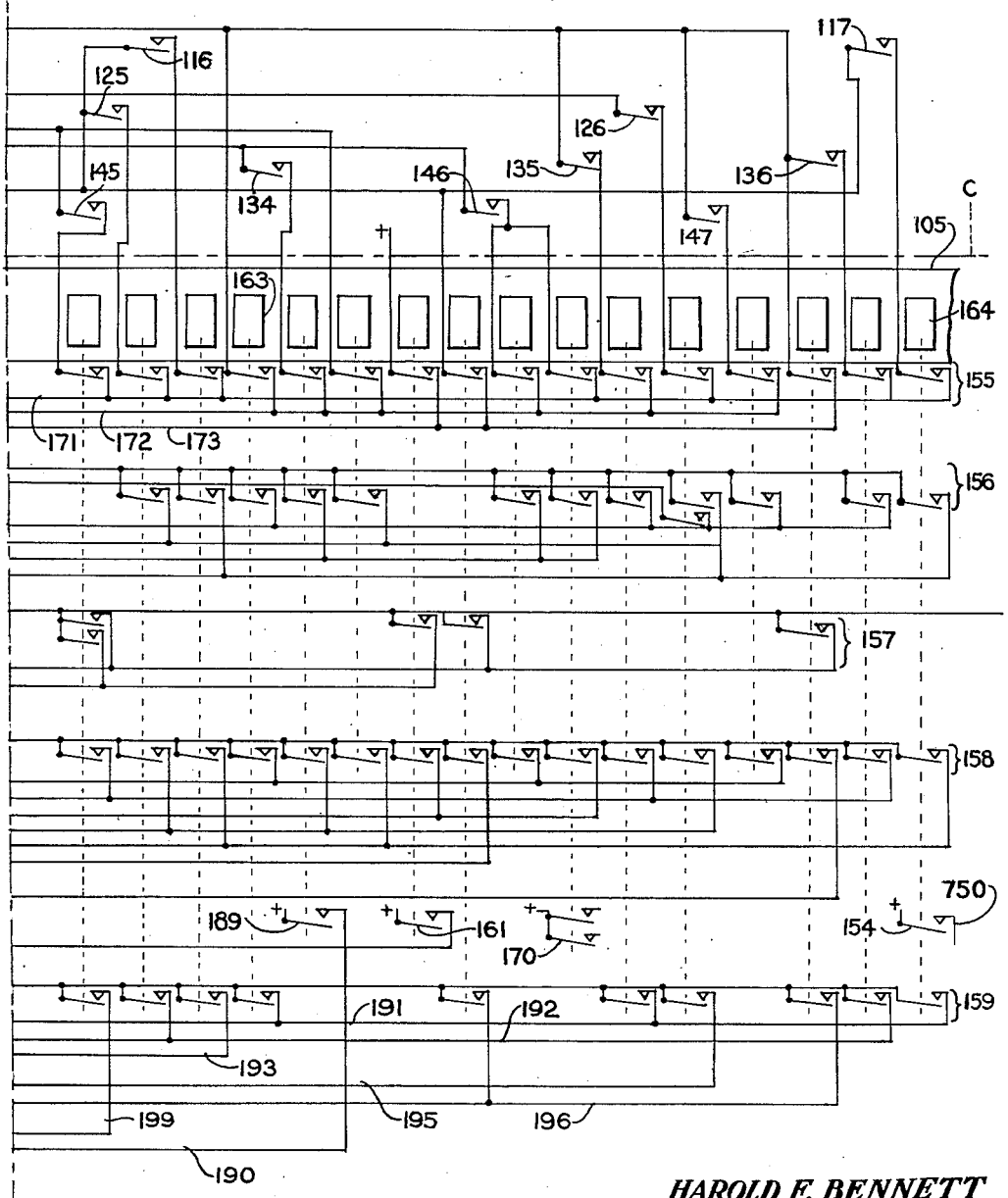
Fig. 26 (in two parts 26A and 26B) is a circuit diagram of the sequence control unit controlling the transferring and printing of numbers.
Figure 29B:
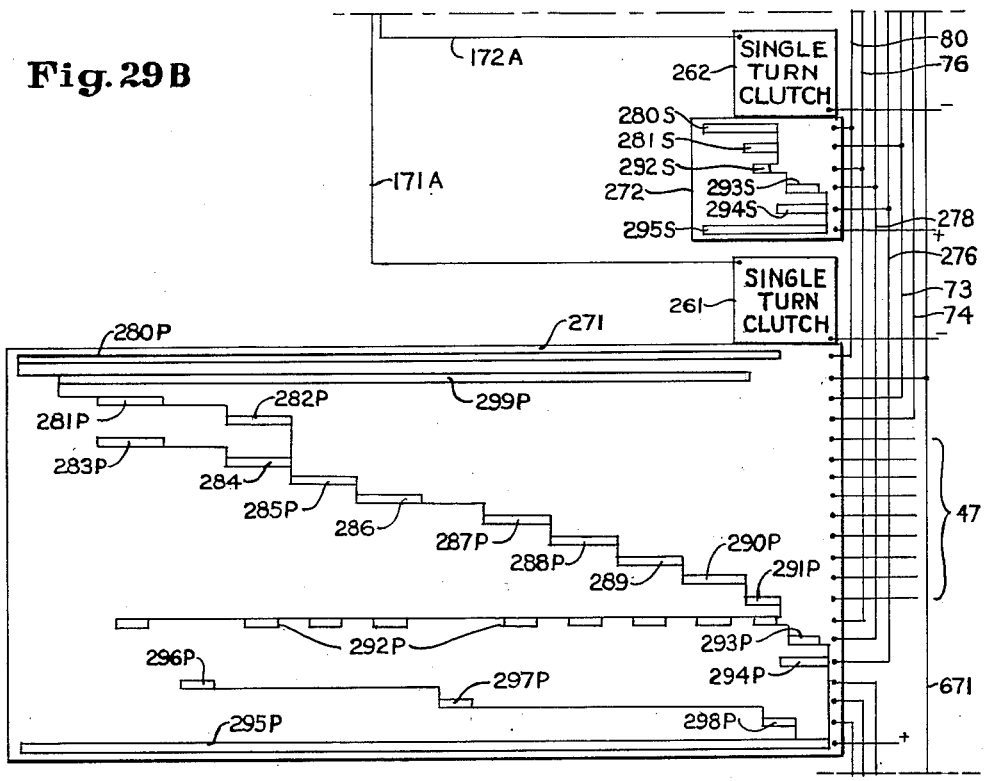
Fig. 29 (in two parts 29A and 29B) shows the circuit of the number transfer control unit.
Figure 35:
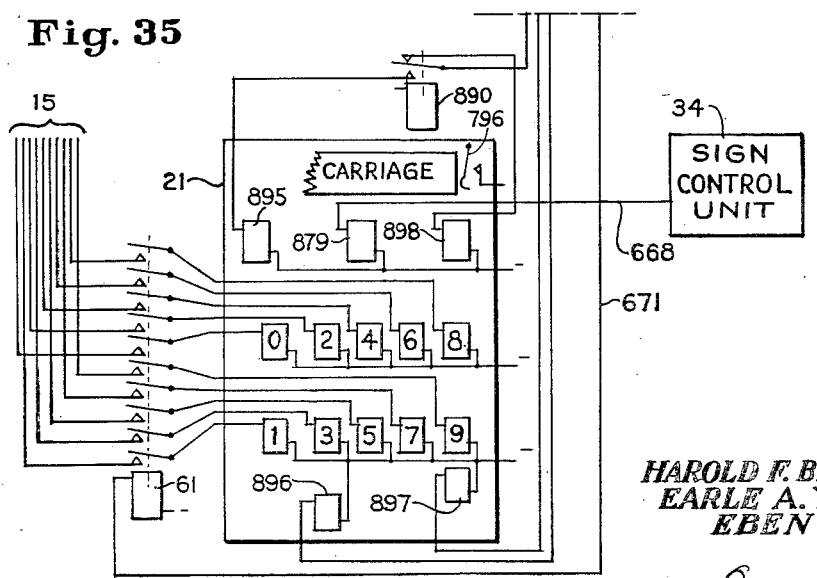
Fig. 35 (on the same sheet as Fig. 29B) shows the circuit of the output unit.
Figure 30:
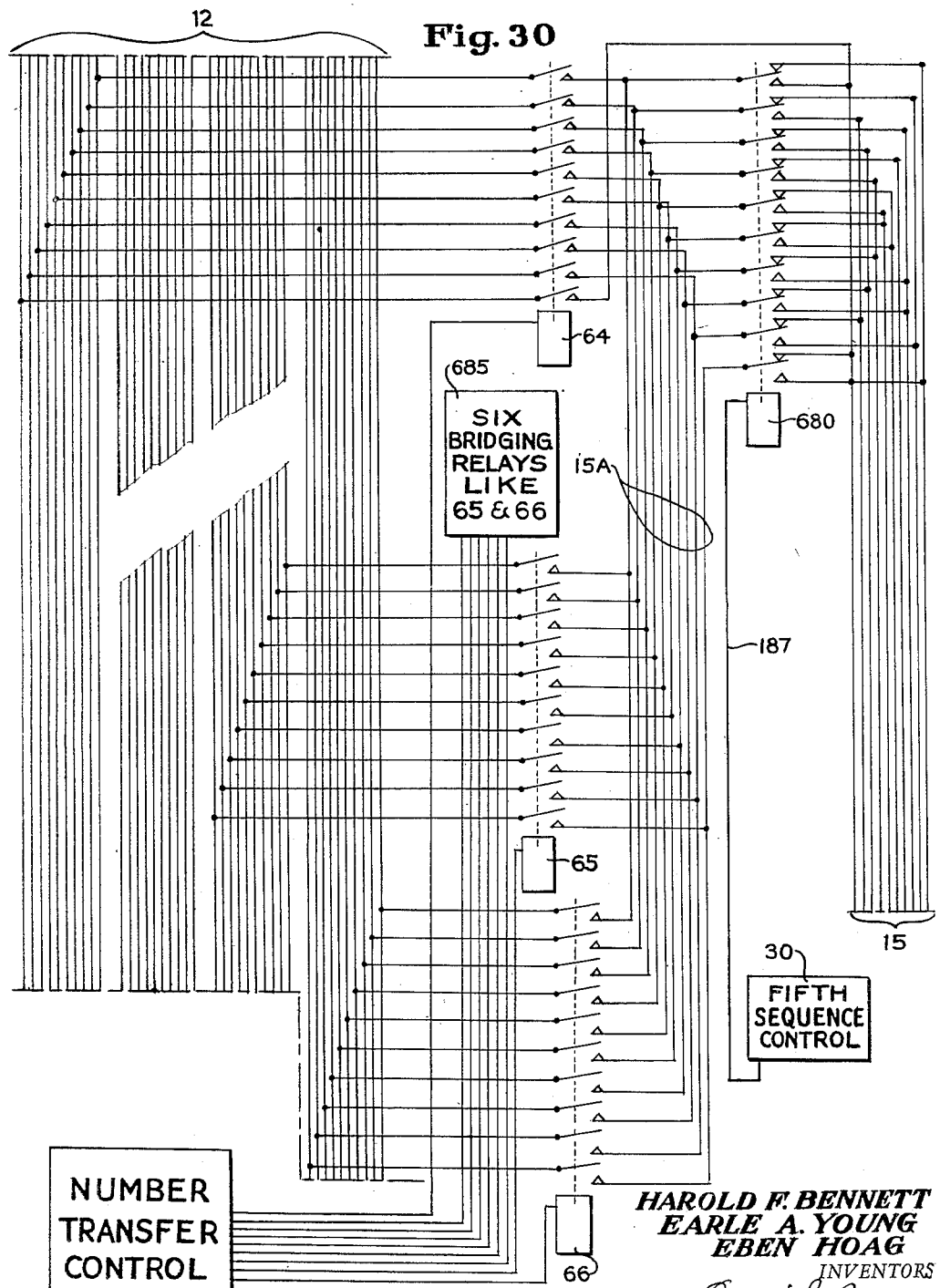
Figure 36:
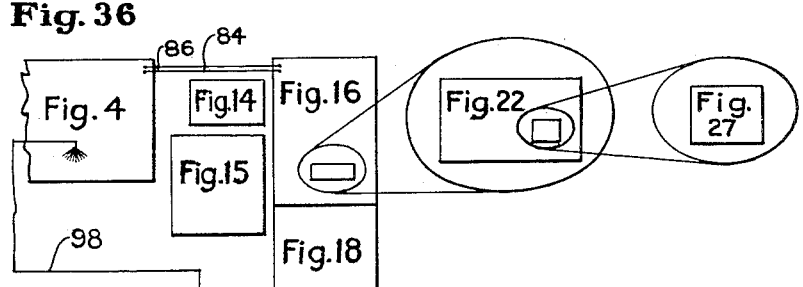
Figs. 36 to 39 are diagrams showing how the detailed figures are arranged and combined to give the complete circuits of the arithmetical units and units associated therewith.
Figure 37:
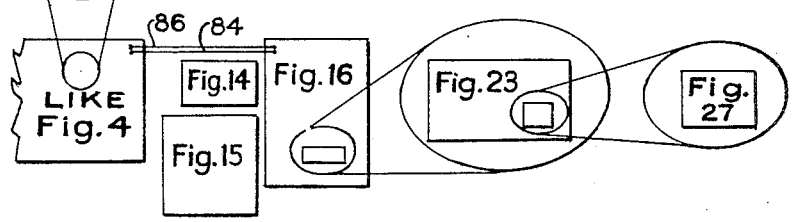
Figure 38:
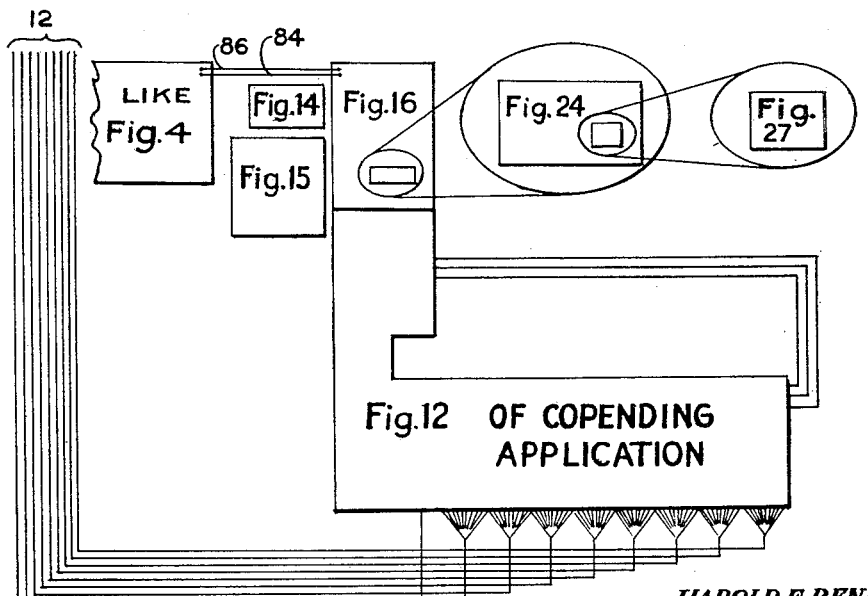
Figure 39:
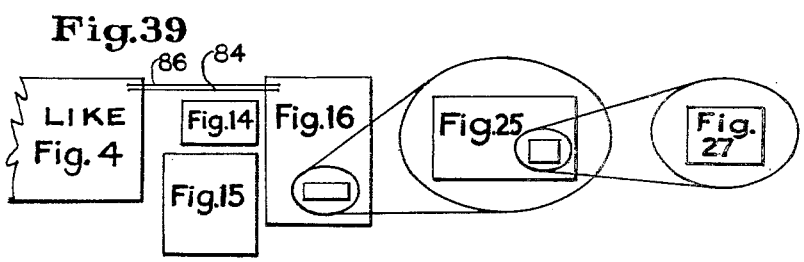

It is to be noted also that Fig. 1 is intended to show the general organization of the machine for easy understanding of the general operation. References to subsequent figures for the details will show that in actual practice some of the connections are perhaps more complicated, but details irrelevant to a general understanding have been omitted from Fig. 1. The correspondence with detail figures is shown in the following table, starting with the unit in the upper left corner of Fig. 1 and proceeding in vertical columns:

| Reference Nos. | Description | Principal Showing |
|---|---|---|
| 25, 33 | Power supply and starting switch. | Fig. 19. |
|  | Data storage— |  |
| 10, 11 | Layout. | Figs. 2, 2A. |
|  | Connections to Number Trunks. | Fig. 4. |
| 36, 48 | Storage Control. | Fig. 32. |
| 24 | Number Transfer Control. | Fig. 29. |
| 47 | Wire group from unit 24 to unit 14. | Fig. 30. |
|  | Bridging Relays. | Figs. 4 and 30. |
| 14 | Relay for transmitting complement of Cosine. | Fig. 30. |
| 12, 15 | Number trunks. | Fig. 4. |
| 13 | Keyboard trunking relays. | Fig. 4. |
| 35 | Rectifying relays and transmitter selector relays. | Figs. 4, 29. |
| 16 | Multiplier keyboard trunking relays. | Fig. 4. |
| 44 | Keyboard and transmitter selector wire group. | Figs. 26, 29. |
| 55 | Special rectifying relays. | Fig. 31. |
| 56 | Special Square root selector relays. | Fig. 34. |
| 61 | Printer trunking relay. | Fig. 35. |
|  | Arithmetical unit No. 1. | Fig. 36. |
|  | Mechanical framework. | Figs. 2, 3, 5, 6, 7. |
|  | Solenoids. | Figs. 8, 9, 10, 11. |
| 17 | Read-out and transmitter. | Figs. 12, 13, 14. |
|  | Number trunk connections. | Fig. 4. |
|  | Operational connections. | Figs. 15, 16. |
|  | Operational relays. | Figs. 16, 17. |
|  | Quotient register. | Fig. 18. |
| 22 | Arithmetical unit No. 2. | Fig. 37. |
|  | Like the No. 1 unit but with quotient register omitted and with the change in connections shown in. | Fig. 31. |
| 18 |  |  |
| 19 | Arithmetical Unit No. 3. Like the No. 1 unit except that the quotient relays are replaced by: | Fig. 38. |
| 23 | Square root relays shown in co-pending application and: Relay storage associated therewith. | Fig. 34. |
| 20 | Arithmetical Unit No. 4. Like the No. 1 unit with quotient register omitted. | Fig. 38. |
| 21 | Output unit. | Fig. 35. |
| 32, 49 | Program control relays and Wires for turning off power. | Figs. 19, 33. |
| 40 | Signal wires to and from program control. | Fig. 33. |
| 26 | First Sequence control unit. | Fig. 22. |
| 27 | Second Sequence control unit. | Fig. 23. |
| 34 | Sign control unit. | Fig. 27. |
| 41 | Afferent sign control wires 90, 92, 190–199. These actually go via the fifth sequence control unit 30. | Figs. 4, 26, 27. |
| 42 | Efferent sign control wires controlling arithmetical operations and printing of plus and minus numbers. These wires actually go via the first four sequence control units 26–29 except for wire 663. | Figs. 27 and 22 to 25. |
| 43, 55 | Special rectification control wire and relays. | Fig. 31. |
| 28 | Third sequence control unit. | Fig. 24. |
| 29 | Fourth sequence control unit. | Fig. 25. |
| 26, 27, 28, 29 | The manner of connecting the sequence control units to the arithmetical units is shown in. | Fig. 16. |
| 30 | Fifth sequence control unit. | Fig. 26. |
| 31 | Interlock between five sequence units 26–30 and sign control unit 34. This consists of guard circuits including switches 111 to 119, 121 to 126, 131 to 136, 141 to 149, and 153. Each of these switches is shown twice in Figs. 22 to 27, once in position relative to the relay coil which actuates the switch, and again in another figure to show the wires connecting with it. |  |

| PARTS NOT SHOWN IN FIG. 1 (PARTIAL LIST) | | |
|---|---|---|
| 98 | Wire group connecting quotient register to multiplier keyboard solenoids. | Figs. 4, 18. |
| 90, 92 | Wire from storage units 10, 11 to sign control unit 34 via fifth sequence unit 30. | Fig. 33. |
| 76, 80 | Wires from Number transfer control to energize transmitter selected by Fifth sequence control 30. | Figs. 4, 29. |

Fig. 2 is a general front view and Fig. 3 is a side view of the machine. It consists of six sections. The two at the left 201, 202, make up the data storage (one panel of which is shown in more detail in Fig. 2A) and the storage control relays 36 associated therewith. The center two sections 203, 204 are cabinets with heavy frames 207 supporting the mechanical parts of the arithmetical units 17A, to 29A. The two at the right 205, 206 are panels supporting the majority of the relays. The arithmetical units roll on rails 208 to facilitate removal for servicing. The wires to these units are connected through gang jacks and plugs 209 for easy connection and disconnection. The several sections are connected by cables of about two hundred wires (not shown in Figs. 2 and 3).

There are twelve panels in the data storage. Two panels 10A, 10B make up the ray data storage 10 and ten panels 11A to 11J make up the lens data storage 11. More may be added if it is desired to compute longer problems. One panel 11J is shown in more detail in Fig. 2A. Each panel includes twenty-four ten-point dial switches 37 for storing three eight-digit numbers, three two-point toggle switches 38 for storing the corresponding + and − signs, and one switch 39 for switching the panel in when it is to be used on a particular problem and out when it is not to be used.

*Number storage and transfer means*

Fig. 4 is an explanatory diagram of the number-transfer circuits. Circuits are shown for handling three-digit numbers. In the actual machine, eight-digit numbers are stored in the two storage sections 10, 11, nine-digit numbers are carried during the course of the computation, and eight-digit numbers are printed by the output unit 21.

Thirty of the ninety number transfer trunks 12 are shown as vertical lines with branches connecting with the several parts of the machine. One arithmetical unit 17 is shown in the dot-dash rectangle at the lower right. Only the parts of the arithmetical unit which receive numbers or transmit numbers and + or − signs are shown in this figure. These include the main keyboard solenoids 52, the multiplier keyboard solenoids 51, the quotient register 22, the internal storage switches 50 and the overdraft indicating switch 53 associated therewith. The solenoids are labeled to indicate the digit which each is adapted to receive. All the trunks 12 are connected via a gang of relays 62 (which constitute the trunking unit 13 of Fig. 1) to the keyboard solenoids 52 when they are energized through wire 84. All the trunks 12 are also connected via relays 63 (which with relay 68 constitute the connecting unit 25 of Fig. 1) to the internal storage switches 50 associated with the read-out means. These connections are normally maintained over the several back contacts of these relays to transmit the last number read out, and when these relays are energized via wire 93 when an overdraft occurs these connections are changed over to the front contacts of relays 63 to rectify the overdraft, that is to transmit the complement of the last number read-out instead of the number itself. No provision has been made for the "fugitive one." It appears simpler and more accurate to provide for transmitting the ninth digit during the computation than to transmit only eight and correct for the "fugitive one." The trunks 12 are to be understood to extend downward from the bottom of the figure and to have branches connecting similarly with the other arithmetical units 18, 19, 20, except as shown in Fig. 31.

The ten printing trunks 15 are shown at the right of the main trunks 12. The two groups of trunks 12, 15 are connected by nine bridging relays (corresponding to the bridging unit 14 of Fig. 1) of which three 64, 65, 66 are shown. That is, there is a bridging relay for each digit and since Fig. 4 shows only three digits, only three bridging relays are included.

The bridging relays operate in succession when energized via wires 87, 88, 89 under the control of the number transfer control unit 24 to connect the printing trunks 15 successively with the three groups of number transfer trunks 12 (nine groups in the complete machine) for transmitting or printing a number a digit at a time. These are shown more completely in Fig. 30. The printing trunks are connected via the multiplier trunking relay 67 (constituting the trunking unit 16 of Fig. 1) to the multiplier keyboard solenoids 51 when this relay is energized via wire 86 under the control of the fifth sequence control 30. The trunks 15 are to be understood to extend downward to connect with the other arithmetical units 18, 19, 20 and the output unit 21 via similar relays, relay 61 connecting the output unit being shown in Fig. 35.

In the first arithmetical unit only, the quotient register relays 22 are connected to the multiplier keyboard solenoids 51 by ten wires 98 as shown. The quotient register will be described in detail in connection with Fig. 18.

The transmitter selecting relay 68 is energized via wire 82 when a number is to be transmitted from the internal storage switches 50, then overdraft indicator switch 53 is energized via wire 89. In case switch 53 stands in the overdraft position as shown, wire 90 is energized and signals the sign control unit 34. It also energizes the rectifying relays 63 via the top switch of relay 68 except in the special case described relative to Fig. 31. After relays 63 have time to operate, the internal storage switches 50 are energized via wire 76 to transmit the number. The timing of all these steps is under the control of the number transfer control unit 24.

Figure 27:
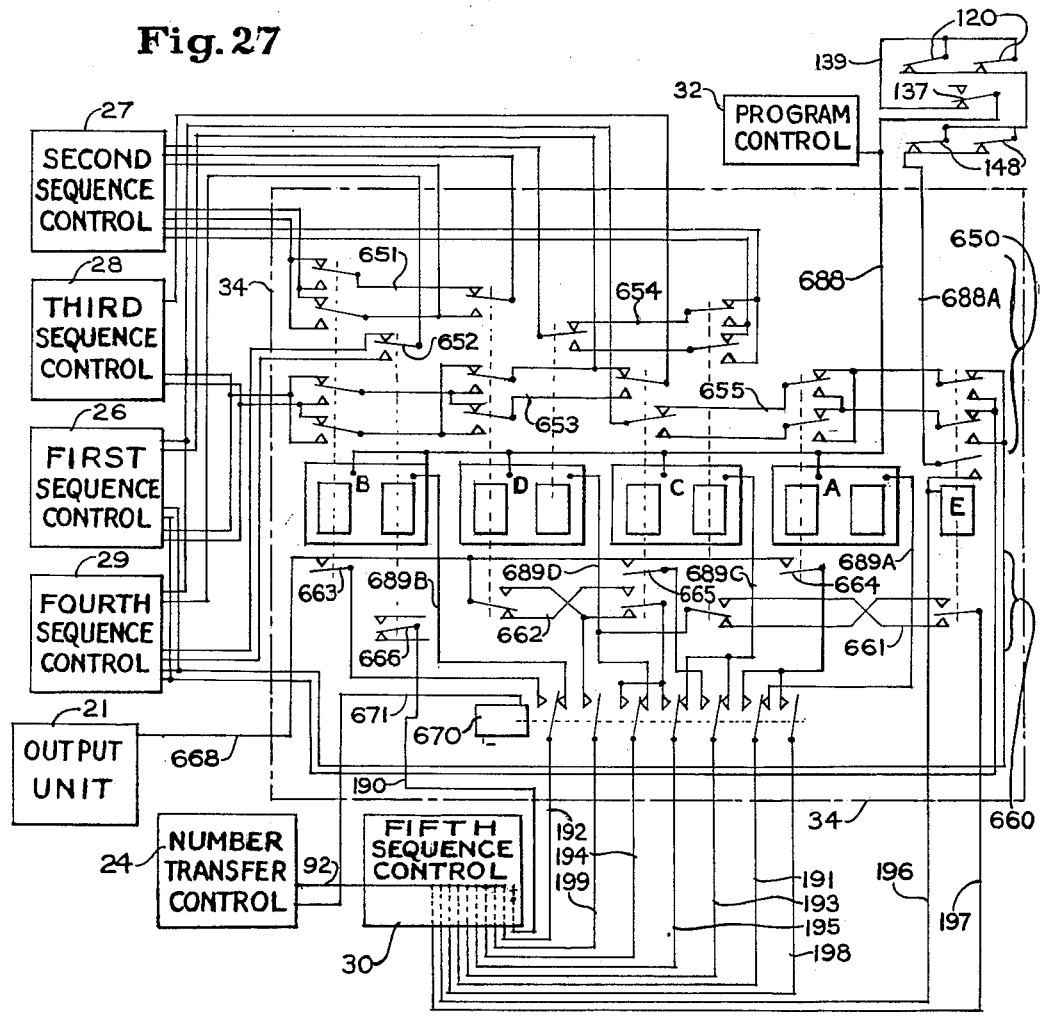
Figs. 27 and 28 show the circuit of the sign control unit and a detail thereof.

The sign control unit 34 is shown in more detail in Fig. 27, and the wires thereto are not exactly as shown in Fig. 4.

As mentioned with reference to Fig. 2, the data storage units 10, 11 together comprise thirty-six groups of eight manually operated ten-point switches 37 for storing thirty-six eight digit numbers. Four of these ten-point switches are shown within the dot-dash rectangle 10 at the left in Fig. 4. Eighty of the ninety number trunks 12 (including twenty of the thirty shown) branch to the left and connect with the points of these switches 37, and the zero wire $12I_0$ of the last digital group connects with switches of relays 69, 70, etc. To transmit a number from a data storage unit, one of the thirty-six selection relays (of which two, 69 and 70 are shown) is energized as described with reference to Fig. 32, below, connecting the center points of the switches 37 in the selected group with wire 76 and the center point of switch 38 with wire 80 and connecting the zero-transmitting wire $12I_0$ of the right-hand group 12I of the number trunks 12 with wire 76. Wires 80 and 76 are then energized under the control of the number transfer control unit 24 to transmit the sign and the number, respectively, after which the selection relay is relaxed. Thus the stored eight-digit number is transmitted with a zero annexed on the right.

It is to be understood that the number trunks 12A and 12H, the zero wire 12Io and the sign trunk 99 extend downward to connect similarly with the switches in the other groups in storage units 10 and 11.

The storage control unit 36 selects which of the panels of three numbers is to be used and the fifth sequence unit 30 selects which of the three transmitting relays in the panel is to be operated each time so that the numbers are transmitted from storage in the proper sequence. It may be noted that the distinction between the ray data storage 10 and the lens data storage 11 is not in the wiring of the ten-point switches to the number trunks but is in the wiring of the storage control unit 36. The "in-out" switches 39 shown in Fig. 2A are omitted from Fig. 4, and are described along with the storage control unit with reference to Fig. 32.

The control of the transmittal of a number by the fifth sequence control unit 30 and the number transfer control unit 24 is roughly as follows. The sequence unit closes selected ones of the possible paths through it, some of which are indicated in Fig. 4 by broken lines, and signals the number transfer control via wire-group 45 that it is ready and that each arithmetical unit involved is ready and directs which of the three types of transmittal is to occur. Some of the paths leading to the other arithmetical units are indicated by truncated connections at the top of unit 30. The number transfer control unit applies + (positive) voltage to the several wires controlling the transmittal by closing the alternative paths therethrough, indicated by broken lines, in accordance with a pre-arranged time pattern to effect the transmittal. This number transfer control unit and the time patterns will be described in more detail with reference to Fig. 29.

*Arithmetical unit*

As mentioned in connection with Fig. 2 and as will be described in connection with Figs. 5 to 15, the present invention employs one or more electrically driven, key-set, mechanical calculators. Such calculators are commonly supplied by various manufacturers.

The present invention can, in general, employ any key-set, mechanical calculator, but the arrangement of parts will depend on the particular one chosen. For example, the keyboard arrangements differ from one manufacturer's product to another and the solenoids to punch the keys must be correspondingly arranged. The clearest understanding of the present invention will obviously come from a description of an embodiment applied to one particular well known machine. Therefore we have chosen to describe our invention as applied to a Friden Model ST-10 with a complete carry over. It is to be understood however that the invention is not limited to any particular calculator. In the embodiment of the invention applied to ray tracing, we use four or five Friden machines (depending on the extent of the schedule of operations, specifically on whether astigmatism is computed along with the ray trace).

We shall not describe details of the application of the invention to other calculators since the necessary modifications merely depend on having the parts arranged to correspond to the particular calculator used. For example all machines of the Thomas type (which dates back nearly two hundred years) are similar to the Friden, but even those having their read-out dials coaxial instead of juxtaposed merely require radial cams and slightly differently shaped levers from those described herein (Figs. 12 and 13) relative to the Friden read-out system. In fact there is one detail on some early Friden ST-10 machines which is preferably modified. Specifically the machine should (as present standard models do) have complete carry over. The invention can allow for the absence of complete carry over or the latter feature can be included in the machine as Friden have done on some ST-10 machines. The latter is preferable. Also, since the present Friden Model STW-JF has complete carry over and has the same keyboard arrangement and size as the ST-10, the following description applies equally well to the STW-JF although we actually use ST-10 machines in our instrument, or an experimental model known as the E213B.

Since one machine must be chosen in order to describe the invention fully we have chosen the above mentioned Friden model. It is repeated however that the invention is not limited by this choice which relates only to one detail (a known detail) of the overall combination. The present invention lies in the combination of this detail with various other mechanisms.

Figure 6:
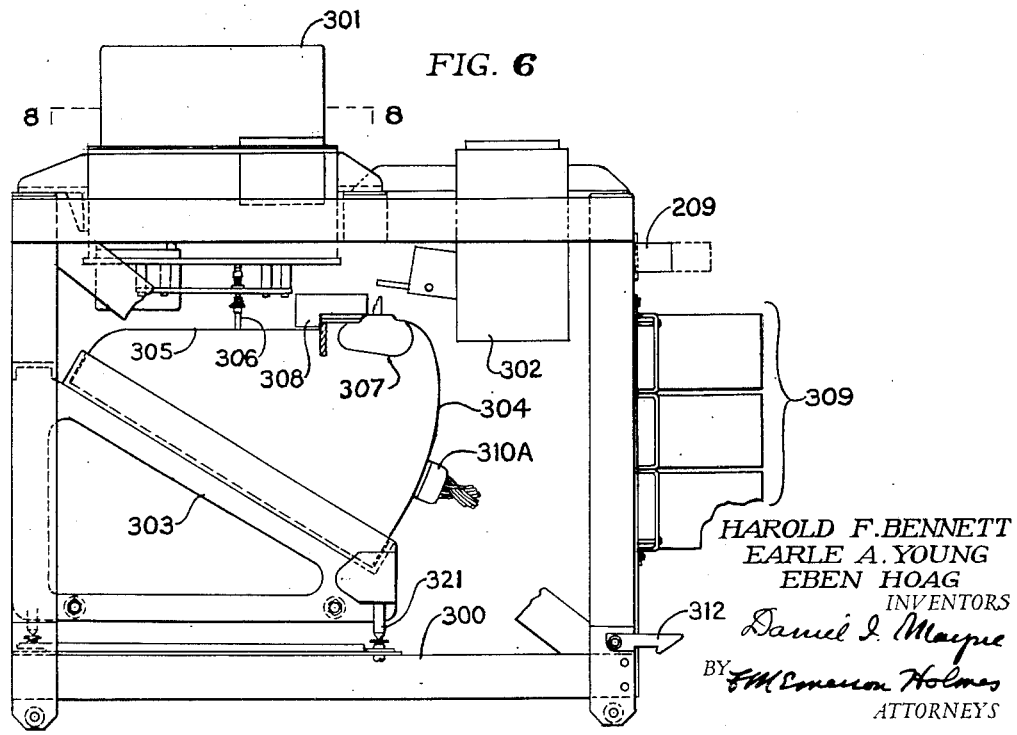

Figs. 5 and 6 show general front and side views of the mechanical parts of an arithmetical unit. A rectangular frame 300 supports the solenoid bank 301, the read-out mechanism 302, and the tilted platform frame 303 which in turn supports the commercial type calculator 304 with its keyboard 305 level. Only one key 306 of the keyboard is shown in this view. Supported over the "upper" edge of the keyboard and the "lower" half of the carriage 307 is a box of switches 308 which signal when the keyboard is full, when it is empty, when the carriage is in one of two required positions, and when the carriage shifts. The circuits and functions of these will be described in connection with Figs. 15 and 16. The wires from these switches and other switches (to be described) inside the calculator are brought to a gang jack 310 into which a corresponding plug 310A is inserted when the calculator is put into position.

Also mounted on the frame 300 are racks 399 of relays, including the trunking relays 62, 67 and rectifying relays 63 of Fig. 4.

The frame 300 is supported by rollers 311 which roll on rails 208 already mentioned. It is held from rolling out of the operating position by the latch 312.

Fig. 7 (on the same sheet as Fig. 2) shows in more detail the tilted platform support 303. This is supported by three pointed legs 321 resting on leveling pads in the bed of the frame 300 (Figs. 5 and 6) and located by two dowels 211 which fit into holes in brackets 212 fixed to the frame 300. These legs are provided with racks upon which the frame 303 is raised and lowered by cog wheels 322 turned by handle 323, lever 324 which latches in the raised (operating) position, and link 325. The gang plug 310A which plugs into the calculator is wired to the gang plug 320 mounted on top of the tilted platform frame. To place the calculator 304 (see Fig. 6) in operating position it is placed on the tilted platform 303 and the plug 310A inserted. The whole assembly is then placed in the arithmetical unit frame 300 and the lever 324 is pulled up and latched. This raises the keyboard 305 and carriage 307 to the proper position beneath the solenoid bank 301 and the read-out mechanism 302 and pushes the gang plug 320 into the jack 320A (Fig. 5). It is noted that plug 320 and jack 320A are not shown in the circuit diagrams Figs. 15 and 16.

Solenoid bank

Figs. 8 and 9 are plan and partial side elevation of the solenoid bank 301, which fits over each calculator as seen in Figs. 5 and 6. The wiring is not shown in these Figs. 8 and 9. The solenoids are mounted in a box-like frame 401 which is attached to the top of the frame 300 of the arithmetical unit by the wings 402. The solenoids are mounted on two horizontal plates, an upper plate 403 and a lower plate 404, which form a part of the frame 401, and are protected from dust by a removable cover 405.

In the center of Fig. 8 are shown the half of the main keyboard solenoids 52 which are mounted on the lower plate 404 and (in section) the plungers 406 which extend from the solenoids of the upper layer through both plates to the keyboard. To the left in Fig. 8 are the upper layer of the multiplier keyboard solenoids 51 covered by a small clamping plate 429 and the operating solenoids 407, 408 for the accumulative and negative multiplication keys. To the right are the operating solenoids 409, 410, 411, 412 which are mounted on the upper plate 403 and which operate the dividend tabulator key, the add key, the return clear key and the keyboard automatic clear key, respectively. The last mentioned is labeled "Add" on the commercial machines now on the market. It is latched down during an operation when the main keyboard is scheduled to be cleared at the end of the operation. The functions of all the other keys will be readily understood by those familiar with these commercial calculators. Also at the right and mounted on the lower plate 404 are the operating solenoids 413, 414 for the subtract key and divide key. The multiplier keyboard solenoids 51 shown in Fig. 8 operate the "2," "4," "6," and "8" keys. In the lower layer are six solenoids (not shown) which operate the other six keys of this keyboard. The wires (not shown in these figures) from all these solenoids are led to gang plugs 415 so that the whole unit can be removed for servicing.

With one exception, a plunger 406, 416 extends downward from each solenoid through the lower plate to push the corresponding key when the solenoid is energized. The lower ends of the plungers are provided with spring cushions 417 and rubber shoes 418 to minimize their pounding against the keyboard.

The latch on the keyboard clear key is made inoperative by filing away the notch on the key stem, and an electrically operated latch 419 is substituted. This is unlatched by energizing the solenoid 420.

Fig. 9 shows the right hand group of operating solenoids (excepting solenoid 411) and a few of the keyboard solenoids 52. The inner frames are provided to support the wires to and from the solenoids 52.

Fig. 10 is a detailed showing of the exception mentioned above. This is the solenoid 408 which operates the negative multiplication key. There is not enough space to mount it directly above the key which it operates, and so it is mounted a short distance away underneath the upper plate 403. It pushes upward against the lever 421 which is pivoted at a yoke 422 and which with its other end pushes down against the plunger 423 which operates the calculator key.

Fig. 11 shows one of the keyboard solenoids in greater detail. The bushings 424, 425 are made of a leaded bronze bearing metal. We found that the dissipation of heat from the solenoids is likely to raise the temperature to a level at which oil-lubricated bearings do not work well. The upper level solenoids are the same as the one shown except for a longer plunger. Other details are evident from the drawing and need not be described.

Read-out and internal storage

Figs. 12 and 13 are detailed drawings of the read-out mechanism 302 (Fig. 6) and the internal storage 50 (Fig. 4). This mechanism is mounted on a frame 501 which is supported by wings 502 on the frame 300 of the arithmetical unit.

To adapt the standard commercial calculator 304 (Fig. 6) for use with the read-out mechanism the dials of the product register are removed from the carriage 307 in those decimal orders which are scheduled to be read out and the spiral stairstep face cam 503 is substituted.

Broadly speaking, the decimal orders which are scheduled to be read out are as many of the highest significant decimal orders as correspond with the capacity of the machine. For example if a number with 9 figures (i. e. over 100 million) is multiplied by a similar number giving 17 or 18 figures of which only the left hand 9 are significant, the machine shifts to the left to utilize only the significant figures.

In the specific schedule of operations described below for tracing a ray of light through an optical system the decimal point is fixed. One decimal order to the left of the decimal point (i. e. the units order) and eight decimal orders to the right are considered as significant. The orders further to the right are discarded as insignificant. Means are provided to shift the carriage to the same position for every read-out operation by the standard dividend-tab operation on the calculator or by always multiplying by nine digits even though the first one or more digits on the left are zero. The fixed decimal point is adequate because sines, cosines, sums of two cosines, and refractive indices are all less than ten (no known substance of practical use in lenses has a higher index than 3.0) and because the largest value of Q, Q' or $t$ and the smallest value of R are both of the same order of magnitude in nearly all practical optical systems. Hence, when expressed in a unit of length which is also of the same order of magnitude, the values of Q, Q', $t$, and 1/R used in the computation are nearly always less than ten. The rare exceptions, such as a telescope system having an objective with weak curves and an eye-piece with strong curves, are conveniently set up and entered into the machine as two separate problems.

Parenthetically, it may be pointed out as of interest to mathematicians that zeroes in the highest decimal order of the values of Q and $t$ have significance in some cases, just as it is true that a latitude of 0.00135° is as accurately specified as a latitude of 45.2665°, even though there are only three non-zero digits in the one number as compared to six in the other.

Briefly described, the read-out mechanism operates by spring-urging the tactile lever 504 down against the stairstep cam 503 to rest against the step corresponding to the number in this order of the register, whereby the other end 505 of the lever sweeps past a row of ten electrical contact points 506 arranged in the arc of a circle and comes to rest, of course, opposite the corresponding contact point. The lever 505 itself carries a contact point (not shown) and is then pressed against the row of contact points 506, closing the circuit through the appropriate one. The lever 505 is insulated from the frame and from lever 504 and is energized through a pigtail wire (not shown) when and only when a number is to be transmitted from this position, as previously described. One tactile lever is shown in Fig. 12, three groups of contact points corresponding to this group 506 are shown in the wiring diagram Fig. 4, and nine identical ones are in the complete machine. In addition a tenth lever is arranged to the left of the others (relative to the calculator). This is mechanically the same, but transmits only a zero or a nine to signal the absence or occurrence of an overdraft. It is shown as a two-point switch 53 in Fig. 4. All the other contact points of this switch are preferably wired together to signal an alarm that a number larger than the capacity of the machine has been computed, but this is optional and is not shown.

When the invention is adapted as a universal calculator, more of the register dials are equipped with stairstep cams and the alarm just mentioned is wired to a control means for indexing the register relative to the number circuits so that, for example 7.8×6.3 is read out as 49.14, not as 9.14. This can be accomplished by physically indexing the carriage relatively to the read-out mechanism or by electrically reconnecting the contact points of each read-out lever to a lower-order decimal group of number trunks. The latter is time-saving, but requires an additional tactile lever.

The preferred arrangement of steps on the stairstep cam is such that the highest step represents the digit 5, the next 4, then 6, 3, 7, 2, 8, 1, 9 in that order, and finally the lowest represents zero. Optionally, the cam has five levels representing 0, 2, 4, 6, and 8 and the tactile lever is bifurcated, one fork reading the even numbers and the other on a one-step higher or lower level reading the odd numbers.

The contact lever 505, when clamped against one of the contact points 506, operates as an internal storage. To permit this mode of operation, the tactile lever 504 is lifted clear of the stairstep cam so that the calculator 304 is free to proceed with the next operation. Although the lever can be made elbow-jointed or otherwise deformable for this purpose, we have found it simpler to mount the axis 507, which is the fulcrum for the nine tactile levers and is also at the center of curvature of the arc along which the contact points 506 lie, so that it moves in a substantially vertical direction. For this purpose it is pivoted on a fixed axis 508 beyond the contact points 506. There is thus a slight movement of the contact points, and hence they also are connected by pigtail wires (not shown).

The lowering and raising of the tactile levers is carried out by a motor-driven cam 510 and follower 512, and the unclamping and clamping of the contact points by a second cam 511 and follower 513. Fig. 13 is a rear elevation showing the followers 512, 513 and the levers 514, 515 which they cause to move. The first lever 514 is fastened rigidly to the pivoted frame 516 holding the working parts described above and is thus gravity-urged against the cam. The second lever 515 is independently pivoted on the same axis 508 and is spring urged against its cam 511. The cams are rotated in about one second by an electric motor (not shown) controlled indirectly by a switch 517. Figs. 12 and 13 show the cams rotated about 190° from rest position. At rest position the tactile levers 504 are raised and the contacts remain clamped, storing the number previously read out.

The cycle of operation proceeds as follows:

1. A starting impulse is sent to the motor under the control of the sequence control relays (Fig. 1).

2. The double-throw switch 517 is thrown when its roller drops off the high part of the cam 518. This works through a relay 551 (Fig. 16) to break the power line to the calculator motor (as a safety measure) and to close a power circuit to the cam motor to keep it running after the starting impulse ends.

3. The cam lever 515 drops, pushing the roller 519 at its lower end down the face cam 520. This permits the gate 521 to slide laterally. The gate is provided with slots 522, one for each contact lever, so that the contacts are unclamped by this motion.

4. The contact levers 505 are spring-urged upward. As a guarantee of accuracy, a checking bar 523 runs under all these levers and is spring-urged upward against them. When all the levers are up, this checking bar 523 closes a switch 524 (Fig. 14) which sends a signal back that the read-out has begun.

5. The cam lever 514 is lowered steadily but rapidly, permitting the frame 516 and axis 507 to be lowered pushing the tactile levers 504 against the stairstep cams 503. (The other lever 515 is lowered equally so that the roller 519 does not move relative to the face cam 520.) This is the position shown in Fig. 12.

6. Preferably, since this motion is gravity-urged, there is provided as a second guarantee of accuracy a limit switch 525 which closes when this motion is completed and signals for the next step of the scheedule to be ready to start when the read-out is complete. If either this switch or the one mentioned in Step 4 fails to close, the cams rotate a second time under the control of relays 551 and 552 (Fig. 16) described below.

7. The cam lever 515 is raised rather quickly so that its lower roller 519 rolls up the face cam 520 pushing the gate 521 and clamping each lever 505 in position against one of the contact points 506. If desired, a switch can be provided permitting the transmission of the number at this time.

8. The cam lever 514 is raised lifting the frame 516 and with it the clamped tactile levers 504 to clear the stairstep cams. (The cam lever 515 is raised equally to maintain its position relative to the face cam 520.)

9. The control switch 517 is thrown to its rest position, cutting off the power from the cam motor and permitting it to go to the calculator motor. The cam motor stops, the read-out mechanism remains in rest position, and the new number is now stored in the internal storage.

Fig. 14 shows the electrical connections by which the read-out mechanism is controlled. The motor 526 drives the cam 518. All wires to other parts of the machine are led to a gang jack 527. The plug 527A which fits into this is shown in Fig. 16.

*Modifications of standard calculator*

Fig. 15 shows the wiring diagram of the calculator as modified. The outside connections are through the gang jack 310, shown diagrammatically here and also shown in Fig. 5. The parts of Fig. 15 are not arranged strictly in the positions occupied in the actual machine, but in general so as to reduce the complications in the wiring diagram of the control circuit (Fig. 16) to be described. It is not believed necessary to describe the physical form of the various electrical switches, they are or may be standard switches available commercially.

The following is a listing of all the changes necessary in a standard calculator to adapt it for use in an arithmetical unit, except for one special change described in the copending application, Serial No. 207,562, previously mentioned, useful in computing square roots. The ordinary changes are:

1. The product register dials are replaced by stairstep cams, already described.

2. The calculator motor wires 351, 352 are brought directly to the jack 310 and not through the motor switch as originally.

3. The motor switch 353 is likewise wired to jack points by wires 383, 384.

4. A switch 354, 355 is mounted over the carriage and closes when the carriage shifts and remains open when the carriage rests in one operating position.

5. A second switch 354, 356 is mounted over the carriage and is closed when and only when the carriage is in the extreme left position.

6. A third switch 354, 357 is mounted over the carriage and is closed when and only when the carriage is in the read-out position. This is conveniently eight positions to the right of the extreme left position.

These three switches may be micro-switches operated by a suitable pattern of raised areas on the carriage. For simplicity, they are shown in Fig. 15 as commutator brushes contacting brass plates 358, 359 on the carriage top. Obviously, one brush 354 is common to all three circuits, and is connected directly to the + post of the power supply 25.

7. To guard whether a number is completely received in the main keyboard, a special lever (not shown) is mounted on or under each row of keys that is to be used. This lever is in one position when the row is cleared and in another position when any key in the row is down. These levers throw the nine pairs of switches 360. These are connected in series in two circuits so that one circuit 361 is closed (as shown) when the keyboard is empty and the other circuit 362 is closed when the keyboard is full. To make this guard operate properly, the zero keys are provided with notched keystems (not shown), the same as the other keys.

8. To guard whether a number is completely received in the multiplier keyboard, a switch 363 is mounted so that it is closed by the multiplier selection unit assembly 364 (underneath the multiplier keyboard) when nine digits have been entered. We have found it better to have the switch pushed aside, when the assembly 364 returns during a multiplication and to drop free when the ninth digit is received, as a head-on push is likely to slow down the action of the multiplier keyboard.

9. A cam 365 is mounted on the main drive shaft to operate a switch 366 which is adapted to generate a pulse for every revolution of the drive shaft.

10. The lever 367 in the standard machine throws the mechanism into the add or subtract position and restores it to neutral when the carriage shifts. Against this lever are mounted two double-throw switches. The upper one 368 is thrown when the lever is in the subtract position, and the other 369 when in the add position. The connections 623 to 626 are explained in the description of Fig. 18 below.

The plug which fits into the jack 310 is shown partly in Fig. 16 (310A) and partly in Fig. 18 (310B).

Other modifications are optional, such as the omission of standard control levers which are not used in the schedule described herein.

Operational control and guarding

Figs. 16 and 17 show the system of relays which have general control over the operations carried out by the arithmetical unit, guard against certain failures therein, and signal when the unit is ready for further instructions.

Two relays 551, 552 control the read-out unit, and one relay 553 controls the calculator motor. A delay circuit shown inside the dotted rectangle 560 signals an alarm and disconnects the read-out unit and the calculator if either mechanism becomes jammed. The calculator control relay 553 and five other relays 554, 555, 556, 557, and 558 cooperate with switches (already described) in the calculator itself to signal when the latter is ready to receive a signal for the next operation. Conveniently, the signal to each large operational solenoid (407 to 413, inclusive, Fig. 8) is relayed through a monitor relay to avoid routing the heavy solenoid currents through the relay network. The relay-and-solenoid units are shown as rectangles 407A to 413A respectively in the lower part of Fig. 16. The smaller solenoids 414 and 420 are energized directly (to clear or not to clear the keyboard).

Fig. 17 shows one of these operational solenoid units 407A in detail. The solenoid 407 is energized by the monitor relay 407B when the latter is energized by a signal from the sequence control 26 over wire 549. The circuits of the other operational solenoid units 408A to 413A are identical with this. The division control unit 412A is energized (through wires 545 and 545A) via the quotient register control shown in Fig. 18 and described below.

The general method of performing an arithmetical operation is as follows. The sequence control unit 26 closes one of the operational control paths in one of the groups 570, 571, 572, 573, and sometimes also one of the keyboard control paths in groups 574, 575, 576 according to schedule. When the arithmetical unit is ready to receive instructions it energizes the upper terminal of the selected closed path or paths, and the current flows through to start the operation. When the operation has fairly started, the voltage is cut off from the upper terminals of the paths through the sequence control unit and a signal is sent over wires 577 and 578 to advance the sequence control unit a step so that it closes the path or paths corresponding to the next scheduled operation. It then awaits the signal that the arithmetical unit is again ready.

The operation of the read-out control relays 551, 552 and the calculator control relay 553 will be further explained after the operation of the auxiliary relays is described.

The delay circuit inside the dashed rectangle 560 guards against three types of failure: (1) if the read-out mechanism takes more than 2 sec. to complete its operation, (2) if the calculator runs more than 2 sec. in one carriage position and (3) if the calculator requires more than 0.015 sec. to shift the carriage. Optionally when the power is first turned on, it delays the supply of power to certain relays while other relays are getting set. In case any of the above failures occur, it cuts off the power from the calculator and read-out motors.

Any suitable delay circuit may be used. The one shown consists of relays 561, 562, 563, 564, and 565. The alarm relay 565 is slow operating and mechanically latched. If energized as long as 0.015 sec., it opens the circuit from the A. C. power supply 99 to the two motors, and latches open so that the machine cannot be operated further until manually reset. This relay is energized directly by the carriage pulsing switch 355 over wire 566 so that it operates if the carriage is in a half-shifted position when the power is turned on or jams more than 0.015 sec. in a half-shifted position.

When the power is first turned on, circuit 567 is energized via switch 517 (Fig. 14), wires 569 and 569A, and switch 537 of relay 553 (unless the read-out unit is in mid-cycle) and the four relays 561, 562, 563, and 564 pull up in turn. The fourth relay is slow operating, and applies voltage to the alarm circuit 568 after the latter has had time to be broken by the third relay. Optionally the third and fourth relays also control the supplying of delayed + (designated as D+) voltage to certain circuits as shown. The fourth relay 564 remains locked as long as power is applied.

Thereafter, if circuit 567 is de-energized for as long as about 2 sec., the first relay 561 relaxes, the second relay 562 is a vibrator and starts vibrating, sending pulses to the third relay 563 at intervals shorter than the latter's release time until in about 1.8 sec. the vibration decays and stops sending pulses. The third relay then releases, closing the alarm circuit 568 and energizing the alarm relay 565 which operates after another 0.015 sec. and breaks the motor power line. Circuit 567 is de-energized by the read-out cam switch 517 while the read-out mechanism is operating, and is pulled off the steady voltage and put on the carriage pulse line 566 by switch 537 of the calculator control relay 553 when the calculator is running. Thus if the read-out cycle lasts more than 2 sec. or if 2 sec. elapse between carriage pulses, the alarm is tripped.

The carriage pulse is of very short duration, and the first time-guard relay 561 is a pulse lengthener. We have found it desirable to use two pulse lengthening relays in series here, but for simplicity have shown only one.

In case the read-out device is in mid-cycle when the power is turned on, relay 551 is energized via switch 517 (Fig. 14) connecting the motor 526 and completing the read-out cycle before the delay circuit is energized. Thus, the first cycle only of the read-out device is not guarded.

The guard relays 554, 555, 556, 557, and 558 operate as follows. The first guard relay 554 is energized when control relay 553 is relaxed and thus guards against the sending of a new signal until the previous operation is ended and the previously closed path through the sequence unit 26 has had time to be broken. The trunking guard relay 555 is connected directly to wire 84 of Fig. 4 and is energized when and only when the main keyboard solenoids 52 are connected to the number trunks 12. The full keyboard guard 556 is connected directly to the keyboard switches of Fig. 15 via wire 362, and is energized when and only when the main keyboard is full. The multiplier trunking guard relay 557 is connected to wire 86 of Fig. 4, and is energized when the multiplier keyboard solenoids 51 are connected over relay 67 to the printing trunks 15 (Fig. 4). The multiplier guard relay 558 is connected directly to the full multiplier switch 363 of Fig. 15, and is energized when the multiplier keyboard has received nine or more digits. The guard circuits begin at the + post 354 (Fig. 15) of the carriage switches, go over the carriage position switches 356 and 357 respectively, over wires 330 and 331 respectively and over the armature switches of the guard relays 554, 555, 556, 557, and 558 (Fig. 16) above described. Wires 581, 583, 584, 585, and 586 branch off from these guard circuits and run to the upper terminals of the selective paths 570 to 576 through the sequence control unit 26, shown in more detail in Fig. 22. In the case of the third arithmetical unit, wire 582 is also so connected.

The operational path through the sequence unit 26 which is scheduled to be closed at any step of the sequence is selected so that its upper end connects with that one of the wires 581 to 586 which is energized when and only when all the machine conditions are fulfilled showing that the scheduled operation is ready to start and so that its lower end connects with the scheduled operational control unit. The connection to the upper end is chosen as follows: Wire 581, 583 or 585 is chosen if the carriage is to be in the read-out position, wire 582, 584 or 586 if in the left-hand position, and wire 580 if the carriage position does not matter. Wire 583 or 584 is chosen if the main keyboard is required to be filled, as ordinarily is required for an addition or "dividend tab;" and wire 585 or 586 is chosen if both keyboards are required to have received a number, as is ordinarily required for a multiplication, but not when a multiplication operation is used for the purpose of returning the carriage. These represent all the combinations of conditions encountered in the specific schedule of operations of the first arithmetical unit as herein described and some additional wires illustrating circuits used in the other units. When the invention is adapted for use as a universal calculator, more switches are added to the guard relays in an obvious manner to accommodate for other combinations of conditions. The paths through the sequence unit as shown in Fig. 16 are not intended to bear an exact one-to-one relationship to the paths shown in Fig. 22, but are intended to demonstrate the principles upon which the sequence units Figs. 22 to 25 are designed.

The central control relays 551 and 553 are carefully arranged to prevent the calculator and the read-out unit from both running at once, as this would seriously damage the mechanism. It might cause damage even if one of the two were cut off and just coasting. This is especially likely to happen when power is first applied. The read-out control relay 551 has a double throw switch which supplies power either to the read-out motor (when energized) or to the calculator (when relaxed). Besides this, the power does not reach the calculator motor unless the calculator control relay 553 is energized, and it is not energized when power is first applied unless the read-out mechanism is at rest, and then only after a delay. Moreover, the read-out relay 551 cannot be energized over path 570 of the sequence unit unless the calculator relay 553 is relaxed and guard relay 554 is energized thereby.

The first pulse to relay 554 after power is first turned on optionally closes the self-locking relay 559 (at right of figure) which then supplies steady locking voltage to the sequence control unit 26. It will be seen later that no path through the sequence unit 26 is closed and pulses over wires 577, 578, and 570 are ineffective, until this locking voltage is applied. This prevents the advancing of the sequence unit past the first scheduled step of the calculation if the calculator is in mid-cycle when power is first turned on. If that is the case, the following happens: The power is turned on and if the read-out unit is in mid-cycle it completes its cycle and applies voltage to the delay unit 560, after which wire 587 is energized as above described, energizing relay 553 through the calculator switch 353 (Fig. 15) which, of course, is closed until the calculator completes its operation. Relay 553 applies power to the calculator motor to finish the operation then in progress, but the energizing of wires 577 and 578 is ineffective. After relay 553 has had time to operate, wire 589 is energized (optionally by relay 564), then when the calculator operation is completed, switch 353 opens and relay 553 relaxes, connecting wire 589 (now energized) to wire 588 and energizing relays 554 and 559. The latter then applies locking voltage to the sequence unit 26 via wire 580 and thereby closes the first-scheduled paths through the sequence unit, and relay 554 energizes wire 589. The two first-scheduled steps are energized from wire 580 because the carriage position is unknown. These steps consist of a product followed by either a dividend tabulation or a return clear operation to clear out the numbers which may have been left in the machine from the previous calculation.

One further detail of Fig. 16 may well be described at this point. Wire 597 signals the #5 sequence control 30 when the main keyboard is cleared and ready to receive a number, as will be explained more fully with reference to Fig. 26A. Similar wires from the other arithmetical units are also shown in Fig. 26A.

An alternative method of delaying the application of power to wires 587, 589, and 588 is described below in connection with Fig. 19.

An optional circuit for supplying the advancing pulse to the sequence control is shown by the broken lines 578A and 578B. We have found that with some calculating machines the advancing pulse is sent over wire 578 too quickly and cuts off the current from the operating solenoid before the operating key is fully depressed. One way of correcting this is to cut the advancing pulse wire 578 at the point marked "X," and to route the advancing pulse via wire 578A to the pulsing switch 366 (Fig. 15) (which is in that case not connected directly to the power source) and back via wire 621 to the division control (Fig. 18) or to the square root control (described in the copending application) which is similar thereto. From either of these controls, at least one pulse is then returned via wire 578B to the sequence control 26. In the arithmetical units 27, 29 which have no division control, wire 621 is (in this form of the invention) connected directly to wire 578B. The advancing pulse is usually chopped up into several short pulses by this optional circuit, but the chopping up makes no difference in the effect on the sequence control.

Wires 857 and 858 (shown also in Fig. 24) are used only in arithmetical units equipped with the square root control described in the copending application, for example in the third unit 28 of the specific form of the invention described herein. Wire 857 is energized at the beginning of the computation of a square root when the square root is scheduled to be transmitted a digit at a time during the computation thereof, and wire 858 is energized at the beginning of the computation of a square root when the square root is not scheduled to be so transmitted.

*Division operation control*

Fig. 18 shows in detail the quotient register 22 (Figs. 1 and 4). The division operation is special not only because of the necessity of a special register but also because the calculator switch is not closed when the control key is depressed but only after it is depressed and then released.

It may be noted that in the machine for optical ray tracing, the first arithmetical unit 17 is the only one equipped for dividing, and it happens that every quotient is transmitted to the multiplier keyboard solenoids 51 (see Fig. 4) of the same #1 arithmetical unit. Thus, no number transfer wires are needed except direct connections 98 (Fig. 4) with these solenoids.

In Fig. 18 when the power is first turned on, the starting relay 601 is energized and remains so except during the division operation. This is a slow-release relay, and its purpose is to break the circuit via wire 545A to the control unit 412A (Fig. 16) after the latter has had time to fully depress the division control key.

The quotient register is connected with the rest of the machine as follows: (1) By five wires 621, 593, 545, 545A and 566 from and to the control relays Fig. 16, (2) By four wires from the lower half 310B of the plug fitting into the jack 310 (Fig. 15), (3) By ten number transfer wires 98 (Fig. 4) to the multiplier keyboard solenoids 51, and of course (4) By wires to and from the power supply which are shown truncated and labelled "+" or "—."

When the conditions for starting a division operation are all fulfilled as above described, wire 545 is energized through the sequence control 26 (Figs. 16 and 22) and energizes control relay 602 through its lower winding. The four switches of this relay, listed from top to bottom, act as follows: (1) to connect the output wire 621 of pulsing switch 366 with the input wire 622 of add-subtract switches 368, 369 (Fig. 15) for distribution of the pulses over wires 623, 624, and 626, (2) to close the "pulse when adding" circuit 626 to the flip-flop relay 604, (3) to connect wire 593 to the upper winding for self-holding, and (4) to remove + voltage from starting relay 601 and instead apply it via wire 629 over the switch thereof and over wire 545A to the division control unit 412A (Fig. 16) to depress the "Divide" key on the calculator during the time it takes starting relay 601 to relax, also via wire 629 to energize the switches of pulsing relay 605 and to apply locking voltage to the counting chain 609–619, via the switch of flip-flop relay 604. Wire 593 is not energized and so does not supply holding voltage until the "Divide" key is depressed and released, whereupon it is energized through wire 384 (Fig. 15) by the mechanical closing of switch 353 already mentioned. Wire 593 then carries holding voltage to relay 602 and at the same time energizes the calculator control relay 553 (Fig. 16) as already described. Relay 553 operates and by its lowermost switch cuts off auxiliary relay 554 which by releasing breaks the guard circuits (specifically the circuit via wire 583, path 572 through the sequence control and wire 545) to de-energize the lower winding of relay 602.

Knowledge of the steps which the calculator itself makes is assumed. Pulses from switch 366 (Fig. 15) travel via wires 621 and 622 to the distributing switches 368, 369 (see Figs. 15 and 18). From there they are sent over wire 623 when subtracting, 624 when not subtracting (i. e. when either neutral or adding), and 626 when adding. Wire 625 (carrying pulses when neutral) is not used in division, but is used in computing a square root by means of a similar but more complex system of relays described in the copending application mentioned above.

When the machine is subtracting pulses are sent over wire 623 to pulsing relay 605, which is to be adjusted if necessary by a shunt resistance to give out pulses of the proper on-off ratio. We have found that an 0.05 sec. "on" pulse is satisfactory and not very critical when using standard telephone relays. These pulses are given out over two separate wires 627 and 628 to the counting chain 609 to 619, which will now be described.

*Counting chain.*—There are a number of known counting chains that would function satisfactorily here. The one shown consists of one relay with three double throw switches for each step, and is shown as advancing from left to right. A locking voltage is applied via circuit 629—630 to the upper switch at the right. This always locks the most advanced relay that is energized, and initially it energizes the first relay 609. Without the locking voltage, the pulses have no effect. The advancing pulse is applied over wire 627 to the lower switch at the left. When any single relay is closed, this pulse energizes the next relay to the right, and thus removes the locking voltage from the relay energized at the start of the pulse. The holding pulse is applied over wire 628 to the middle switch on the left. It holds (i. e. locks temporarily) the last mentioned relay at least until the advancing pulse ends. The holding pulse lasts as long as the advancing pulse, and no harm is done if lasts longer. When the holding pulse ends, the relay previously energized drops out, and the chain is ready for another pulse.

This chain counts the pulses emitted while the calculator is subtracting. Then the add cycle pulse over circuit 626 energizes the flip-flop relay 603 through its upper coil. This energizes wire 631 to transmit to the multiplier keyboard the number next smaller than the number of subtractions counted. This is obviously transmitted from the one closed switch shown below the coils of relays 610 to 619 and over one of the ten wires 98, also shown in Fig. 4. At the end of the add-cycle pulse, the second flip-flop relay 604 is energized over circuit 629—629A in series with relay 603. This ends the transmitting pulse over wire 631. At the beginning of the shift-cycle pulse over wire 624, the first flip-flop relay is relaxed by opposed windings and interrupts the locking voltage on wire 630, allowing the counting chain to relax, but the second flip-flop relay 604 is held by its lower winding until the end of this pulse, when it relaxes and applies the locking voltage again over wire 630 ready for the process to begin again in the next carriage position.

In case more than ten subtractions occur in one carriage position, the advancing pulse over the lower set of double-throw switches energizes the alarm wire 566 to the alarm relay 565 (Fig. 16).

When the division operation ends, the calculator switch 353 (Fig. 15) is automatically opened, breaking circuit 583, relaxing the control relay 602 and energizing the starting relay 601 until the next division operation starts.

*Power supply and alternative starting circuit*

The arithmetical unit has been described in a form suitable for general use in that it guards its own starting. When as in the machine herein described, two or more arithmetical units 17, 18, 19, 20 (Fig. 1) are operated in parallel, it is simpler to use a common delay circuit which applies delayed + voltage to all the arithmetical units and sequence controls and to make some slight changes in the circuit shown in Fig. 16. These changes are described in the third paragraph below.

Fig. 19 shows the power supply and alternative delay circuit in a schematic form which will be readily understood. The A. C. power source 99 is assumed to provide the standard 60-cycle 110-volt current for the calculator motors and three-phase current for the rectifiers 25A and 25B which supply D. C. current for the relays and for the solenoids respectively. In Fig. 1 the starting switch is shown for simplicity between the power supply and the program control unit. We prefer instead to have the starting switch 33 between the A. C. source 99 and the rectifiers as shown in Fig. 19. The preferred starting switch is a double pole normally open switch which energizes the rectifiers 25A and 25B when closed momentarily. Normally the rectifier 25A energizes relay 490 via wire 493 (Fig. 33) immediately. The switches of relay 490 bypass the switch 33 and maintain the power to the rectifiers as long as the machine is computing. When the last scheduled problem is completed, relays 703 and 169 (Fig. 33) cut off both sources of voltage from wire 493 (as will be explained with reference to Fig. 33) and release relay 490. If, on the other hand, the abnormal condition should hold that all the "in-out" switches 731, 732 of the ray data storage 10 (see Fig. 32) are set in the "out" position a path is closed through this storage unit connecting wire 712 to wire 715 (Fig. 33). As explained below, wire 712 is energized at this time, and since wire 715 is connected to wire 494 through the uppermost switch of relay 702 (Fig. 33), wires 493 and 494 bring both ends of the winding of relay 490 to the same + potential in this abnormal case and this relay does not operate.

Also, when the rectifier 25A is first turned on, it starts the relay switches 491 and 492. Suitable delay switches of several types are available on the market, and accordingly their operation will not be described in detail. The first delay switch 491 is adjusted to connect the + terminal of rectifier 25A to wire 587 (Fig. 16) after two or three seconds. The second delay switch 492 is preferably a double throw switch and energizes wire 712 for some 20 or 30 seconds, after which it energizes wires 588A and 589.

The use of this common delay circuit involves some slight changes in the circuit shown in Fig. 16. Wire 587 no longer draws + voltage from the upper switches of relays 563 and 564, but these two switches are eliminated in each of the four arithmetical units. Likewise wire 588A, which applies locking voltage to the sequence control units via the program control unit (Figs. 16 and 33), no longer draws + voltage from relay 559 (Fig. 16) but relay 559 is eliminated in each arithmetical unit. Likewise, wire 589 supplying + voltage to the two lowest switches of relay 553 is preferably energized by delay switch 492 (Fig. 19) and is not connected to the alarm circuit. These variations are optional, and it is believed that they will be readily understood without the showing of another figure which would correspond to Fig. 16 except for the changes here indicated.

Specific embodiment for lens computing

The general units above described are equally applicable to a universal computer and to a computer for a specific purpose. The units which are designed for the specific problem of optical ray tracing will now be described after the equations on which the computing routine is based are briefly described.

Equations for computing

The schedule of operations herein described is for triangulating a ray of light through a centered optical system consisting of spherical (including plane) surfaces, and is limited to rays in the axial plane. The schedule is based on a system of equations published by Mr. T. Smith (Proc. Phys. Soc. London, vol. 27, page 502, 1915). In order to eliminate the necessity of using a table of sines and cosines of angles, the T. Smith equations are modified in accordance with a suggestion made by Dr. C. W. Woodworth in the Journal of the Optical Society of America in 1923, whereby the angular values are not used at all, but the cosine is computed from the sine by the formula $$\cos x = \sqrt{1 - \sin^2 x}$$

and the sine and cosine of the sum of two angles are computed by the familiar trigonometrical formulae.

Figure 20:
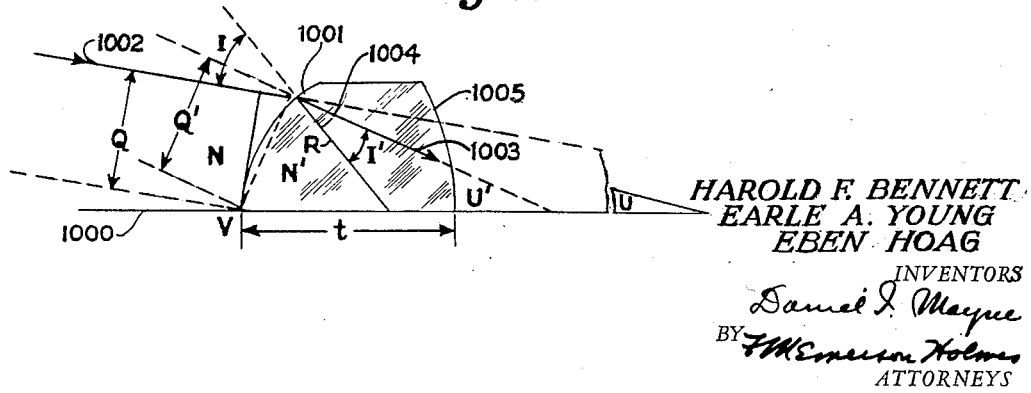
Fig. 20 is an explanatory diagram of the problem which the specific embodiment of the invention is adapted to compute.

Referring to Fig. 20 (same sheet as Fig. 18), a spherical surface 1001 separates a medium of refractive index N on the left from a medium of refractive index N' on the right and the radius of curvature of the surface is R, a ray 1002 making an angle U with the optical axis 1000 is incident from the left, and the refracted ray 1003 emerges at an angle U'. The distances of the incident and the emergent rays, respectively, from the vertex V of the surface are designated as Q and Q', the angles of incidence and emergence as I and I', and the axial distance to the next surface 1005 as $t$. It is noted that the radius 1004 makes an angle $(U+I) = (U'+I')$ with the axis 1000. This angle is designated as V for the sake of brevity.

Accordingly, the computing equations are as follows:

1. $\sin I = Q (1/R) - \sin U$
2. $\cos I = \sqrt{1 - \sin^2 I}$
3. $\sin V = \cos U \sin I + \sin U \cos I$
4. $\cos V = -\sin U \sin I + \cos U \cos I$
5. $\sin I' = \sin I (N/N')$
6. $\cos I' = \sqrt{1 - \sin^2 I'}$
7. $\sin U' = -\cos V \sin I' + \sin V \cos I'$
8. $\cos U' = \sin V \sin I' + \cos V \cos I'$
9. $Q' = Q (\cos U' + \cos I') / (\cos U + \cos I)$
10. Q at next surface $= Q' - \sin U' (t)$
11. $\sin U$ at next surface $= \sin U'$
12. $\cos U$ at next surface $= \cos U'$ In the computation, R appears only as a reciprocal $(1/R)$, and N and N' only as a ratio $(N/N')$.

For the first surface of the lens, the values sin U, cos U and Q are drawn from the ray data storage 10, and for the succeeding surfaces they are drawn from the internal storage units 50. The values of $(1/R)$, $(N/N')$ and $t$ for each surface are drawn from the lens data storage. At the option of the operator, $t$ at the final surface is equal to zero or to the focal distance or to any arbitrarily chosen value.

Nine values are printed for each surface computed, plus three final values at the end. When one ray is finished another is started automatically under the control of the program control unit 32 until all the ray data is used up, then the program control unit shuts the machine off by energizing wire 49 as above described. For example it is not unusual to set up the storage data at the close of a working day and to let the machine run (at time and a half for overtime) on into the night and then to shut itself off so that the results may be read next morning. The schedule here described actually requires a maximum of only twenty minutes or so but with increased storage capacity, several hours of uninterrupted and unsupervised computing is contemplated.

The above computing equations, when used with a consistent and properly interpreted sign convention, are applicable to nearly all imaginable systems of coaxial spherical refracting and/or reflecting surfaces. One such sign convention assumes that all lengths Q, Q', R, and $t$ and angles U, I, V, I', and U' relative to the first surface 1001 are positive as shown in Fig. 20. Angles I and I' are always less than 90°, hence cos I and cos I' are positive. Angle V is greater than 90° at the margin of a hyper-hemispherical surface, and angles U and U' may be greater than 90° in a hyper-hemispherical bundle of rays (as in a ring periscope) hence cos U, cos V, and cos U' may be negative. The index ratio N/N' is positive in the case of a refractive surface and −1.0 in the case of a reflecting surface. The ninth equation may cause trouble in the rare case of grazing incidence at the vertex of a surface or in the case of a hyper-hemispherical ray passing through an opening at (or aimed at) the vertex of a surface, in which case (cos $U$+cos $I$) is zero, but such situations are oddities rather than of practical interest.

Computing schedule

Figure 21A:
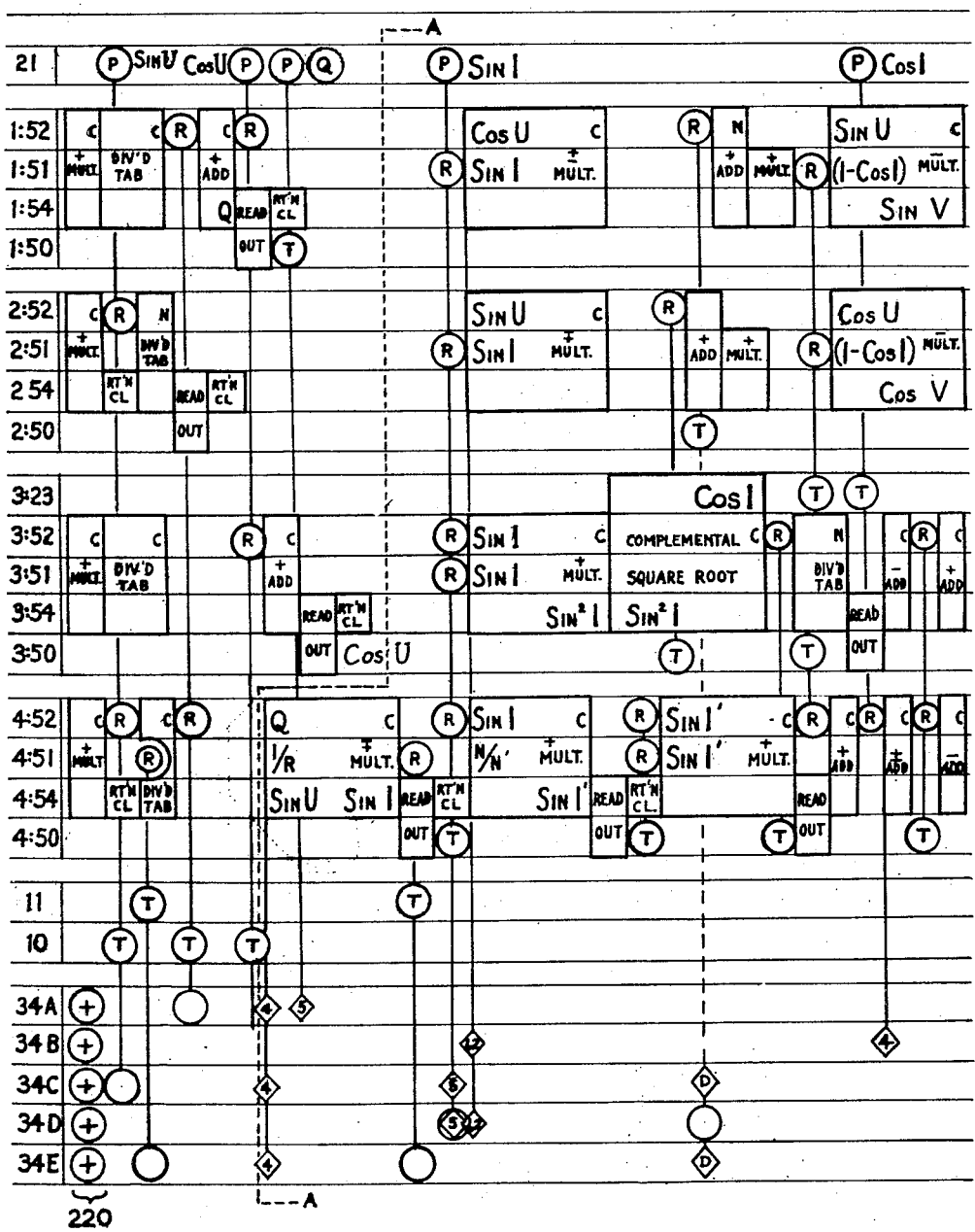
Fig. 21 is a chart of the specific schedule of operations illustrated.
Figure 21B:
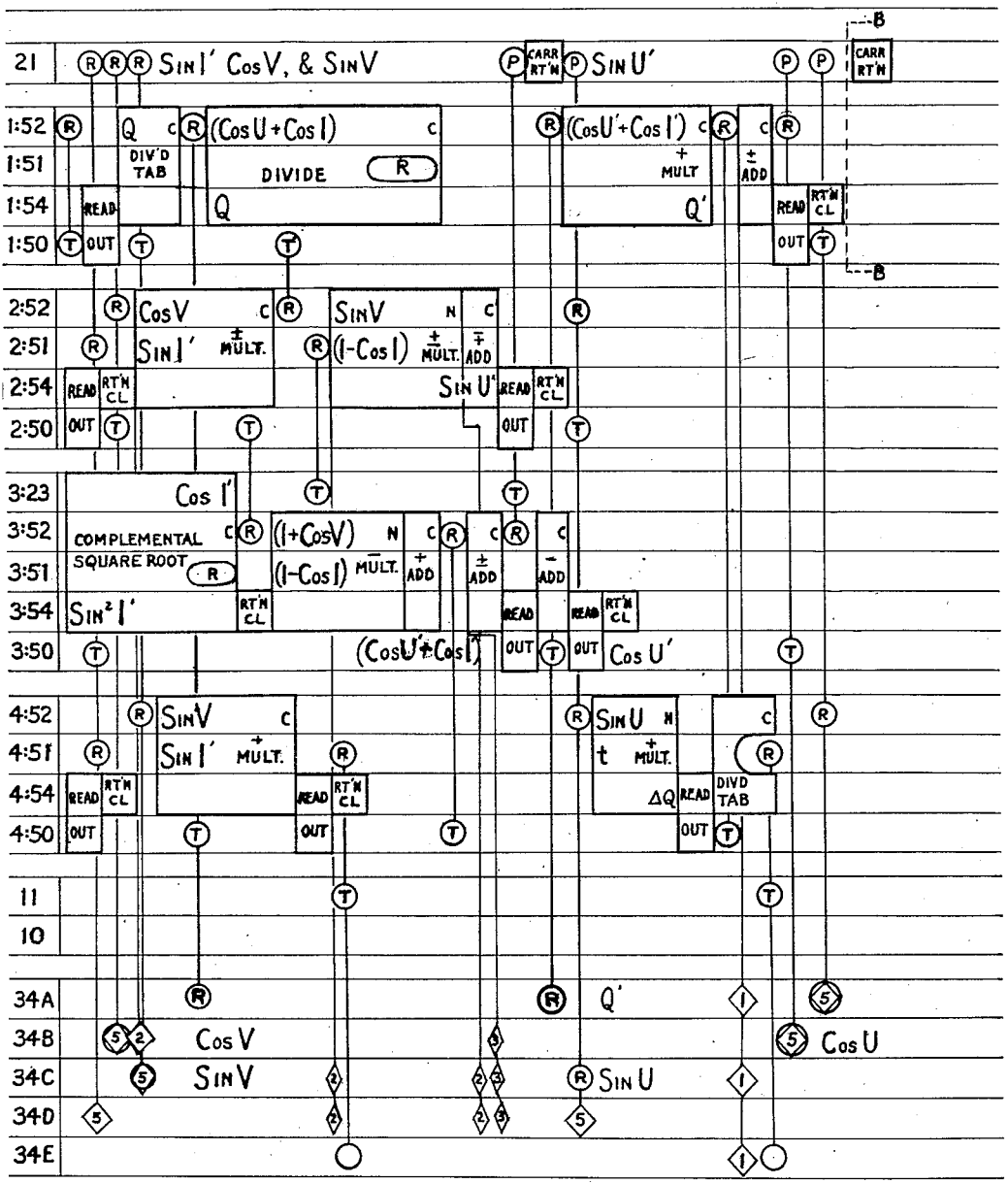

Fig. 21 is drawn in two parts, Figs. 21A and 21B, and shows schematically a computing schedule specifically arranged for the optical ray tracing routine. This chart is drawn on a distorted time scale from left to right. The distortion of the time scale is merely to provide space for labels. Actually, an addition operation requires only only 0.1 sec. while a multiplication averages 4 or 5 sec.

The first row or strip 21 at the top represents the output unit or printer 21. Circles enclosing the letter P denote the operation of printing a number transmitted from another part of the machine. The arithmetical units are represented by groups of four or five strips each. Each strip is numbered by the unit number 1, 2, 3, or 4 followed by a colon which is followed in turn by the designation of the part of the unit represented, namely the main keyboard and associated solenoids 52, the multiplier keyboard and associated solenoids 51, the product or dividend register 54, the read-out mechanism and internal storage 50, and in the case of the third unit the square root register 23. The quotient register (22 of Fig. 1) is not shown as a separate strip, since the quotient is in every case received directly in the multiplier keyboard 1:51. Below the strips representing the arithmetical units are two strips 10, 11 representing the ray data storage and the lens data storage, respectively. This accounts for all the number-receiving and/or transmitting parts in this specific form of the invention.

The transmittal of a number is represented by a group of circles lying along a vertical line. In each such group, one circle enclosing the letter T indicates the source, i. e. the position from which the number is transmitted, one or more enclosing the letter R indicate the position or positions into which the number is received, and when the number is to be printed, that step is indicated by a circle in the top strip 21 enclosing the letter P. The carriage return on the output unit 21 and operations involving the mechanical parts of an arithmetical unit are indicated by rectangles appropriately labelled. The receipt of a number into the multiplier keyboard can overlap a dividend tabulation (DIV'D TAB) operation (as indicated by the indentations into two rectangles along the strip 5.51) or an addition, a division, or a return clear operation. As previously mentioned, the quotient resulting from the one scheduled division operation is received directly into the multiplier keyboard 1:51 as indicated by an oval enclosing a letter R. Also, in the third unit, time (about 1 sec.) is saved by arranging for one of the two square roots to be received into the multiplier keyboard 3:51 in a similar manner. This requires a special relay which connects the square root register 23 directly to these multiplier keyboard solenoids during this operation. Alternatively, this can be scheduled as an ordinary transmittal, lengthening the scheduled time by about 1 sec. The main keyboard 52 is either cleared C or not cleared N at the end of an operation as indicated by the letter C or N in the upper right-hand corner of the rectangle.

Below the above-described strips are five strips 34A to 34E representing the sign control relays (Fig. 27). The first four represent flip-flop units which flip or flop when a pulse is sent to them indicating that a negative number is being transmitted or that an overdraft has occurred. The other one is a simple memory unit (locking relay) which remembers a negative sign until relaxed under the control of the sequence controls.

All these relays are first relaxed so that they assume the "plus" position. This is symbolized by the group of circles 229 at the left-hand side of Fig. 21A. They are then signalled at selected points in the schedule (indicated in Fig. 21 by circles) when some selected number has a negative sign, for example as indicated by an overdraft in an arithmetical unit. A plus sign is indicated by no signal being sent. The first fours sign relays 34A to 34D flip or flop each time such a signal is received until relaxed at the end of a problem. The fifth relay 34E is relaxed under the control of the sequence units shortly previous to each time it is scheduled to receive a signal.

The sign relays have switches by which they control the printing of numbers as positive or negative and sets of reversing switches by which they control the positive or negative sense of additions and multiplications. The relay or relays which control any particular operation are designated by small diamond figures enclosing a number 1, 2, 3 or 4 for each arithmetical unit controlled and a 5 if the sign of the printing is controlled. In one special case, the setting of relay 34D is controlled. If an odd number of the relays thus indicated are in the "minus" position, the circuit is reversed an odd number of times, so that a number is printed as negative and the lower displayed sign is effective in the $\pm$ and $\mp$ operations. Otherwise the upper sign controls. In some instances, a circle and a diamond appear superimposed. In these cases the relay is first set, then controls or aids in controlling the sign of the number being printed. In the operation of the machine, we have found it convenient to indicate negative numbers by printing them in red.

Where there is sufficient space in Fig. 21 to do so, the numbers transmitted and the numbers standing in keyboards and product registers are identified in accordance with the computing equations given above.

The "opening schedule" previously mentioned consists of the operations shown between the left-hand margin of Fig. 21A and the line A—A. The "regular schedule" continues to the line B—B near the right hand side of Fig. 21B. The closing schedule merely includes the returning of the carriage of the typewriter instead of tabulating to the next printing position, but optionally can be arranged to suppress the last "DIV'D TAB" operation of the fourth arithmetical unit. There are, of course, many optional details in a schedule of this sort. For example, more extensive experience may show that average over-all time of the schedule would be shortened by arranging for the first transmittal of the square root from strip 3:23 to multiplier keyboards 1:51 and 2:51 to occur ahead of rather than after the transmittals from 4:50 to 3:52 and from 3:50 to 4:52. Also the last subtraction (—ADD) by the fourth unit shown in Fig. 21A is scheduled in place of a dividend-tab immediately after the previous read-out because it is much quicker (0.1 or 0.2 sec. as compared with 1.6 sec.).

Further description of Figs. 21A and 21B is not appropriate since the schedule is merely one example of how a calculating machine according to the invention may be used. In laying out such a schedule in actual practice, fixed strips are set up as indicated and labels representing the operations to be performed are tentatively mounted in suitable positions on the strips and then shifted about until a most efficient or otherwise desirable schedule is established. However, the inclusion of one such schedule, i. e. the inclusion of Figs. 21A and 21B provides a concrete example to clarify the general discussion.

*Sequence control units and interlock*

Figs. 22, 23, 24 and 25, show the relay systems of the four arithmetical sequence control units 26, 27, 28 and 29 arranged specifically to carry out the schedules of operations shown in Figs. 21A and 21B. Reference to Figs. 36, 37, 38 and 39, showing these figures assembled with related parts, will aid in an understanding of the sequence units.

Figure 22:
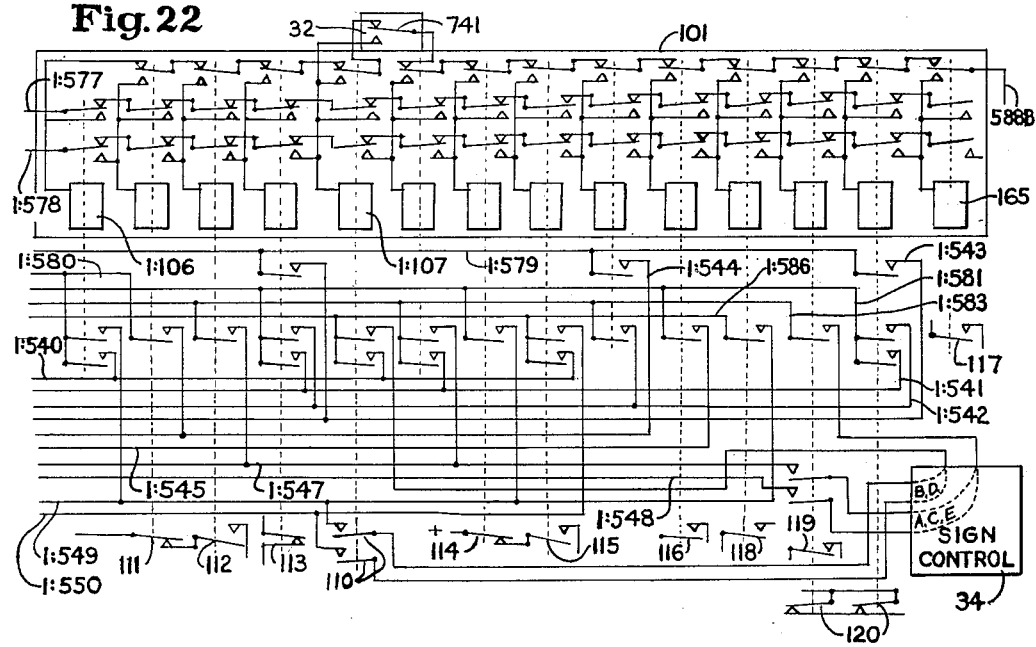
Figure 23:
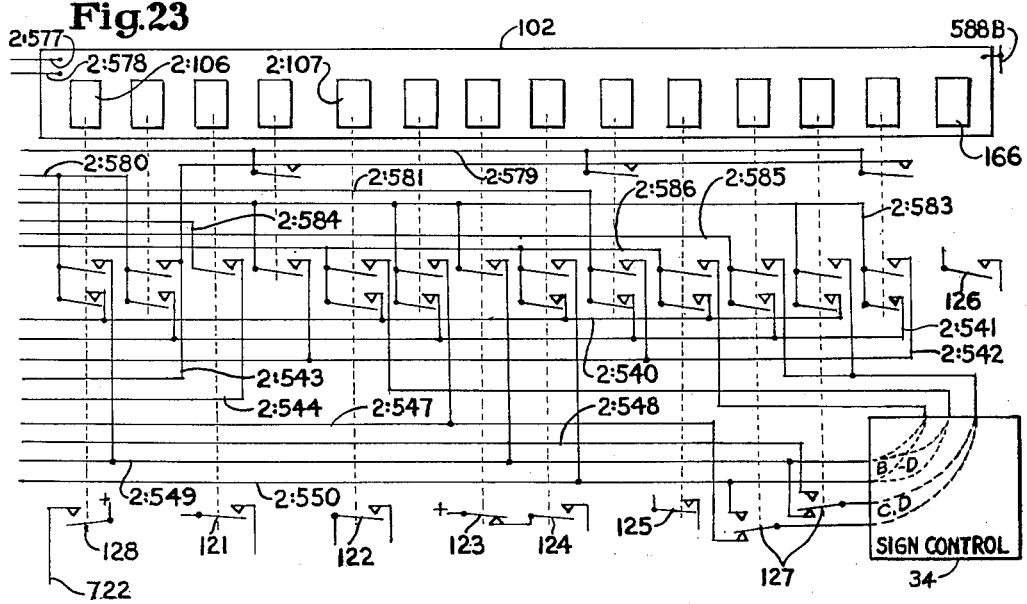

Each of these relay systems comprises a counting chain of relays 101, 102, 103, 104 respectively. Any of several known types of counting chains can be used. Fig. 22 shows in detail a counting chain like that described in connection with Fig. 18. The stepping switches are not shown in the other three figures of this group but may be assumed to be the same. Each chain is controlled by the program control unit 32 as to whether it begins with the opening schedule or with the regular schedule.

The numbering of parts in these and the following figures is according to the system used in Fig. 21. Parts which are or may be duplicated in more than one unit are given the same numbers as in other figures but with the designation of the unit as numbered from 1 to 4 prefixed and set off by a colon. For example 2:578 designates the "advancing pulse" wire 578 of the second unit. In a general statement applying to all units, this prefix is dropped.

The general method of operation of each of the first four sequence control units is as follows. With few exceptions, one relay in the chain controls one operation of the corresponding arithmetical unit. During that operation an advancing pulse and a holding pulse are sent by the arithmetical unit via wires 578 and 577 energizing the next relay in the chain, then when the operation is completed, the previously energized relay has time to relax while relay 554 (Fig. 16) operates to permit the energizing of the selected guard circuit 580—586 when the arithmetical unit is ready. Then the next operation is started under the control of the newly energized relay of the chain. When the chains advance to the terminal relays 165—168 the terminal relays remain energized until locking voltage is removed by the program control unit 32 (Fig. 33).

By a special optional arrangement, a read-out operation and the next succeeding operation are both controlled by the same relay. This is done by routing the pulse from the read-out mechanism over wire 579 and over an additional switch on the sequence relay to the control circuit of the selected succeeding operation, instead of routing it as an advancing pulse to the counting chain as would normally be done in a "universal" sequence controlled machine. For this to be done safely, the read-out operation is guarded by the same guard circuit as required for the succeeding operation. This involves a delay of about 0.1 sec. in some instances while a number is being received into the keyboard which would not otherwise have to be received before the read-out begins. However, even this does not usually lengthen the total scheduled time, because the unit involved is often waiting for an operation to be finished in another unit.

The guard circuits 580—586 and the operational circuits 540—550 are not all used in all the units. The following chart designates their meaning or function and indicates in which units they are used. For the sake of interchangeability, it is advantageous to provide the mechanical parts of the arithmetical units 17A to 20A with all the necessary wires for all these circuits as far as the gang jack 209 (Figs. 5 and 6), noting that this part of the wiring is the same for computing a square root as it is for dividing except that wire 625 (Fig. 15) is not needed in dividing.

| Unit No | 1 | 2 | 3 | 4 |
|---|---|---|---|---|
| Fig. No | 22 | 23 | 24 | 25 |
| Guard Circuits: | | | | |
| 580 Calculator Control relay 553 relaxed | X | X | X | X |
| 581 Carriage in Right Hand position | X | X | | X |
| 582 Carriage in Left Hand position | | | X | |
| 583 Carr. R. and Keyboard full | X | | X | X |
| 584 Carr. L. and Keyboard full | | X | X | X |
| 585 Carr. R. and both keyboards full | | X | | X |
| 586 Carr. L. and both keyboards full | | X | X | X |
| Operational Circuits: | | | | |
| 540 Keyboard to be cleared | X | X | X | X |
| 541 Keyboard not to be cleared | X | X | X | X |
| 542 Read-out | X | X | X | X |
| 543 Return Clear (RT'N-CL) | X | X | X | X |
| 544 Dividend Tabulation (DIV'D TAB) | X | X | X | X |
| 545 Division | X | | | |
| 546 Square Root | | | X | |
| 547 Addition (+ ADD) | X | X | X | X |
| 548 Subtraction (— ADD) | X | X | X | X |
| 549 +Multiplication (+ MULT) | X | X | X | X |
| 550 —Multiplication (— MULT) | X | X | X | X |
| Special Circuits: | | | | |
| 856 (To Fig. 34) Holds number in Sq. Rt. Storage | | | X | |
| 857 Transmits Sq. Rt. to multiplier keyboard | | | X | |

The connections over the switches shown between the guard circuits 580—586 and the operational circuits 540—550 are such that the succession of operations in each unit corresponds to that shown in the chart, Fig. 21. The circuits controlling alternative operations (±ADD, ±MULT) are routed through the sign control unit 34 where one of the two indicated paths is closed depending upon the condition of the selected ones of the relays as designated by the letters A to E as shown in detail in Fig. 27 (see below). The upper path is closed when zero or two relays stand in the "minus" position and the lower path when one or three relays stand in the "minus" position with the exception of Fig. 23 in which the relay indicated as "—D" has the reverse effect, i. e. if one of relays B and D is energized, the upper path is closed.

The switches with truncated connections shown below the operational circuits belong mostly to the interlock (represented by the line 31 in Fig. 1) between the several sequence units, and are shown again in the figure showing the unit to which they are connected. Specifically, switches 111—117 (Fig. 22), 121—126 (Fig. 23), 131—136 (Fig. 24), and 141—147 (Fig. 25) are shown again in Fig. 26, switch 118 in Fig. 25, and switch 119 in Fig. 24. Switch 128 (Fig. 23) energizes the storage control unit 36B via wire 722 and the storage unit 11 to set the first panel of data ready to be transmitted as shown in Figs. 32 and 33. Switch 137 is energized by wire 688 (Figs. 27 and 33) and has three functions. Its back contact is connected over two forks of wire 139. Over one fork it is connected in series with switch 138 to interrupt the locking voltage on wire 856 to the storage relays of the square root computed, of which one group 850—855 are shown in Fig. 34. Over the other fork it is connected in series with the pair of switches 120 (Fig. 22) and the pair of switches 148 (Fig. 25) as shown in Fig. 27 to interrupt the locking voltage to sign relay E. The front contact of switch 137 sends a pulse via wire 748 (Fig. 33) signaling the program control unit 32 that a regular schedule has begun.

In Figs. 24 and 25, the interlock switches 119 and 118 are shown enclosed in small rectangles 26 which represent the first sequence unit 26, indicating that those switches are part of that unit but are wired to the third and fourth units as shown. Likewise, a switch 153 is shown in Fig. 24 inside a rectangle 30 indicating that it is part of the fifth sequence unit now to be described but is wired to the third unit as shown in Fig. 24.

The way in which the program control unit 32 controls the starting of each chain with relay 106 or 108 to start the opening schedule or with relay 107 or 109 to start the regular schedule is illustrated in Fig. 22 which is typical of all the sequence units. The double throw switch 741 shown in the small rectangle 32 at the top of Fig. 22 is one of the switches of relay 701, Fig. 33. Other double-throw switches on the same relay are connected similarly to the other sequence units. Locking voltage is applied via wire 588B at the right when a schedule begins and proceeds through part of the upper chain of switches to switch 741. Then when switch 741 stands as shown, the locking voltage proceeds through the rest of the chain to energize the first relay 1:106 and thereby to start the opening schedule. During the ensuing regular schedule (following the opening schedule) self-holding relay 701 is energized by switch 137 (Fig. 24) throwing switch 741 to the front contact. After that, each time locking voltage is withdrawn and reapplied, the locking voltage is routed over the front contact of switch 741 to energize relay 1:107 and thereby to start the regular schedule until relay 701 is relaxed, as explained with reference to Fig. 33.

Fig. 26 (in two sections 26A and 26B) shows most of the interlock between the five sequence controls (26 to 30 of Fig. 1) and the details of the fifth sequence control 30 which controls the transmission of numbers and + and − signs. The interlock is shown above the line C—C. The left side of Fig. 26A fits onto the right side of Fig. 29A. The counting chain 105 may be of the same type as that in Fig. 22, but some of the relays are then very heavily loaded because of the large number of switches as shown. The heavy loading can, of course, be avoided by the use of slave relays in known manner or by using instead a known counting chain having two relays in each step. Alternatively, in some instances the load can be distributed by relocating some of the switches on those relays in chains 101—104 which, because of the interlock, are necessarily closed at the right time. For example, relay 150 controlling the seventh transmission is heavily loaded. Here the switch 151 controlling the main keyboard of the #3 unit can be put on the fifth relay 2:107 (Fig. 23) of the second chain 102 or on the sixth relay 140 of the fourth chain 104 without further guarding. Also the group of three parallel switches 152 can be put on relays 1:107 (Fig. 22), 2:107 (Fig. 23) and 3:107 (Fig. 24) if the group be connected in series with a single switch (not shown) substituted for them on relay 150. However, to simplify the diagram, all the switches are shown on the relay with which they are primarily associated, as they are in the simplest embodiment of the invention.

The interlock switches 111 to 117, 121 to 126, 131 to 136 and 141 to 147 function as part of the guard circuits of the fifth sequence control to prevent each number transfer from occurring before the units involved are ready. These guard circuits are shown above the broken line C—C in Fig. 26. They will not be described in complete detail, as the details can be followed more easily by tracing the circuits themselves and their functions are listed in the table of transmission below. The guard circuits originate in most cases in the "keyboard clear" switches 369, Fig. 15, via wire 597 (Fig. 16) of the several arithmetical units shown as rectangles 17 to 20 in Fig. 26A, to ascertain that a main keyboard which is to receive a number is already clear. A switch 796 (see Figs. 26A and 35) is provided on the output unit 21 to detect when the carriage is returned to the right-hand position. This switch is closed when the carriage is returned and opens when the carriage moves away from this position. One guard circuit 797 passes over this switch and guards the first transmission after each carriage return. It happens in the particular schedule herein described that the first number transmitted after every carriage return is received in the keyboard of the second arithmetical unit 18. Accordingly, the carriage return guard circuit 797 forks off from wire 2:597. There is considerable flexibility in the design of the guard circuits. For example, guarding whether an operation that clears the keyboard is finished is largely equivalent to guarding whether the keyboard is clear. In the circuit as shown the switches 111 to 117, 121 to 126, 131 to 136, and 141 to 147, already mentioned, are arranged so that only one keyboard is guarded on any single transmission, as this simplifies the wiring. To accomplish this simplification, a keyboard is sometimes guarded on a preceding transmission, and sometimes a normally closed switch is provided on the appropriate relay of one of the first four sequence controls to make sure that the preceding operation on an arithmetical unit is finished. A normally open switch on a relay controlling a given operation assures that the next preceding operation has begun. In some cases both types are used, one on each of two successive relays, to time a transmission strictly between two arithmetical unit operations.

The interlock as described positively prevents every transmission except the twentieth (relay 163) from beginning until a preceding read-out is completed. This exception has a time factor of safety of 300% or more, but optionally may be guarded by a normally open switch on relay 139 of chain 104 (Fig. 25).

The fifth sequence unit 30 is shown below the broken line C—C in Fig. 26. As an example of its operation, the first step in the sequence will be described in detail. At the beginning of a computation, relay 108 is energized by the locking voltage as described with reference to Fig. 22 to start the opening schedule of the number transfer sequence. Then when the conditions guarded by the guard circuit are fulfilled, namely the second keyboard cleared, the typewriter carriage returned, and the second operation begun on the second and fourth arithmetical units, the guard circuit supplies + voltage over the first switch in group 155 to wire 171, thence to the number transfer control 24 (Fig. 29) to start the "printing" type of number transfer cycle by energizing the single turn clutch 261 which causes the drum-type switch 271 to make one revolution. Note that the switches are grouped in horizontal rows 155 to 159 according to function and the group numbers are at the right of Fig. 26B. The drum-type switch 271 which is shown in greater detail in Fig. 29B sends a pulse directly to relay 61 (Fig. 35) to control the trunking of the output unit and sends timed pulses through wires 73, 74, 75, 71, 177, 178, and one or two pulses through wire 92 (Fig. 26). The pulses through wires 73 and 74 are staggered and proceed over the two first switches in group 156 to control the successive trunking of the main keyboards of the second and fourth arithmetical units via wires 2:84 and 4:84. The pulse over wire 75 is ineffeceive at this step since no multiplier keyboard is scheduled to receive a number during the first number transfer, hence no switch in group 157 is provided on relay 108. The pulse over wire 71 proceeds over the first switch of group 158 to wire 180 thence via the storage control 36 (Figs. 1, 4 and 30) to connect the group of storage switches 37 (Figs. 2A and 4) on which the number is stored which is scheduled to be transmitted at this time, namely the number "sin U" stored in the upper row of switches in panel 10A (Fig. 2).

Group 159 of Figs. 26A and 26B is described with reference to several other figures, particularly Fig. 29A which fits on the left of Fig. 26A.

The first pulse over wire 92 only occurs when the stored number is negative, that is when the switch 38 (Figs. 2A and 4) is set at the "minus" position. It will be noted that the lines 90 and 91 of Fig. 4 are symbolic and do not show this actual circuit. The circuit is indicated in Fig. 29. The first pulse (when it does occur) proceeds over wire 80 and switch 38 (Figs. 4 and 29) then over wire 90, over the back contact of a double-throw switch of relay 670A (Fig. 29), over wire 92 (Fig. 26) and over the first switch in group 159 to wire 193, thence to the sign control relay unit 34 shown in detail in Fig. 27 to set sign relay C in the negative position. The first pulse (if any) over wire 92 is ended by relay 670A (Fig. 29) being energized and disconnecting wire 92 from wire 90 and connecting it to wire 671, which is energized during nearly the whole course of the printing operation. Relay 670A is first energized in parallel with relay 670 (Fig. 27) which changes the connections of most of wires 191—199 (Fig. 26) so that thereafter they control the printing of the number as positive or negative in accordance with the position of the sign relays (Fig. 27), and particularly in accordance with sign relay C during this first transmission. This first transmission is ended by pulses over wires 177 and 178, advancing the chain 105.

As already mentioned, we prefer to indicate a negative number by energizing a solenoid 879 (Fig. 35) which controls the raising of the typewriter ribbon so that the number is printed in red.

The wires shown below switch group 158 and wired thereto control the source of the number transferred as follows:

1:—, 2:—, 3:—, and 4:82 Transmit from readout switches 50 of respective arithmetical units.
186 alone: Transmit cosine from square root unit.
186 with 187: Transmit (1−cos) from the same.
180 Transmit sin U from storage 10.
181 Transmit cos U from storage 10.
182 Transmit Q from storage 10.
183 Transmit 1/R from storage 11.
184 Transmit N/N' from storage 11.
185 Transmit $t$ from storage 11.

The wires 190—199 shown below switch group 159 are listed below. Under "Set" is listed the respective sign relay set during the first pulse over wire 92, and under "Printing Control" listed the relay or relays controlling the printing when the respective wires are connected to wire 92.

|   | Set | Printing Control | Special |
|---|---|---|---|
| 190 |   |   | When energized along with wire 2:82, causes (1+cos V) to be transmitted in place of cos V. |
| 191 | A | A |   |
| 192 | B | B |   |
| 193 | C | C |   |
| 194 | D | CD |   |
| 195 | C | CD |   |
| 196 | E |   |   |
| 197 | D per CE |   |   |
| 198 |   | A |   |
| 199 |   | D |   |

During the "multiplier" and "simultaneous" types of transfer, the "printing control" is ineffective.

In Fig. 26 the pulses over wires 177 and 178 are simultaneous and occur after the number has been transmitted and printed and advance the chain 105 in the same manner as chain 101 is advanced by simultaneous pulses over wires 577 and 578 (Fig. 22) so that the next succeeding relay in chain 105 is energized and the first relay 108 is then relaxed.

The chain 105 of Fig. 26 advances in this manner to the terminal relay 169 (Fig. 33), which functions as a part of the program control unit 32, and is not shown in Fig. 26. Each relay except the terminal relay has one switch in group 155 wired to one of the three wires 171, 172, 173 according to which one of the three types of number transfer cycles is scheduled. A "printing cycle" (wire 171) is scheduled whenever a number is to be printed, a "multiplier cycle" (wire 173) is scheduled whenever the number is not printed but is received either in one or more multiplier keyboards or in two main keyboards or both, and a "simultaneous cycle" (wire 172) is scheduled when the number is received in only one main keyboard. Alternatively, when a number is received only in two main keyboards it can be scheduled as two successive "simultaneous type" transfers. This arrangement is quicker in the sense that the transfer control is ready sooner for the next transfer operation. In the schedule shown herein, this situation occurs only once in the opening schedule, which is not run through very often, and once in the main schedule at a time when the succeeding number transfer is delayed by multiplications in the first and second arithmetical units anyway, so that practically no time is lost by scheduling as shown. Of course, a more powerful D. C. source could transmit to two keyboards simultaneously, but a smaller power unit is preferred because it is less expensive. In the schedule described herein, no number is received in more than two main keyboards during any one number transfer step.

The chain 105 (Fig. 26) is started at the first relay 108 of the opening schedule or at the first relay 109 of the regular schedule in the same manner as chain 101 (Fig. 22) is started at relay 1:106 or 1:107.

Chart

The following chart of the transmission of numbers is inserted to help in the understanding of the schedule. The transmissions are numbered from 1 to 32 in the first column, the first five being in the opening schedule and the rest in the regular schedule. The type of transfer is indicated in the second column as P, M, M*, or S. Specifically P indicates the printing type, M the multiplier or digit-at-a-time type, M* a transmission to two main keyboards only by the M-type transfer, and S the simultaneous type for transmission to a single main keyboard. The next column indicates the source (or position transmitted from) as R (ray data) L (lens data) 1, 2, 3, 4 (transmitters of respective arithmetical units), Q* and Q (transmitting 1−cos or cos respectively from the square root unit). The next two columns indicate the main keyboards and multiplier keyboards receiving the number.

the second and third" and "after the fourth" arithmetical operation respectively on the respective unit. The special note "Guards #3" indicates that an operation on the #3 unit must wait until the twelfth transfer is finished so that the number is not erased from the #3 transmitter before this transfer. A terminal relay is indicated by the letter T.

*Chart of transmissions of numbers*

| No. | Type | From | To K. B. | To M'R | Sign Relays Sets | Per | Prints | Guards | | | | |
|---|---|---|---|---|---|---|---|---|---|---|---|---|
| | | | | | | | | K. B. Cl. | #1 | #2 | #3 | #4 |
| 1 | P | R | 4, 2 | | C | | C | 2X | | :3 | | :3 |
| 2 | M | L | | 4 | E | | | | | | | |
| 3 | M* | R | 1, 4 | | A | | | 4 | 2:3 | | | |
| 4 | P | R | 3, 1 | | B | | B | 1 | | | 3:4 | |
| 5 | P | 1 | | | | | A | | 4: | | | |
| 6 | M | L | | 4 | E | | | 4 | | | | :6 |
| 7 | P | 4 | 3, 4 | 1, 2, 3 | D | | C, D | 3 | | :5 | | |
| 8 | M | 4 | 4 | 4 | | | | 4 | | | | :8 |
| 9 | S | 3 | 2 | | | | | 2 | | | | |
| 10 | S | 2 | 1 | | D | C, E | | 1 | | | | |
| 11 | S | 4 | 3 | | | | | 3 | | | :7 | |
| 12 | S | 3 | 4 | | | | | 4 | | (Guards #3) | | |
| 13 | M | Q* | | 1, 2 | | | | | 7:8 | 7:8 | | |
| 14 | P | Q | 4 | | | | | 4 | | | | |
| 15 | M* | 4 | 3, 4 | | | | | 3 | | | | 10: |
| 16 | S | 1 | 1 | | | | | 1 | | | | |
| 17 | P | 3 | | 2, 4 | | | D | 2 | | | | 11: |
| 18 | P | 2 | 2 | | B | | B | 4 | | :10 | | |
| 19 | P | 1 | 4 | | C | | C | 4 | :10 | | | |
| 20 | S | 4 | 1 | | A | | | 1 | | | | |
| 21 | S | 2* | 3 | | | | | 3 | | | :12 | |
| 22 | S | 1 | 2 | | | | | 2 | | | | |
| 23 | M | Q* | | 2 | | | | | | | | |
| 24 | M | L | | 4 | E | | | 4 | | | | |
| 25 | S | 4 | 3 | | | | | 3 | | | | :15 |
| 26 | P | Q | 3 | | | | | 3 | | | | :15 |
| 27 | S | 3 | 1 | | A | | | 1 | | | :16 | |
| 28 | P | 2 | 4, 2 | | C | | C, D | 2X | | :T | | |
| 29 | S | 4 | 1 | | | | | 1 | | | | :T |
| 30 | M | L | | 4 | E | | | 1 | | | :T | |
| 31 | P | 3 | 1 | | B | | B | 1 | | | | |
| 32 | P | 1 | 4 | | A | | A | 4 | :T | | | |

2* denotes special transfer of (1+cos V).
No. 26 (and sometimes #32) controls the carriage return on the output unit.

The columns headed "Sets" and "Per" indicate the sign relay to which the sign is signalled, and the special case in which sign relay D is set according to the condition of relays C and E. The column headed "Prints" indicates the sign relays controlling the printing.

The remaining columns indicate the guard circuits. Under K. B. Cl. are listed the keyboards guarded so as to be clear when the number is transferred (sometimes arranged so that the keyboard guarded does not receive a number until a subsequent transfer), and an X denotes that the carriage return of the output unit is guarded. The last four columns #1, #2, #3, #4 indicate the function of the interlock switches on the respective sequence controls. For the purpose of this chart, the relays of each sequence unit are supposed to be numbered in order from the beginning of the opening schedule to the end of the regular schedule. A number in one of these columns followed by a colon denotes a normally closed switch on the designated relay indicating that that relay must not be energized (hence the operation controlled thereby must be finished) and a number following a colon denotes a normally open switch on the designated relay indicating that that relay must be energized (hence the preceding operation has started but the current operation has not ended) when the transfer takes place. In short, the combined effect of the keyboard guarding and these interlock switches is that, for example, ":3," "2:3," and "4:" normally indicate respectively that the transmission occurs "before the third," "between

Sign control unit

Figure 28:
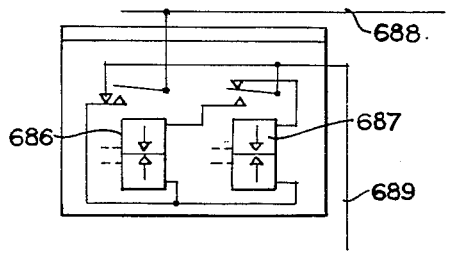

Fig. 27 shows the sign control unit 34 and Fig. 28 shows a detail thereof. The sign control unit receives a signal via the fifth sequence control 30 (Fig. 26) each time a negative number is transmitted from the data storage units 10, 11 and each time an overdraft occurs in one of the arithmetical units. Such an overdraft indicates a reversal of sign of one of the numbers as compared with a previous number according to schedule. It may be noted that the sign control unit is arranged to minimize the number of overdrafts by storing the signs in the sign control relays, whereas in a universal type of machine it would be preferable to schedule the sense of each addition or multiplication in strict accord with the signs of the numbers involved so that an overdraft would indicate definitely that the number is negative and thereby eliminate or greatly reduce the collateral storage of signs.

When an overdraft occurs, the sign control unit is sometimes not ready to receive the signal. Accordingly, this signal is scheduled to be sent when the number is first transmitted rather than at the moment the overdraft occurs.

The sign control unit comprises four flip-flop relay pairs 34A, 34B, 34C, 34D, and one self-locking relay 34E labelled A to E respectively inside the box 34. These will hereinafter be referred to as the five sign relays A, B, C, D, and E. The flip-flop units may have any of several known circuits. The preferred circuit shown in Fig. 28 consists of two double-wound relays with opposed windings, the left-hand one having a make-before-break switch and the right-hand one having an ordinary double-throw switch. A steady + locking voltage is applied by the program control unit 32 via wire 688 from the beginning of the opening schedule (after a slight delay) until the closing schedule. When relaxed the relays represent a plus sign, and when energized a minus sign. Each negative sign or overdraft signal that is received in the flip-flop unit is a + pulse over wire 689. Flip-flop circuits are well known, and it is sufficient to say that in this circuit the left-hand relay operates at the beginning and the right-hand relay at the end of the first pulse. The left-hand relay is relaxed by opposed windings at the beginning of the second pulse and the right-hand relay relaxes at the end thereof. Thus the second pulse returns the flip-flop unit to its original state, and this is analogous to two negative signs (or two sign reversals) being equivalent to two positive signs (or to no sign reversal). Also when the locking voltage is removed both relays relax.

In Fig. 27, the sign control unit is shown within the dot-dash rectangle 34, and connecting units are shown as small rectangles 21, 24, 26, 27, 28, 29, 30, and 32. The four flip-flop units are represented by four rectangles A, B, C and D each enclosing two relay coils, and the fifth sign relay E is shown to the right of these. Above the relay coils are shown a group of networks 650 which control arithmetical operations in the four arithmetical units, and below the relay coils are shown a system of switches and networks 660 which control the printing of numbers as positive or negative by the output unit 21, and also control the setting of relay D in accordance with relays C and E at one point in the schedule. Below the latter switches is shown a relay 670 which when relaxed connects the input wires 191—195 (tying in with Fig. 26) with the coils of the flip-flop units and when energized connects them and also wires 198 and 199 with the printing-control system of switches 660 to control the printing. This relay of course, is operated only during a "printing" type of number transfer cycle. Input wire 196 is connected directly to the coil of sign relay E, and wire 197 is connected via two double throw switches to energize sign relay D in accordance with the position of relays C and E. Input wire 198 is energized during the transmission of the number (1+cos V), the twenty-first transmission in the schedule, and leads to switch 666. Switch 666 is shown again in Fig. 31, and the operation of this circuit is described below with reference thereto.

The system of switches 650 is arranged in separate networks 651 to 655. Each network includes switches on one, two or three sign relays. Each network includes a double throw switch on one relay, and two double throw switches acting as a reversing switch on each relay in excess of one so that a pulse fed in through the single double throw switch comes out over one of two wires when one or three of the sign relays involved is or are energized and over the other wire when none or two of the relays is or are energized. The first of these wires corresponds to the lower sign and the second to the upper sign of one or more of the ± and ∓ operations represented in Fig. 21 and is connected (either permanently or temporarily) with the relay (Fig. 17) controlling the solenoid corresponding thereto. This connection is permanent in the case of networks 651 and 652, which are used only to control multiplications in the second arithmetical unit and additions in the fourth unit respectively, and temporary in the case of networks 653, 654 and 655, which are used to control more than one set of operations. The temporary connections are usually made by two single throw switches (e. g. switches 100, Fig. 22) on one of the relays in relay chains 101, 102, 103, and 104, Figs. 22, 23, 24, and 25, but in case two and only two operations are scheduled to be controlled by one network, the connections may optionally be made by a double-throw switch on each of the two relays, as for example the double throw switches 127, Fig. 23. In some cases (networks 651 and 653) only part of one network is used to control an operation which depends on the sign or signs stored in less than all of the sign relays involved in that network. In these cases a wire is connected into the middle of the network as shown. The switches which, at least once during the schedule, control an operation which is ready to begin immediately as soon as the relay is scheduled to receive its sign pulse must be on the life-hand relay of each flip-flop pair, whereas switches which only control operations which begin later may be put on the right-hand relay of the pair (and are so shown) to equalize the loads.

The system of relay switches 660 controlling the printing is simpler because it is only required to emit a pulse when the sign is negative, that is when an odd number of the sign relays involved stand energized. Relays C and E combine to control whether or not a pulse is sent to relay D, and relays C and D combine to determine the sign of the printing of a number, and so these pairs carry networks of double-throw switches 661 and 662. The other relays are used only singly in controlling the printing, and carry only single-throw switches 663 and 664. Relay C carries a separate single-throw switch 665, but a connection to the middle of network 662 takes the place of a separate single-throw switch on relay D.

During a printing cycle, a first pulse is sent over wire 92 by the number transfer control unit 24 when a negative number is transmitted from storage or when an overdraft has occurred in an arithmetical unit, and in case this pulse is scheduled to be registered on one of the sign relays one of the paths shown by dotted lines in the fifth sequence control 30 (and shown in detail as the system of switches 159 in Fig. 26) is closed. Relay 670 is relaxed at this time, and the pulse goes to one of the sign relays via one of wires 191—195, thence via a switch of relay 670 (which is relaxed), and thence via one of wires 689A, 689B, 689C, or 689D according to schedule. After the first pulse ends, a long pulse over wire 671 energizes relay 670, and whether or not there has been a "minus" or "overdraft" indicating pulse, a long pulse is then sent over wire 92, thence via a front contact of relay 670, via the printing control network 660 and thence, in case one and only one of the involved relays is energized (representing a minus sign) the pulse goes out over wire 672 to the output unit to cause the number to be printed as negative. When no pulse is sent to the output unit the number is printed as positive. The second pulse over wire 92 ends when the pulse over wire 671 ends.

Wires 196 and 197 are not scheduled to be energized during any printing cycle. During non-printing cycles one pulse only is sent over wire 92 by the number transfer control unit 24, so that these two wires do not need to be routed over switches on relay 670. Wires 198 and 199 are scheduled to be energized during printing cycles when no sign relay is scheduled to receive a sign pulse, so these wires reach a dead end when relay 670 is relaxed and are connected to the system of switches 660 to control the printing when relay 670 is energized.

Locking voltage for relay E is drawn from wire 688 and routed via switch 137 shown also in Fig. 24, the pair of switches 120 shown also in Fig. 22, and the pair of switches 148 shown also in Fig. 25, thence via wire 688A. These switches interrupt the locking voltage at three preselected points during the schedule to erase the sign stored on relay E and apply the locking voltage again to prepare relay E for receiving another sign.

Further specific details of the sign control unit can be followed more easily by tracing the circuits than by a verbal description.

Number transfer control unit

Fig. 29 (in two parts 29A and 29B) shows the number transfer control unit and the principal circuits connected thereto. Fig. 29B fits onto the bottom of Fig. 29A and the latter fits on the left of Fig. 26A (see Fig. 40 for relationship of these figures). This unit consists principally of three pulse generating circuits shown as drum type switches 271, 272, 273 which are driven by motors not shown and controlled by single turn clutches 261, 262, 263. These drum type switches have contact sectors numbered from 280 to 299 with the letter M, S or P to indicate the respective drums which control the multiplier, simultaneous, or printing type of transmission.

When a number transfer is to take place, a pulse is received over one of the wires 171, 172 or 173 (see upper right of Fig. 29A where it joins Fig. 26A) which are normally connected to wires 171A, 172A, and 173A. This pulse actuates the selected one of the single turn clutches 261, 262 or 263 which causes the drum associated therewith to make one revolution. The direction of revolution is such that the time scale on each drum as shown runs from left to right. Plus voltage is fed to each drum over sectors 295M, 295S, 295P. Sectors 280M, 280S, and 280P energize wire 89 which is connected with the sign switch of one of the stored numbers or with the overdraft switch of one of the read-out mechanisms. If said switch is in the negative or overdraft position, the pulse proceeds to wire 90 and 92, thence to the fifth sequence unit where it is distributed to the proper sign control relay when a sign control relay is scheduled to receive the sign.

Sectors 281M, 281S and 281P energize wire 73 to the fifth sequence unit where it is sent back over one of wires 1:24, 2:24 3:24 or 4:24 to connect one of the keyboards with the number circuits when a keyboard is scheduled to receive a number. Sectors 282M and 282P energize wire 74 which is connected in the same way with a second wire of the same group when a second keyboard is scheduled to receive the same number.

Sectors 283M to 291M and sectors 283P to 291P energize successive wires in the wire group 47, which proceed as shown in Fig. 30 to the bridging relays, bridging the number trunks 15 to successive digital groups of the number trunks 12 for transmitting successive digits to a multiplier keyboard or to the output unit. Sectors 292M, 292S, and 292P energize wire 76 which is connected (under the control of the sequence unit 30 acting through wires 180—185:82, or 186) to a group of storage relays or to a group of read-out switches or to the storage relays associated with the square root relay unit through which the number trunks corresponding with the number to be transmitted are energized. The switches associated with sectors 292M, 292S, and 292P are heavy duty switches which have sufficient capacity to carry the heavy solenoid currents.

Sectors 293M, 293S and 293P and 294M, 294S and 294P energize wires 276 and 278 to send an advance pulse to the fifth sequence unit. More precisely sectors 294 energize wire 276 which energizes relay 277 (upper right corner of Fig. 29A) disconnecting wires 171, 172 and 173 from wires 171A, 172A and 173A to prevent the starting of the next number transfer while the sequence unit is advancing. While this relay is energized wire 278 is energized by sector 293M, 293S, or 293P and is connected to wires 177 and 178 through which it sends the advance pulse and the hold pulse to the chain 105. This chain then advances as described in more detail with reference to Fig. 22.

Sectors 296P and 297P send pulses to the output unit 21 (Fig. 35) energizing solenoids 896 and 897 for printing the decimal point and for spacing in the middle of the number as previously described. Sector 298P energizes a double throw switch on relay 890 (Fig. 35) which is relaxed. When the output unit typewriter is scheduled to be tabulated to the next carriage position, in which case the pulse from sector 298P proceeds to solenoid 898 which operates the tab key. Relay 890 is energized under the control of the sequence unit when a carriage return is scheduled, and in this case the pulse from sector 298P proceeds to solenoid 895 which actuates the carriage return key.

Sector 299P energizes wire 671 and relays 670 and 670A governing the first and second sign pulses described above with reference to Fig. 27. The latter is then self-holding on wire 80, mentioned above in this section.

One special transmission wherein (1−cos I) is transmitted instead of cos I occurs twice in the regular schedule and is described below with reference to Fig. 30. Another special transmission in which (1+cos V) is transmitted instead of cos V is described with reference to Fig. 31. These special transmissions involve the operation of special relays controlled by the sequence unit 30. In other respects they are like ordinary transmissions as above described.

It may be noted that the sectors 280S and 280P act sooner than sectors 281S in the one case and 281P and 283P in the other. This is necessary because operations initiated by the latter sectors depend upon the sign transmitted by sectors 280S and 280P. The same is not true during any M-type number transfer in the specific schedule shown herein, and so sectors 280M, 281M, and 283M begin simultaneously.

The slower action of the P-type transfer is made necessary because the electric typewriter used in the output unit is not adapted to receive numbers as rapidly as the multiplier keyboards of the arithmetical units.

The drawing as shown gives the timing of the several pulses. In practice we have found it preferable to use a single control drum, a relay chain, and a circuit control relay instead of two control drums for the P- and M-type transfers. The circuit control relay (not shown) closes one set of circuits for a P-type and another set for an M-type transfer. The drum rotates twice for a P-type and once for an M-type transfer. The pulses are distributed over wire-group 47 by successive relays of the chain which is advanced by pulses from a single broken sector having the same frequency as 292M replacing sectors 284M to 291M or by another sector having the same frequency as 292P replacing sectors 284P to 291P; sector switches 281M and 282M and 281P, 282P, 296P, 297P and 298P are replaced by switches on the relay chain. This optional form is not essential to the invention (means for emitting pulses according to a time pattern are well known) but it is more economical to construct.

*Special relays for transmitting*

$(1 - \cos I)$ and $(1 + \cos V)$

Fig. 30 shows the preferred means for transmitting the complement of a cosine. It will be noted from Fig. 21 that the number transmitted from the square root transmitter of the third arithmetical unit 3:23 is cos I at the second and fourth transmittal therefrom and $(1-\cos I)$ during the first and third. To control this, wire 187 (Fig. 26) is energized in the latter case. How this operates is described as follows.

As described in the copending application mentioned above, each digit of the square root is stored in a set of relays like those shown in Fig. 34 and described below. When the square root or its complement is to be transmitted, wire 186 is energized under the control of the fifth sequence unit and the number transfer control unit as above described with reference to Fig. 29. This energizes relay 860 (Figs. 29A and 34) which in turn connects the storage relays with wire 76 which is energized under the control of the number transfer unit at the instant the number is to be transmitted. Obviously, a set of eight relays corresponding to relays 63 of Fig. 4 could be connected between this square root storage and the main number trunks 12 to transmit the complement of the cosine. The wire corresponding to a zero to the left of the decimal point would be connected directly without such a rectifying relay because zero is transmitted in this position regardless of whether the cosine or its complement is transmitted.

Fig. 30 shows a simpler arrangement for transmitting the complement of the cosine. This simpler arrangement is quite satisfactory because the particular schedule shown herein calls for the transmitting of the complement of the cosine only to the multiplier keyboards of the arithmetical units, that is, one digit at a time. Hence the rectification is satisfactorily accomplished by one relay 680 between the main number trunks 12 and the printing trunks 15. Fig. 30 corresponds to a small section of Fig. 4 and shows the main number trunks 12 at the left and the printing trunks 15 at the right. There are nine groups of number trunks in the complete machine with ten wires in each group. Fig. 30 shows the bridging relays 64, 65, 66 corresponding to those shown in Fig. 4 except that they bridge the main number trunks 12 to a set of auxiliary trunks 15a. Relay 64 bridges the left-hand group of number trunks and relays 65 and 66 bridge the two right-hand groups of number trunks. A box 685 indicates that there are six additional bridging relays which bridge the six intermediate groups of number trunks to the auxiliary trunks 15a. When relay 680 is relaxed, the auxiliary trunks are connected to the printing trunks 15 in the normal manner and the circuit is exactly as shown in Fig. 4. Accordingly, this relay is relaxed at all times except when the complement of a cosine is to be transmitted. Relay 680 is energized by wire 187 under the control of switch 160 or switch 161 (Fig. 26) of the fifth sequence unit before the complement of a cosine is to be transferred and remains energized until that transfer is completed. The lowermost switch of relay 64 is connected directly to the appropriate one of the printing trunks 15 so that a zero is transmitted for the first digit to the left of the decimal point regardless of whether relay 680 is energized or not. After the first digit is transmitted, the other digits are transmitted in succession but since relay 680 connects the wires of trunks 15a to the complementary wires of trunks 15, the complement of the cosine is transmitted. As mentioned before, no provision is made for the "fugitive one."

Fig. 31 shows the special control for transmitting $(1 + \cos V)$ when cosine V stands in the read-out storage 2:50 of the second arithmetical unit. The overdraft switch 2:53 and the left hand one of the read-out switches 2:50 are shown in the lower part of the drawing. The connections 2:90 and 2:91 to the sign relay unit 34 are symbolic as was the case in Fig. 4. The ten points of the read-out switch 2:50 are connected to the front and back contacts of switches on the relay 2:63 as was shown in Fig. 4. The armatures of three of these switches are connected indirectly via switches of relays 682 and 684 to the number circuits 12A rather than directly as shown in Fig. 4. During all ordinary transmittals these relays 682 and 684 are both relaxed and the connections to the number trunks are the same as shown in Fig. 4.

It may be noted that the cosine may be positive or negative, but in no practical situation is it as great as unity in the negative case. Also the arithmetical unit may have overdrafted or not, independently of the sign of the cosine. This makes four ordinary possibilities to be accounted for, plus a fifth possibility, namely that the cosine equals plus one.

The switch 189 in the fifth sequence unit 39 is closed when the transmittal of $(1 + \cos V)$ is to be carried out and remains closed until the transmittal is finished. This energizes wire 190 and the armature of the double throw switch 666 on sign relay B (also shown in Fig. 27). At this point in the schedule, sign relay B stands in the minus position in case the cosine of V is negative as determined by the previous operations of the machine and stands in the plus position with switch 666 in the position here shown (Fig. 31) when the cosine is positive. Thus wire 681 is energized energizing relay 682 when the cosine is positive and wire 683 is energized energizing relay 684 when the cosine is negative.

Thus in case the cosine is positive the rectifying relays 2:63 (of which one is shown) are energized over the back contact of the lower double throw switch on relay 684 when the overdraft switch stands in the overdraft position as shown, but are not energized in case the overdraft switch is not in the overdraft position. On the other hand, when the cosine is negative, relay 684 is energized as has just been described and the rectifying relays 2:63 are energized over the front contact of the lower double throw switch 687 of relay 684 when the overdraft switch 2:53 stands in the no-overdraft position and are not energized when the overdraft switch stands in the overdraft position as shown.

The left-hand read-out switch 2:50 is set at zero or one when no overdraft has occurred and is set at 9 as shown or 8 when there has been an overdraft. When it is at zero or nine the digit to the left of the decimal point is to be transmitted as a one when the cosine is positive and as a zero when the cosine is negative. For this reason the lowest switch on relay 2:63 is connected to the lower double throw switch on relay 682 so that a zero is transmitted when this wire is energized and relay 682 is relaxed and a one is transmitted when relay 682 is energized. Similarly the second lowest switch on relay 2:63 is connected to the upper double throw switch on relay 684 so that a 9 is transmitted in case this second switch is energized and relay 684 is relaxed whereas a zero is transmitted in case relay 684 is energized. Thus the four ordinary possibilities above mentioned are accounted for and the number transmitted over the number trunks at this time is $(1 + \cos V)$ rather than the number $\cos V$ standing on the read-out switches. In case $\cos V$ is equal to plus one, the third lowest switch on relay 2:63 is energized. Wire 681 and relay 682 are also energized since the cosine is positive in that case. (No practical situation occurs in lens computing in which $\cos U = -1$.) Hence wire 686 is connected over a front contact of relay 682 and a two is transmitted in front of the decimal point.

*Data storage control*

Fig. 32 shows the circuit of the storage control unit 36. This unit comprises a chain of double-wound relays 731—737 and is shown for a storage capacity of two groups of ray data numbers and five groups of lens data numbers. The ray data numbers are stored in ray data storage 10 and the lens data numbers are stored in the lens data storage 11. The chain is broken between the two storage units. Optionally the units may be wired together with a plurality of circuit breaking jacks between different panels so that the chain can be broken by plugging in a plug into any of the jacks, thus dividing the storage capacity between the two storage units at the option of the operator. For simplicity however, the wires represented by broken lines 760 between unit 10 and unit 11 and also between relay 732 and 733 will be assumed to be absent for the purpose of the present description.

The switches 751—757, one on each storage panel, are set by the operator at the "in" position when the panel contains data to be used in the current problem and are set at the "out" position when the panel is not to be used in the current problem. As shown in Fig. 32, the second panel of the ray data storage 10 and the first and fourth panels of the lens data storage are set at the "in" position ready to be used.

When the machine is first turned on, a locking voltage is immediately applied via wire 711 and wire 721 to the lower end of each part of the chain. After a delay, plus voltage is applied via wire 712 to the upper end of the first chain, this voltage is routed through switch 751, which is set in the "out" position to switch 752 and energizes relay 732 through its second coil. It is then held by the locking voltage over wire 711 through its first coil. It is evident from this description that the delayed voltage over wire 712 proceeds to the first switch in the chain which is set at the "in" position and energizes the relay corresponding thereto, and that if there is no switch so set, the voltage will flow through the entire chain and out on wire 715 to signal this fact to the program control as will be shown with reference to Fig. 33.

Similarly plus voltage is applied to the lower part of the chain over wire 722 by the program control unit (Fig. 33) and this proceeds to the first switch which is set in the "in" position, which is the first switch 753 in the chain as shown in the drawing, and pulls up and energizes the corresponding relay 733.

When any of relays 731—732 is energized it connects wire 181 to the upper selector relay of the corresponding storage panel, wire 182 to the center selector relay of the storage panel and wire 183 to the lower selector relay of the storage panel. Two of these relays 69 and 70 of the first panel are shown in more detail in Fig. 4. Similarly when relay 733 is energized it connects wires 184, 185 and 186 to the three selector relays of the corresponding storage panel. As long as these relays are energized the energizing of wires 181—186 respectively by the fifth sequence unit 30 energizes the corresponding relay so that a transmitting pulse from the number transfer control 42 transmits the selected number over the number trunks 12 as shown in Figs. 4 and 29.

The ray data storage control chain is advanced by simultaneous pulses over wires 713 and 714 under the control of the program control unit as shown in Fig. 33, and the lens data storage control chain is advanced by simultaneous pulses over wires 723 and 724 from the switches 170 of the fifth sequence control unit 30, also as shown in Fig. 33. Fig. 33 is on the same sheet as Fig. 19 with which it is associated, but reference thereto will show how Fig. 32 is connected to the sequence control units. As shown here in Fig. 32, the first advancing pulse over wire 714 proceeds directly to wire 715 signalling that the last of the stored ray data has been used. In the case of the lens data chain, as shown, the advancing pulse over wire 724 energizes relay 734 through its first winding, whereupon the holding pulse over wire 723 feeds through the front contacts of switches 761 and 762 on relay 734, thence through switches 754 and 755 to switch 756, which is set in the "in" position and through this switch to energize relay 736. Locking voltage via wire 721 is cut off by the operation of relay 736 from all lower-numbered relays and they are held only by the "hold" pulse over wire 723, so that at the end of the simultaneous pulses over wires 723 and 724 all relays except 736 relax. This illustrates how the chain automatically skips past panels which the operator has chosen not to use in the particular problem. The next pulse over wire 724 energizes relay 737 in the same way and the pulse over wire 723 proceeds through front contacts of switches 763 and 764 of relay 737, thence over switch 757 which as shown is set at the "out" position and thence to energize wire 725 signalling to the program control that all the stored lens data has been used.

*Program control*

Fig. 33 (on the same sheet with Fig. 19) shows the program control 32 which exercises general control over the operations of the other units of the machine. The principal functions of the program control unit are, as above enumerated, to start the five sequence control units at the opening schedule of operations when a problem begins, to start them at the beginning of the regular schedule of operations during the intermediate stages of the problem and to initiate the special closing operations when the problem is finished. The program control also signals the data storage control 36A and 36B to advance to another panel in the data storage units 10 and 11, and either to start a new problem if there is another panel of data in storage 10 or to shut off the machine when all the data is used up.

As described with reference to Fig. 19, wire 712 of Fig. 33 is energized for a few seconds when the machine is first turned on, and as described in reference to Fig. 32, this pulse energizes the first relay (731 or 732) in the data control chain 36A, for which the control switch (751 or 752) is set at the "in" position. Also, wires 711 and 721 are energized to apply locking voltage to chains 36A and 36B, and remain energized until de-energized as will be described shortly.

Relay 701 stands relaxed when the problem begins and the double-throw switch 741 on this relay starts the first sequence control unit 26 at the beginning of the opening cycle as described with reference to Fig. 22. The four other double-throw switches on the same relay 701 start the other four sequence control units at the beginning of the opening schedule in the same manner, when the locking voltage is applied thereto over wire 588B. After the opening schedule is completed and during the course of the regular schedule, relay 701 is energized via wire 748 over the front contact of switch 137 shown also in Fig. 24. Relay 701 is self-locked by voltage supplied over a back contact of relay 702. Thus it remains energized until relay 702 operates during the last regular schedule. The terminal relay 169 of the fifth sequence control unit is energized at the end of each regular schedule of opertaions, removing locking voltage from all sequence units during its release time and allowing them to relax. It then applies this locking voltage again to start a new schedule. Relay 702 operates when it receives an end-of-chain signal via wire 725 from the lens data storage unit 11 or control unit 36B. This signal occurs during the last regular schedule and indicates the end of a problem. Relay 701 is then relaxed, closing switch 746 which connects wire 750 to wire 723 which (in addition to carrying the "hold" pulse to the storage control unit 36B) goes to relay 890 of the output unit energizing the latter when wire 750 is energized by switch 154. Switch 154 is on the last relay 164 of the chain 105 of the fifth sequence control, which controls the last number transfer. Energizing relay 890 causes the carriage to be returned, as is explained with reference to Figs. 29B and 35. This is the general pattern of the control of the opening regular and closing schedules of the sequence units.

When the opening schedule of operations is first begun, switch 128 on the first relay of the second sequence control (Fig. 33) energizes wire 722 which, as shown in Fig. 32, energizes one of relays 733 to 737, and connects the first panel of lens data set up in the storage unit 11 for the problem being computed. The three numbers stored in this panel are transmitted in part during the opening schedule and in part during the first regular schedule of operations. After these are used up, an advance pulse and a hold pulse are sent to storage control unit 36B via wires 724 and 723 by the closing of the pair of switches 170 on the 26th relay of the fifth sequence control unit 30 advancing the chain in unit 36B to the next relay to connect the next panel of data set up in storage unit 11 to be ready for use in the problem. It may be noted at this point that a pulse on wire 723 does not affect the control unit 36B unless a pulse occurs over wire 724 at the same time. Moreover, the sneak circuit via switch 126—wire 722—switch 753 (Fig. 32)—a switch of relay 733—wire 723 is not energized during any number transfer and so does not affect the operation of the output unit. Accordingly, the same wire 723 is used for the hold pulse just mentioned and for the pulse to the output unit which brings about a carriage return instead of a tabulation, since a carriage return is called for at the same point in the schedule. When a carriage return occurs at other times, as described in the preceding paragraph, the pulse over wire 723 has no effect on the data storage control chain 36B. The data in this and in each succeeding storage panel is transmitted during the last part of one regular schedule and the first part of the next succeeding regular schedule of operations until the last panel which is set up for the problem in hand is transmitted during the first part of the last regular schedule. When switches 170 close during the last regular schedule, pulsing these wires 723 and 724, one of the pulses proceeds through the chain to wire 725 pulsing the end-of-chain relay 702. When this relay 702 is energized it relaxes relay 701 as above noted, and energizes wires 713 and 714 to send a hold pulse and an advance pulse to data control chain 36A. These pulses last as long as relay 702 is energized and advance the chain 36A to the next panel of ray data storage unit 10. Relay 702 also removes the locking voltage from wire 721 for the lens data storage chain 36B allowing all the relays of this chain to relax, as described with reference to Fig. 32. Relay 702 also removes one of the two sources of plus voltage for wire 688 depending on the terminal relay 169 of the fifth sequence control chain for its plus voltage supply. Relay 702 is also self-locking on wire 688. The last regular schedule of operations then proceeds to the end except that in the number transmittal controlled by the 30th relay of the fifth sequence control unit, there is no number transmitted since no relay of chain 36B is energized at that time.

At the close of the last regular schedule of operations, the terminal relay 169 (Fig. 33) of the fifth sequence control unit is energized by the advance pulse sent by the number transfer control 24 as described with reference to Fig. 29. Relay 169 is a slow-release relay and while it is energized and during its release time, it breaks the locking voltage via wire 588B to all five sequence control units and also removes the one remaining source of locking voltage from wire 688, already mentioned, thus releasing relay 702, and finally this relay 169 removes one of the two sources of plus voltage from wire 493 which will be described below. When relay 169 relaxes, it applies locking voltage again to the five sequence control units via wire 588B, and to the sign relays via wire 688. After each regular schedule except the last, this energizes the relay 107 or 109 controlling the first step in the regular schedule in each sequence control unit (because relay 701 is energized). However, when relay 701 is relaxed (by the energizing of relay 702) indicating the end of a problem, the relaxing of relay 169 and the applying of locking voltage via wire 588B energizes the first relay 106 or 108 of each control chain to begin the opening schedule (because relay 701 is relaxed). In the case of the second sequence control unit 27, this closes switch 128 which again starts the lens data storage unit 11 at the first panel for which data is set up for the problem in hand.

The ray data storage unit 10 having advanced to the next panel thereof, another problem is begun with a different set of ray data. When the ray data storage unit 10 has advanced to the last panel of ray data and the last problem proceeds to its last regular schedule in the manner above described so that the lens data storage unit 11 also stands at its last panel, then the closing of switches 170 in the fifth sequence control unit sends pulses over wires 723 and 724, one of which proceeds through the chain 36B to wire 725 energizing the end-of-chain relay 702 as before, and sending an advance pulse and a hold pulse over wires 713 and 714 to ray data storage control unit 36A as before. In this case however, one of these pulses over wire 713 or 714 (depending upon whether the last panel of ray data is set at "In" or "Out") proceeds through the data control chain 36A as described with reference to Fig. 32 to energize wire 715 which energizes the second end-of-chain relay 703. This removes one of the two sources of plus voltage from wire 493 and the last regular cycle of operations runs to the end which is signaled by the energizing of terminal relay 169. When relay 169 is energized at this time, it removes the other source of plus voltage from wire 493, thus removing all holding voltage from the power supply relay 490, shown in Fig. 19 and described with reference thereto, releasing holding relay 490 and thereby cutting off the D. C. power supplies or rectifiers 25A and 25B, thus relaxing all the relays in the machine and stopping the operation thereof.

One branch of the end-of-chain wire 715 connects over a back contact of relay 702 with wire 494. The purpose of this is to prevent the starting of the machine if no data is set up in storage unit 10. In that case the initial pulse over wire 712 proceeds through the chain as described with reference to Fig. 32, energizing wires 715 and 494 and preventing the operation of relay 490 shown in Fig. 19.

*Square root transmitter*

Fig. 34 shows a detail of the square root relays which are described in the previously mentioned copending application. These relays cooperate with the rest of the third arithmetical unit to compute the square root of $(1-\sin^2 I)$ and store the square root on a set of relays of which one group storing one unit is shown in Fig. 34.

The relays 850—855 for storing the second digit of the number are shown. The first digit is always zero since the cosine is never greater than 1. The other digits are stored on similar groups of relays not shown. Each digit is coded on 6 relays, 5 of which 850–854 represent the digits from 0 to 4 respectively when the fifth relay 855 is relaxed, and represent the digits from 5–9 respectively when relay 855 is energized. These relays are normally relaxed and when energized by the square root register relays as shown in the copending application they remain energized as long as wire 856 is energized under the control of the third sequence unit, and the number stored therein can be transmitted as long as they remain energized.

To transmit the number, relay 860 is first energized by a wire 186 which receives its energy from the fifth sequence unit 30. Then wire 83 is energized by the number transfer control unit as described with reference to Fig. 29 energizing the zero wire 12A₀ of the first digital group of number trunks and energizing wire 862 which is connected to one of the second digital group of number circuits 12B via the switch or switches of the storage relay or relays 850—855 which stand energized. Seven additional switches are shown on relay 860 which energize wires corresponding to wire 862 for energizing the number circuits of the remaining digital groups (all locked by voltage over wire 856) corresponding to the remaining seven digits of the stored number, thus energizing the number trunks and transmitting the number. When the complement of the cosine is to be transmitted relay 683 of Fig. 30 is held energized during the entire period during which the transmission takes place under the control of the fifth sequence unit 30 and the number transfer control unit 24 (Fig. 29) as was described above relative to Fig. 30.

*Output unit*

Fig. 35 (on same sheet as Fig. 29B with which it is associated) shows the circuit of the output unit 21. The output unit comprises an electrically operated typewriter of a type which is available commercially and so need not be described here. Each key in the keyboard is operated by a solenoid including the space bar, the tab key, the carriage return and the red and block printing control. Fig. 35 shows the solenoids operating the keys for printing the ten digits from zero to 9 under the control of number circuits 15 and relay 61, and also solenoid 896 actuating the decimal point key, 897 actuating the space bar, 898 actuating the tab key, 895 actuating the carriage return key, and 879 actuating the red and black printing control. These solenoids are energized by the number transfer control unit as already described with reference to Fig. 29.

In addition, a switch 796 is provided which is closed when the carriage is fully returned to its starting position. The connections to this switch are shown in Fig. 26A. Also considered as part of the output unit and shown in Fig. 35 is a relay 890 which is controlled by the fifth sequence unit and the program control unit and which determines whether the tab key or the carriage return key is to be actuated at the end of the transmittal of a number to the output unit. The circuit actuating this relay 890 is described with reference to Fig. 33. It is not believed necessary to describe the output unit in further detail. It merely types the results computed by the whole machine.

*Assembly drawings*

Figs. 36–39 are diagrams showing how the detailed drawings are to be arranged and combined to give the four arithmetical units and the sequence units associated therewith.

The connections to the keyboard solenoids of the arithmetical unit are shown in the right-hand part of Fig. 4 and are the same in all units except that the quotient register appears only in the first unit, a square root register is substituted therefor in the third unit and the number-complement relays 63 are modified in the second unit in accordance with Fig. 31. The circuit of Fig. 4 is connected to the circuit of Fig. 16 by wires 84 and 86 which guard the operations of the arithmetical unit so that no machine operation involving either keyboard is started while a number is being received in that keyboard.

Figs. 14 and 15 are conveniently placed adjacent to the left side of Fig. 16 extending below the lower margin thereof. The jack points and corresponding plug points then come opposite each other.

In the first arithmetical unit Fig. 18 is placed against the lower machine of Fig. 16 and the connecting wires match. The group of wires 98 running off the bottom of Fig. 18 may be thought of as running around to the multiplier keyboard solenoids of Fig. 4 for transmitting the quotient to the multiplier keyboard as previously described.

In the third arithmetical unit the figures of the above-mentioned copending application are placed adjacent to the lower edge of Fig. 16 and the same wires match with that circuit, as match with the quotient register Fig. 18. The square root register is connected with the number circuits 12 and optionally may also connect directly with the multiplier solenoids of the same unit as was shown in the case of the quotient register. Each of the lines which fan out into a group of lines represents ten wires constituting a digital group of the number circuits.

Fig. 16 includes a small rectangle 26 which represents the corresponding sequence control unit. In Figs. 36 to 39 detailed drawings of the four sequence control units, Figs. 22-25 respectively are to be considered as substituted for that rectangle. The guard circuits which are shown in Fig. 16 entering the top of the rectangle enter the detailed diagrams on the left side below the "advance" and "hold" pulse wires 177 and 178. The wires shown in Fig. 16 proceeding from the bottom of that rectangle to the sign control unit 34 are shown in the detailed drawings proceeding to the right and entering a small rectangle 34 representing the sign control unit, which is shown in more detail in Fig. 27. The wires shown in Fig. 16 as leaving the bottom of the rectangle 26 and the bottom of the rectangle 34 are shown in the detail drawings leaving the left side of the sequence control circuit below the guard circuits mentioned above.

Figure 40:
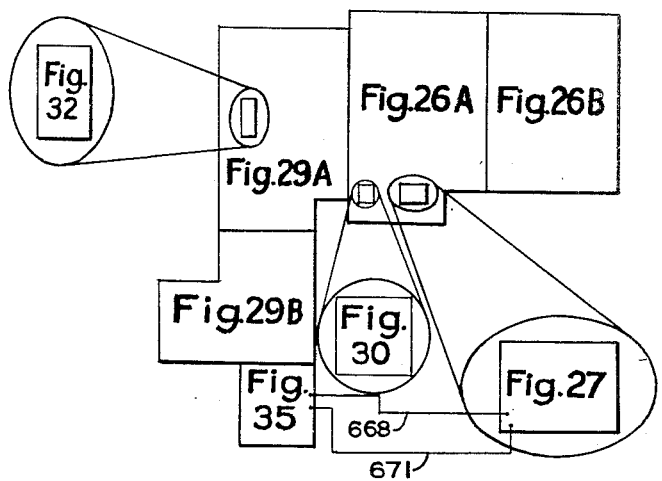
Fig. 40 is a diagram showing how detailed drawings are arranged and combined to give the complete number transfer circuit, output unit, and the associated sequence unit.

Fig. 40 shows the manner of assembling Figs. 26, 27, 29, 30, 32 and 35 to show the control system for controlling the transferring and printing of numbers. This system includes the fifth sequence control unit 30, the number transfer control unit 24, the output unit or printing unit 21, the sign control unit 34, and the storage control unit 36. The number trunks are not shown in these figures except in Fig. 30, which shows the relay 680 for converting cos I into (1−cos I). When Figs. 26A and 26B, 29A and 29B, and 35 are placed together as shown, the interconnecting wires match. The sign control unit is represented as a small rectangle 34 in Fig. 26A and is shown more in detail in Fig. 27. It is shown again as a small rectangle in Figs. 29A and 35 to show the manner in which wires 671 and 668 respectively connect therewith. These two wires are shown again in part in Fig. 40. It may be noted that wire 671 runs from Fig. 29A through Fig. 29B to Fig. 35, thus it is properly shown in Fig. 40 as connecting Fig. 35 with Fig. 27.

Two rectangles 36A and 36B in Fig. 29A indicate sketchily all twelve of the data storage panels. Fig. 32 shows the control circuit in more detail but shows only seven panels. The control circuit is repetitive and may be extended to any reasonable number of panels in an obvious manner. By "reasonable number" is meant a number less than the total number of relay switches that can be connected in series and still maintain a safe operating potential at a relay coil.

With this explanation and the aid of Figs. 36 to 40 it is believed that the interrelationships between Figs. 4, 14, 15, 16, 22, 23, 24, 25, 26, 27, 29, 30, 31, 32 and 35 will be readily understood.

*Printing form*

Figures 41, 42:
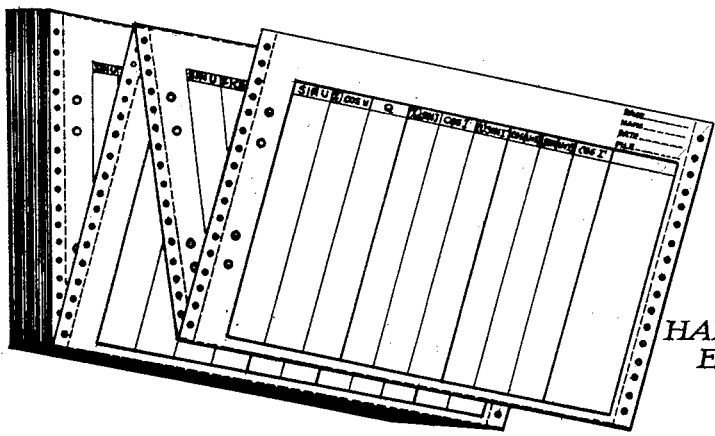
Figs. 41 and 42 show a continuous-feed paper form for recording the results of a ray-tracing computation.

Figs. 41 and 42 are included merely to show the paper form used for recording the results of the computation as printed by the output unit in the particular problem described, namely lens computing. The operator optionally records the lens data under the provisional headings $$\left(\frac{1}{\gamma}\right), \left(\frac{N}{N'}\right)$$

and $(t)$ by manual operation of the typewriter. Then the computer, after being started, prints the nine values, sin U, cos U, Q, sin I, cos I, sin I', cos $(U+I)$, sin $(U+I)$, and cos I' for each lens surface and under the first three columns it prints sin U', cos U' and Q' for the last surface. At the option of the operator, $(Q'-t' \sin U')$ may be printed in place of the last Q', where $t'$ is any arbitrary distance such as the back focal distance. The paper form is made up for continuous feed, and after being printed the marginal strips are torn off along the perforated line and the sheets separated and handled as loose leaf notebook pages.

*Universal type computer*

Figure 43:
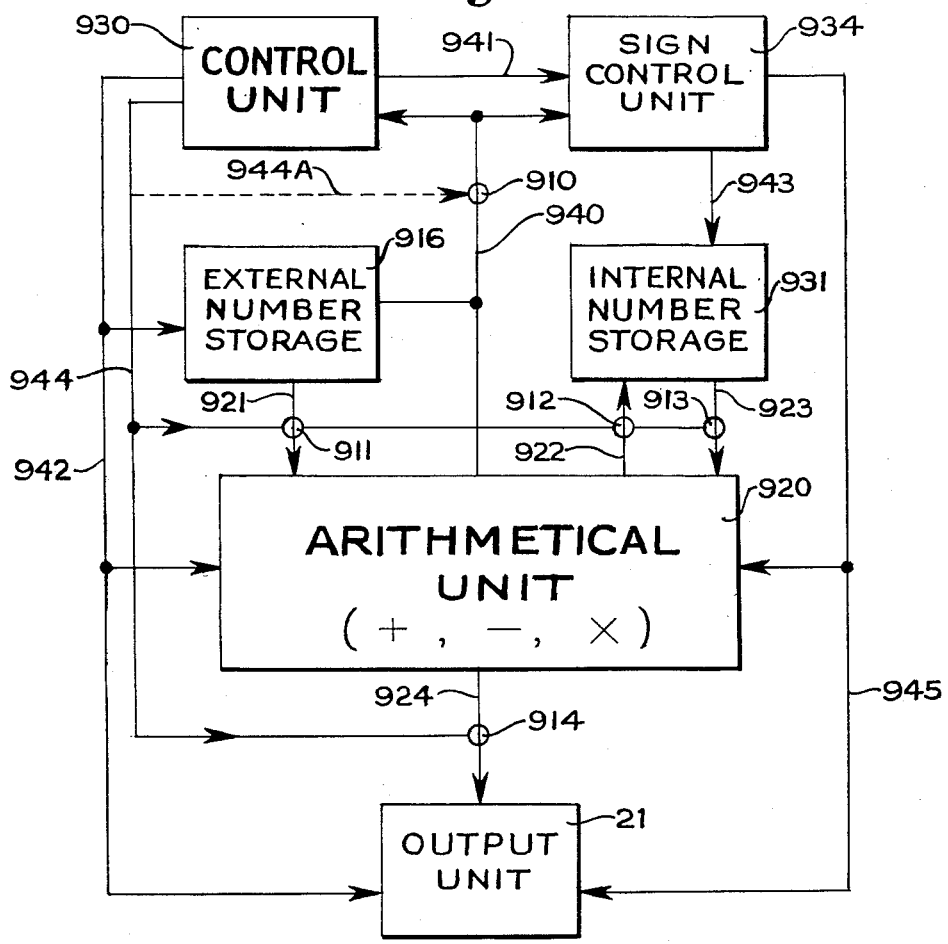
Fig. 43 is a schematic diagram of a simpler form of the invention suitable for general use.

Fig. 43 is a diagram of a small universal type computer. It will be readily recognized by those skilled in computing that all the necessary component parts which can readily be assembled into a universal type computer have been described. The diagram, Fig. 43, shows a control 930, a sign control 934, an external number storage 916, an internal number storage 931, an arithmetical unit 920, and an output unit 21. As a practical minimum the arithmetical unit should be equipped to add, subtract and multiply. However, to handle a wider range of problems, it should also be equipped to divide and compute square roots, as described in the previously mentioned copending application.

The sequence control 930 may be a chain of relays as shown in Fig. 22 modified so that the connections from guard circuits 580—586 to relay switches and from relay switches to operating circuits 540—550 are made by plug-board in known manner. Alternatively it is a tape reader which advances upon receiving an "advance" signal from the arithmetical unit via path 940. Tape readers are well known and available on the market and need not be described here. The control in this case controls both the number transfers and the arithmetical operations. A number transfer control (Fig. 29) may be considered to be a part of the sequence control.

The branched line 944 running to several small circles denotes the control of the number transfers. The circles 911 to 914 represent "gates," that is relay groups such as relays 62, 63, (Fig. 4), which permit numbers to be transmitted selectively over the several paths 921 to 924 when selectively energized by the control 930. Optionally, signals passing along dotted line 944A to a gate 910 control the transfer of signs from the sign control 934 over path group 940. The branched line 942 and line 941 represent control paths or operational circuits to the other units.

The sign control 934 is simpler than that shown in Fig. 27 an is designed along the same lines.

In its simplest form, it consists essentially of a flip-flop relay pair such as shown in Fig. 28 for receiving a pulse when a negative number is entered into the arithmetical unit as an addend or as a multiplicand (i. e. in the main keyboard), another pulse when a negative number is entered into the arithmetical unit as a multiplier (i. e. in the multiplier keyboard), and switches operated by said relay pair for selecting the sense of the operations to be performed by the arithmetical unit so that the upper sign is effective when a "±MULT," "∓MULT," "±ADD," or "∓ADD" operation (as previously defined) is signalled for by the sequence control according to schedule in case zero or two such pulses have been received, and so that the lower sign is effective in case one such pulse has been received. The arithmetical unit is provided with switch means for relaxing said relay pair when an arithmetical operation has begun.

When the arithmetical unit is provided with quotient register relays as shown in Fig. 18, or as shown in the copending application mentioned above, the sign control is preferably also provided with a second flip-flop relay pair for remembering the sign of the quotient in accordance with the signs of the divisor and dividend. Both functions may be performed by a single flip-flop pair, but the provision of two pairs gives the advantage that the over-all schedule of operations may be speeded up by transmitting a number to the multiplier keyboard while the division operation is in progress.

The paths by which the sign control controls the operation of the other units are represented by line 943 to the internal storage 931 and line 945 to the arithmetical unit 920 and to the output unit 21.

When using the simple form of sign control just described, an overdraft in a product register always denotes that the number therein is negative. When this number is scheduled to be printed, a circuit from the overdraft switch to the output unit controls the printing of the number as negative. This circuit may conveniently be considered as functioning as part of the sign control.

The external storage unit 916 is a series of sets of manually operated dial switches as hereinbefore described (Figs. 2A, 4, 32) or optionally a tape reader or sets of self-locking relays similar to the storage relays shown in Fig. 34, or self-sustaining electronic circuits of known type, although the essential feature of the computer (e. g. the arithmetical unit) is not electronic in any form of the present invention. The relays or electronic circuits are simply set by manually operated switches. The dial switches have the advantage of cheapness for small problems, the tape reader the advantage of large capacity, and the relays and electronic storage the advantage of being easily and quickly changed. The choice is made in accordance with the type of problem contemplated, and more than one type of external storage may be used in a single machine.

The internal storage 931 is optional, but is necessary for any but the simplest problems to be handled efficiently. It is not manually operated and consists of relays or electronic circuits, and the same units may serve as external storage in one problem and as internal storage in another under the control of the operator. One digit may be represented on ten relays, or on six as shown in Fig. 34, or may be coded on four relays in known manner.

The arithmetical unit 920 is the heart of this form of the invention, and as hereinbefore described it is very economical to construct and very dependable in its operation. It may readily be combined with the different types of sequence control above enumerated. It is constructed essentially as described with reference to Figs. 5 to 17. Optionally, the circuit of Fig. 18 is added for division or the circuit described in the copending application is added for computing square roots and for division.

The output unit 21 may be the same as described with reference to Fig. 35, but a number of different electrically controlled recording devices are known, and the invention is not limited to the use of the particular output unit described herein.

A universal computer such as shown in Fig. 43 and including an arithmetical unit of the type described is very useful in small computing laboratories where the volume of routine computing is sufficient to keep one or more persons occupied full time but not sufficient to warrant the construction of a large electronic machine.

One useful optional feature which has not been described is the signal light 59 on the storage panel 11J (Fig. 2A) and on each of the other storage panels. Each of these signal lights is energized through a normally open switch (not shown) on the corresponding storage control relay 731 to 737 (Fig. 32). Thus the light is lit when the computer is using the data stored in the panel, and the series of lights signal how far the problem has progressed and also signal when it is safe to change the data in preparation for the next problem. The ray data may be changed in each panel as soon as the signal light in the next succeeding panel is lit up, and after the last ray data panel is lit up the lens data in each panel may be changed as soon as the light in the next succeeding lens data panel is lit up. Usually the last panel in each section can be changed after the next problem has been started.

In the accompanying claims the terms "key set mechanical calculator" and "automatic sequence digital computer" are used to distinguish the standard mechanical calculator unit from the overall machine; both may be properly termed calculators but they are of course quite different and some appropriate terminology must be selected to represent this difference. The key set mechanical calculator per se is essentially a standard commercial unit. The present invention is in the control system which operates this unit and is operated by this unit and in the overall combination or computer including this unit.

We claim:

1. An arithmetical unit for computing quotients, square roots and the like in an automatic sequence digital computer, comprising a key set mechanical calculator including means for performing a first series of subtraction cycles ending when an overdraft occurs, and for performing one addition cycle to correct the overdraft, means for shifting the relative decimal positions of the subtrahend on the register of the calculator and the minuend on the keyboard of the calculator and means for performing a second series of subtraction cycles ending when a second overdraft occurs, means for emitting an electrical pulse over a first electrical circuit during each subtraction cycle, a pulse over a second circuit during the first cycle after the overdraft, and a pulse over a third circuit during the second cycle after the overdraft, means for counting the pulses going over the first circuit, means controlled jointly by the counting means and by the pulse over the second circuit for generating an electrical pulse representative of the count of the subtractions, and means controlled by the pulse over the third circuit for resetting the counting means to zero.

2. An arithmetical unit for an automatic sequence digital computer, which comprises (1) an electrically driven key-set mechanical calculator having a main keyboard, a multiplier keyboard, a product register, control keys for selectively initiating the operations of addition, subtraction, multiplication, and clearing, and wheels in the product register which by their angular positions display the result of each of these operations; (2) a plurality of number circuits and keyboard solenoids responsive thereto for entering numbers into the keyboards; (3) control circuits and control solenoids responsive thereto for operating the control keys; (4) guard circuits for signalling when numbers have been received in each keyboard, when the calculator is idle, and when the calculator is running, respectively; (5) a read-out device for detecting the positions of the significant product register wheels and for closing the number circuits corresponding to the digits of the number represented thereby; (6) electrical interlocking means for preventing the concurrent operation of the calculator and the read-out device, and (7) a rigid support for holding all these parts in operative relationship.

3. In an automatic sequence digital computer, an electrical control system adapted to control a key set mechanical calculator of the type having a main keyboard, a multiplier keyboard, a product register laterally movable relative to the main keyboard, control keys for selectively initiating the operations of addition, subtraction, multiplication and clearing, and wheels in the product register which by their angular positions display the results of each of these operations, said control system comprising: (1) first number circuits and means responsive thereto for simultaneously entering digits into the main keyboard, (2) second number circuits and means responsive thereto for entering digits successively into the multiplier keyboard, (3) a read-out mechanism having tactile levers and number-switches and adapted in response to an electrical pulse to read out a number in the register by pushing the tactile levers thereagainst thereby closing switches representative of said number and to remove the tactile levers therefrom while maintaining the switches closed for storing the number, (4) electrical interlocking means for preventing the concurrent operation of the calculator and the read-out mechanism, (5) guard circuits including first, second and third guard circuits adapted to be closed respectively when the calculator is idle, when a number has been entered into the main keyboard and when the register is in a predetermined position, and (6) stepping means adapted to be stepped forward each time the calculator operates and to sequentially close a series of switches each connecting preselected guard circuits to preselected control circuits for causing the calculator to perform a predetermined series of operations.

4. A control circuit according to claim 3 including a sign control comprising a plurality of flip-flop units adapted to receive a signal when a negative number is entered into a keyboard and reversing switches operated by the flip-flop units for controlling the sense of one and only one of a series of two successive operations whereby one of said operations is always performed in a positive sense and the sense of the other operation is controlled in accordance with the signs of the numbers involved in both operations and whereby the number of subtractive operations on the calculator is a minimum.

5. An electrical control system adapted to form an automatic sequence digital computer when combined with a key set mechanical calculator of the type having a main keyboard, a multiplier keyboard, a product register, control keys for selectively initiating the operations of addition, subtraction, multiplication, division and clearing, and wheels in the product register which by their angular positions display the results of each of said operations except division, and also of the type which is adapted to divide a number in the product register by a number in the main keyboard by a process of successive subtractions of the divisor in each significant decimal order ending with an overdraft, said control system comprising: (1) means for detecting the occurrence of a subtraction and for generating a pulse over a first circuit during each subtraction, (2) means for detecting the occurrence of an overdraft during the division process and for generating a pulse over a second circuit upon the occurrence of said overdraft, (3) a chain of relays responsive to said first circuit for counting said subtractions until an overdraft occurs, (4) means responsive to said second circuit for emitting a pulse corresponding to the count of said subtractions, and (5) means for resetting the chain of relays subsequent to the energizing of the number circuit for counting the subtractions in the next decimal order.

6. An electrical control system adapted to form an automatic sequence digital computer when combined with a plurality of key set mechanical calculators of the type having a main keyboard, a multiplier keyboard, a product register, control keys for selectively initiating the operations of addition, subtraction, multiplication and clearing, and wheels in the product register which by their angular positions display the results of each of these operations, said control system comprising (1) a plurality of sequence controls, one being individually associated with each calculator, and one additional sequence control; (2) electromechanical means for entering numbers into each keyboard of each calculator under the control of said additional sequence control; (3) electro-mechanical means for selectively initiating said operations by each calculator and for reading out numbers from each product register under the control of the individually associated sequence control; (4) guard circuits associated with each calculator for signalling when a number has been received in each keyboard, when the calculator is idle, and when the calculator is operating; (6) stepping means in each individually associated sequence control for advancing the sequence control one step under the control of the last mentioned guard circuit each time the calculator performs an operation; (7) switching means in each individually associated sequence unit for connecting preselected guard circuits to said means for initiating a preselected calculator operation whereby a predetermined series of operations is performed on each calculator and each operation is initiated as soon as the calculator is ready; (8) number-transfer guard circuits at preselected steps of each individually associated sequence control for permitting number transfers only at preselected junctures, of said series of operations; and (9) switching means and stepping means in said additional sequence control for controlling the transfers of numbers to preselected keyboards and from preselected read-out means under the control of said number-transfer guard circuits and for advancing said additional sequence unit when each number transfer is completed, whereby a series of numbers is entered into the said keyboards and a series of results is read out of said registers and whereby all the said series of operations and number transfers are coordinated for the solution of a mathematical problem and whereby each arithmetical unit proceeds under the control of its own sequence unit until ready to receive a number and waits until all units involved in that number transfer are ready whereupon the transfer is effected under the control of the additional sequence unit.

7. An electrical control system according to claim 6 including a sign control, overdraft detecting means for detecting overdrafts in the product register of each calculator, overdraft circuits operated by said overdraft detecting means for signaling the occurrence of an overdraft to the sign control, flip-flop units in the sign control for receiving the signs of numbers entered into the keyboard and the signals indicating overdrafts under the control of the said additional sequence unit, and reversing switches operated by said flip-flop units for selectively operating control solenoids in accordance with the signs of the entered numbers and with the occurrence or non-occurrence of an overdraft at preselected junctures in the sequences of arithmetical operations.

8. An electrical control system according to claim 6 adapted to be combined with a plurality of key set mechanical calculators at least one of which is of the type having a division control key and means for automatically dividing a number in the product register by a number in the main keyboard by successive subtractions in each significant decimal order, said control system including means for detecting the occurrence of a subtraction and for generating a pulse over a first circuit during each subtraction, means for detecting the occurrence of an overdraft during the division process and for generating a pulse over a second circuit upon the occurrence of said overdraft, a chain of relays responsive to said first circuit for counting said subtractions until an overdraft occurs, means responsive to said second circuit for transmitting an electric signal corresponding to the count of said subtractions, and means for resetting the chain of relays subsequent to the energizing of the number circuit for counting the subtractions in the next decimal order.

9. An electrical control system for a motor-driven key-set and key-controlled mechanical calculator having a register which is laterally shiftable relative to the keys and being capable of performing arithmetical operations and displaying the results in said register, comprising a plurality of number circuits, means for supporting the calculator in operative position, a plurality of solenoids arranged and adapted to depress numeral keys and control keys when the calculator is in the operative position, an electrically controlled read-out mechanism for reading out a number from the register when the calculator is in the operative position and for energizing number-circuits corresponding to said number, means for preventing the operation of the read-out mechanism except when the register is in a predetermined position, electrical means for preventing the concurrent operation of the read-out device and the calculator and time-delay means for stopping the motor when the calculator runs a predetermined interval without shifting the register.

10. An arithmetical unit for computing quotients, square roots and the like in an automatic sequence digital computer, comprising a key set mechanical calculator including means for performing a first series of subtraction cycles ending when an overdraft occurs, and for performing one addition cycle to correct the overdraft, means for shifting the relative decimal positions of the subtrahend on the register of the calculator and the minuend on the keyboard of the calculator and means for performing a second series of subtraction cycles ending when a second overdraft occurs, counting means for counting the subtraction cycles in each series, means operative upon the occurrence of an overdraft for transmitting an electrical signal corresponding to the count of the subtractions and means operative after the first overdraft for resetting the counting means before the second series of subtractions.

11. In an automatic sequence digital computer, in combination, a plurality of number storage switches, a plurality of arithmetical units and a plurality of sequence control units, including one sequence control unit individually associated with each arithmetical unit and one additional sequence control unit, wherein each arithmetical unit is adapted to receive numbers in the form of electrical pulses under the control of said additional sequence unit, to selectively perform the operations of addition, subtraction and multiplication upon said numbers and to close and maintain closed number storage switches representing a number resulting from said operations all under the control of electrical pulses from the associated sequence unit, and to signal by closing respective guard circuits when it is performing an arithmetical operation, when it is closing said switches, when it is idle, and when it has received a number respectively; and wherein each sequence control associated with an arithmetical unit comprises stepping means adapted to advance one step when the associated arithmetical unit signals that it is performing an arithmetical operation and adapted to sequentially close circuits each of which is connected to selected guard circuits on the one hand and is adapted on the other hand to transmit a pulse for initiating a preselected operation by the associated arithmetical unit whereby said pulses are transmitted only when said preselected guard circuits are closed and whereby a prearranged series of arithmetical operations is performed by each arithmetical unit; wherein each sequence control unit associated with an arithmetical unit is further adapted to operate other switches at preselected steps and thereby to signal that the associated arithmetical unit has reached a preselected juncture in its series of operations and that it is ready to receive a number; and wherein the said additional sequence control comprises stepping means adapted to be advanced one step each time a number transfer is effected and adapted at each step to control a preselected number transfer under the control of the said other switches of the first-mentioned sequence units, whereby coordinated series of arithmetical operations all related to a single problem are concurrently performed by the said arithmetical units and whereby each arithmetical unit proceeds under the control of its own sequence unit until ready to receive a number and waits until all units involved in that number transfer are ready whereupon the transfer is effected under the control of the additional sequence unit.

12. In an automatic sequence digital computer, in combination, an arithmetical unit and a control unit, in which the arithmetical unit comprises (1) an electrically driven mechanical calculator of a type having mechanical multiplicand-entry and multiplier-entry means and a register movable to different decimal positions with respect to the multiplicand-entry means (2) electrically controlled means for entering numbers thereinto, (3) electrically controlled means for selectively initiating the operations of addition, subtraction, multiplication and clearing, (4) a read-out mechanism having tactile levers and number-storage switches and adapted in response to an electrical pulse to read out a number represented in the register by pushing the tactile levers thereagainst thereby closing switches representative of said number and to remove the tactile levers therefrom while maintaining the switches closed for storing the number, (5) electrical interlocking means for preventing the concurrent operation of the calculator and the read-out mechanism, and (6) guard circuits including first, second and third guard circuits adapted to be closed respectively when the calculator is idle, when a number has been entered in the multiplicand-entry means and when the register is in a predetermined position; and in which the control unit comprises a series of control circuits and stepping means which is adapted to be advanced when the calculator performs an arithmetical operation and is adapted to close at least one of said control circuits at each step, said control circuits being connected to selected guard circuits on the one hand and being adapted to transmit pulses for initiating one and at most two preselected operations of the arithmetical unit on the other hand whereby said pulses are transmitted only when said preselected guard circuits are closed and whereby a prearranged series of arithmetical and read-out operations is performed by the arithmetical unit.

13. In an automatic sequence digital computer, in combination an arithmetical unit and a control unit, in which the arithmetical unit comprises (1) an electrically driven key-set mechanical calculator having a main keyboard, a multiplier keyboard, a product register movable relatively to the main keyboard, control keys for selectively initiating the operations of addition, subtraction, multiplication and clearing, and wheels in the product register for displaying by their angular position the result of each of these operations; (2) main keyboard solenoids adapted to receive simultaneously a plurality of electrical pulses representing a plural-digit number and to enter said number into the main keyboard by pushing keys thereof; (3) multiplier keyboard solenoids adapted to receive a series of successive electrical pulses representing a plural-digit number and to enter the digits of said number successively into the multiplier keyboard by pushing the keys thereof; (4) control solenoids adapted to operate said control keys in response to electrical pulses; (5) a read-out mechanism having tactile levers and number-storage switches and adapted in response to an electrical pulse to detect the positions of the significant product register wheels by pushing the tactile levers thereagainst, to close switches corresponding to the digits of the number represented thereby and to remove the tactile levers from the register wheels while maintaining the switches closed for storing the number; (6) electrical interlocking means for preventing the concurrent operation of the calculator and the read-out mechanism; (7) first, second, third and fourth guard circuits adapted to be closed respectively when the calculator is idle, when a number has been entered into the main keyboard, when a number has been entered into the multiplier keyboard and when the product register is in a predetermined position; and (8) a support for holding all these parts in operative relationship; and in which the control unit comprises a stepping chain of relays adapted to be advanced one step each time the calculator performs an operation and each relay having switches adapted to operatively connect selected guard circuits and a selected operational solenoid whereby said operational solenoid is energized when said selected guard circuits are closed and whereby a predetermined series of arithmetical operations are performed by the arithmetical unit.

14. In combination, an arithmetical unit including a mechanical calculator and a control unit all as claimed in claim 12 in which said mechanical calculator is provided with a division control and automatic means responsive to said division control for dividing a dividend in the register by a divisor in the multiplicand-entry means by a process of successive subtractions of the divisor ending when an overdraft occurs and followed by a correction of the overdraft by one addition of the divisor all in each of several successive decimal positions of the register, in which said arithmetical unit is provided with means responsive to an electrical pulse for operating said division control and is provided with means for generating a pulse during each subtraction, with electrical counting means for counting said pulses, and with means adapted to operate upon the occurrence of an overdraft and controlled by said counting means for transmitting an electrical pulse representing the resulting count and for resetting the counting means, and in which the control unit is provided with a control circuit adapted to be closed during at least one step of the operation of the sequence unit for transmitting a pulse to said means in the arithmetical unit for operating said division control, said control circuit being under the control of three said guard circuits adapted to permit the transmitting of said pulse only when a divisor has been received in said multiplicand entry means, the calculator is idle, and the register is in position to cause the divisor to be first subtracted from the highest decimal order of the dividend.

15. A read-out device for reading out a plural-digit number represented by angular positions of a plurality of stepped cams and for closing electrical circuits representing corresponding numbers, comprising a corresponding plurality of levers adapted to rock as a unit about a fixed axis and spaced apart along said axis, a floating lever pivoted upon each spaced lever at a distance from said fixed axis, a row of ten contact points mounted on each spaced lever and spaced along an arc of a circle whose center is at the pivot point of the floating lever and individually corresponding to the steps on the cams, each floating lever having one arm adapted to rotatably contact one of the cams at a read-out position and another arm provided with an electrical contact point adapted to be moved along the row of contact points and to be pressed laterally against the row of contact points thereby locking the floating lever in fixed position relative thereto, means responsive to an electrical signal for unlocking the floating levers, for rocking the spaced levers in the direction which carries the floating levers against the stepped cams, for holding the floating levers free of the row of contacts during said rocking, for locking the floating lever at the end of said rocking, and for returning the spaced levers to their rest position while maintaining the floating levers locked for storing the number read out, and means for preventing movement of the stepped cams during operation of the read-out device.

HAROLD F. BENNETT.
EARLE A. YOUNG.
EBEN HOAG.

References Cited in the file of this patent

UNITED STATES PATENTS

| Number | Name | Date |
|---|---|---|
| 1,701,436 | Balser | Feb. 5, 1929 |
| 1,813,830 | Weiner | July 7, 1931 |
| 1,876,296 | Hofgaard | Sept. 6, 1932 |
| 1,988,904 | Krell | Jan. 22, 1935 |
| 2,136,694 | Laiho | Nov. 15, 1938 |
| 2,155,991 | Kurowski | Apr. 25, 1939 |
| 2,178,950 | Bryce | Nov. 7, 1939 |
| 2,195,080 | De Simone | Mar. 26, 1940 |
| 2,538,636 | Williams | Jan. 16, 1951 |

FOREIGN PATENTS

| Number | Country | Date |
|---|---|---|
| 600,896 | Great Britain | Apr. 21, 1947 |

OTHER REFERENCES

"Description of a Relay Calculator"; The Staff of the Harvard University Computation Laboratory, Harvard University Press, 1949; Chapters I-IX.